US012578559B2

(12) United States Patent
Chiang et al.

(10) Patent No.: US 12,578,559 B2
(45) Date of Patent: Mar. 17, 2026

(54) CAMERA LENS, CAMERA MODULE, AND ELECTRONIC DEVICE

(71) Applicant: Huawei Technologies Co., Ltd., Shenzhen (CN)

(72) Inventors: Yita Chiang, Dongguan (CN); Xiaodan Yu, Dongguan (CN); Shaopan Zhou, Tokyo (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 280 days.

(21) Appl. No.: 18/446,788

(22) Filed: Aug. 9, 2023

(65) Prior Publication Data

US 2024/0012226 A1      Jan. 11, 2024

Related U.S. Application Data

(63) Continuation of application No. PCT/CN2022/073570, filed on Jan. 24, 2022.

(30) Foreign Application Priority Data

Feb. 10, 2021    (CN) .......................... 202110185646.1

(51) Int. Cl.
| | |
|---|---|
| *G02B 13/00* | (2006.01) |
| *G02B 3/14* | (2006.01) |
| *G02B 9/34* | (2006.01) |
| *G02B 27/42* | (2006.01) |
| *G03B 17/17* | (2021.01) |

(52) U.S. Cl.
CPC ........... *G02B 13/0065* (2013.01); *G02B 3/14* (2013.01); *G02B 9/34* (2013.01); *G02B 27/4211* (2013.01); *G03B 17/17* (2013.01)

(58) Field of Classification Search
CPC ........ G02B 13/0065; G02B 3/14; G02B 9/34; G02B 27/4211; G03B 17/17
See application file for complete search history.

(56) References Cited

U.S. PATENT DOCUMENTS

| | | | | |
|---|---|---|---|---|
| 2007/0183058 A1* | 8/2007 | Bito | ..................... | G02B 15/142 |
| | | | | 359/676 |
| 2015/0253647 A1 | 9/2015 | Mercado | | |
| 2017/0276912 A1 | 9/2017 | Yao et al. | | |
| 2021/0048628 A1* | 2/2021 | Shabtay | ............. | G02B 13/0045 |

FOREIGN PATENT DOCUMENTS

| | | | | |
|---|---|---|---|---|
| JP | 2012103626 A | * | 5/2012 | ............... G02B 3/14 |
| WO | 2019021145 A1 | | 1/2019 | |

* cited by examiner

*Primary Examiner* — Laura A Gudorf
(74) *Attorney, Agent, or Firm* — Slater Matsil, LLP

(57) ABSTRACT

A camera lens including a first lens, a prism, and a plurality of lenses. The first lens has positive focal power, and an object-side surface of the first lens is a convex surface. An object-side surface of the prism is in contact with an image-side surface of the first lens. The prism refracts, from a first optical axis to a second optical axis intersecting the first optical axis, light received from the first lens. The plurality of lenses include at least three lenses, and the plurality of lenses are sequentially disposed along the second optical axis.

19 Claims, 36 Drawing Sheets

Imaging plane

G3

G2

G25 G24 G23 G22 G21

G12
G11
G1

Imaging plane

CAMERA LENS, CAMERA MODULE, AND ELECTRONIC DEVICE

CROSS-REFERENCE TO RELATED APPLICATIONS

This application is a continuation of International Patent Application No. PCT/CN2022/073570, filed on Jan. 24, 2022, which claims priority to Chinese Patent Application No. 202110185646.1, filed on Feb. 10, 2021, both of which are hereby incorporated by reference in their entireties.

TECHNICAL FIELD

This application relates to the field of optical imaging technologies, and in particular, to a camera lens, a camera module, and an electronic device.

BACKGROUND

With development of electronic devices having image shooting and video recording functions, such as mobile phones and tablet computers, miniaturization and thinning have become a development trend of these electronic devices. In addition, electronic devices with a long-focus function are increasingly popular.

FIG. 1 is a diagram of a partial structure of a conventional camera lens that has a long focal length and that is used in an electronic device such as a mobile phone or a tablet computer. To meet miniaturization and thinning require-ments, the camera lens is cut along a height direction (for example, an I direction in FIG. 1) of each lens, so that a height of the camera lens is reduced. This technology may be referred to as an I-cut process. A dashed line M in FIG. 1 indicates a cutting line.

However, as shown in FIG. 1, after the camera lens is cut along the height direction, an amount of light entering the camera lens is reduced. As a result, image quality of an image formed by the camera lens is non-uniform in a meridional direction (a T direction) and a sagittal direction (an S direction), imaging quality is reduced, and usability of the camera lens deteriorates.

SUMMARY

This application provides a camera lens, a camera mod-ule, and an electronic device, mainly to provide a camera lens that has a long-focus function and that can reduce a height and improve imaging quality.

To achieve the foregoing objective, the following techni-cal solutions are used in this application.

According to a first aspect, this application provides a camera lens. Along a direction from an object field to an image field, the camera lens includes a first lens, a prism, and a plurality of lenses. The first lens has positive focal power, and an object-side surface of the first lens is a convex surface. An object-side surface of the prism is in contact with an image-side surface of the first lens. The prism refracts, from a first optical axis to a second optical axis intersecting the first optical axis, light received from the first lens. The plurality of lenses include at least three lenses, and the plurality of lenses are sequentially disposed along the second optical axis. Both an object-side surface and an image-side surface of a lens of the plurality of lenses that is close to the prism are aspheric surfaces. An image-side surface of a lens of the plurality of lenses that is close to the image field of the camera lens is a convex surface.

The camera lens provided in this application includes the first lens whose object-side surface is a convex surface and the prism connected to the first lens. In this way, the prism can refract light converged by the first lens from the first optical axis to the second optical axis, to provide a bent optical axis for the entire camera lens. Compared with the conventional technology, a height of the camera lens can be reduced, and a length of the camera lens can be reduced, without reducing an amount of light entering the camera lens. This meets design requirements of miniaturization and thinning.

In addition, the at least three lenses are disposed on the second optical axis, and the image-side surface of the lens of the plurality of lenses that is close to the image field of the camera lens is designed as a convex surface, so that light can be converged to improve imaging quality. In addition, both the object-side surface and the image-side surface of the lens of the plurality of lenses that is close to the prism are aspheric surfaces, so that aberration can be reduced, imaging quality can be improved, and the camera lens can meet a long-focus requirement.

In a possible implementation of the first aspect, at least one of the plurality of lenses is a diffractive optical element. With the diffractive optical element, an optical path of light entering the diffractive optical element may be changed, so that light within different wavelength ranges is converged to a same intersection point. In this way, chromatic aberration can be corrected to optimize imaging quality.

In a possible implementation of the first aspect, at least one of the plurality of lenses is a first zoom liquid lens.

In a possible implementation of the first aspect, the camera lens further includes a second zoom liquid lens, where the second zoom liquid lens is disposed on a side of the first lens that is close to the object field.

The zoom liquid lens is disposed in the camera lens, and the zoom liquid lens has a zoom function, so that a total focal length range of the camera lens can be larger, and an application scope of the camera lens is further expanded.

In a possible implementation of the first aspect, the plurality of lenses include a second lens having negative focal power, a third lens having positive focal power, and a fourth lens having focal power, where the second lens, the third lens, and the fourth lens are sequentially disposed along the second optical axis. A camera lens formed in this way may be referred to as a camera lens including a combination of a refractive prism group (including the first lens and the prism) and three lenses.

In this implementation, the second lens having negative focal power helps correct field curvature of the camera lens, so that an imaging plane of the camera lens is flatter; and the third lens has positive focal power, so that light convergence on an object-side surface of the fourth lens can be weakened, to avoid excessively large aberration of the camera lens.

In a possible implementation of the first aspect, a ratio of a focal length f2 of the second lens to a total focal length f of the camera lens is as follows:

$$0.1 \le \left| \frac{f2}{f} \right| \le 0.9.$$

In a possible implementation of the first aspect, the plurality of lenses include a second lens having focal power, a third lens having focal power, a fourth lens having focal power, and a fifth lens having focal power, where the second lens, the third lens, the fourth lens, and the fifth lens are sequentially disposed along the second optical axis. A camera lens formed in this way may be referred to as a camera lens including a combination of a refractive prism group (including the first lens and the prism) and four lenses.

In a possible implementation of the first aspect, a ratio of a focal length f2 of the second lens to a total focal length f of the camera lens is as follows:

$$0.2 \le \left| \frac{f2}{f} \right| \le 1.3.$$

In a possible implementation of the first aspect, the plurality of lenses include a second lens having positive focal power, a third lens having negative focal power, a fourth lens having negative focal power, a fifth lens having positive focal power, and a sixth lens having negative focal power, where the second lens, the third lens, the fourth lens, the fifth lens, and the sixth lens are sequentially disposed along the second optical axis. A camera lens formed in this way may be referred to as a camera lens including a combination of a refractive prism group (including the first lens and the prism) and five lenses.

In this implementation, the second lens has positive focal power, and the third lens has negative focal power. The third lens having negative focal power helps correct field curvature of light transmitted through the second lens, so that imaging is flatter. The fourth lens has negative focal power, and the fifth lens has positive focal power, so that the fourth lens can disperse light, and then the fifth lens performs correction, to improve imaging quality.

In a possible implementation of the first aspect, a ratio of a focal length f2 of the second lens to a total focal length f of the camera lens is as follows:

$$0.2 \le \left| \frac{f2}{f} \right| \le 18.$$

In a possible implementation of the first aspect, the total focal length f of the camera lens is as follows: 14 mm≤f≤33 mm. The total focal length f of the camera lens is designed to range from 14 mm to 33 mm, so that the camera lens becomes a long-focus camera lens.

In a possible implementation of the first aspect, a ratio of a curvature radius R of a lens of the plurality of lenses that is close to the image field of the camera lens to the total focal length f of the camera lens is as follows:

$$0.2 \le \left| \frac{R}{f} \right| \le 3.$$

In this way, astigmatism of the camera lens can be corrected.

In a possible implementation of the first aspect, a ratio of an Abbe number V1 of the first lens to an Abbe number V2 of the prism is as follows:

$$\left| \frac{V1}{V2} \right| < 3.$$

In this way, chromatic aberration of the camera lens can be corrected.

In a possible implementation of the first aspect, a ratio of an image height H of the camera lens to a total track length TTL of the camera lens is as follows:

$$0 < \frac{H}{TTL} < 0.2.$$

In this way, a size of the entire camera lens can be further reduced.

In a possible implementation of the first aspect, the prism is made of a glass material, the first lens is made of a plastic material, and the first lens is bonded to the prism through a bonding layer. A refractive prism group (including the first lens and the prism) formed in this way is a glass-plastic hybrid refractive prism group.

In a possible implementation of the first aspect, both the prism and the first lens are made of a plastic material, or both the prism and the first lens are made of a glass material, and the prism and the first lens form an integrated structure. A refractive prism group (including the first lens and the prism) formed in this way is an integrated glass refractive prism group or an integrated injection-molded refractive prism group.

According to a second aspect, this application further provides a camera module. The camera module includes an image sensor and the camera lens in any one of the implementations of the first aspect. A photosensitive surface of the image sensor is opposite to an imaging plane of the camera lens.

The camera module provided in this embodiment of this application includes the camera lens in the embodiment of the first aspect. A prism of the camera lens can refract light converged by a first lens from a first optical axis to a second optical axis, to provide a bent optical axis for the entire camera lens. Compared with the conventional technology, a height of the camera lens can be reduced without reducing an amount of light entering the camera lens, so that a height of the entire camera module can be reduced. In addition, both an object-side surface and an image-side surface of a lens of a plurality of lenses that is close to the prism are aspheric surfaces, and an image-side surface of a lens of the plurality of lenses that is close to an image field of the camera lens is a convex surface. Based on these two features, imaging quality can be optimized, and imaging quality of the camera module can be improved.

According to a third aspect, this application further provides an electronic device. The electronic device includes a processing unit and the camera module in the implementation of the second aspect. The processing unit is connected to an image sensor in the camera module.

The electronic device provided in this embodiment of this application includes the camera module in the embodiment of the second aspect. Therefore, the electronic device provided in this embodiment of this application and the camera module in the foregoing technical solution can resolve a same technical problem, and achieve same expected effect.

BRIEF DESCRIPTION OF THE DRAWINGS

FIG. 3b is an exploded view of FIG. 3a;

FIG. 1c is a line graph of distortion aberration of a camera lens shown in FIG. 9;

REFERENCE NUMERALS

10: housing; 11: bezel; 12: rear cover; 20: camera decorative cover; 21: transparent window; 30: camera module; 301: camera lens; 302: image sensor; 40: mainboard; and 50: assembly opening; and 1: drive cavity; 2: optical cavity; 3: light exit surface; 4: permanent magnet; and 5: coil.

DETAILED DESCRIPTION OF ILLUSTRATIVE EMBODIMENTS

Figure 1:
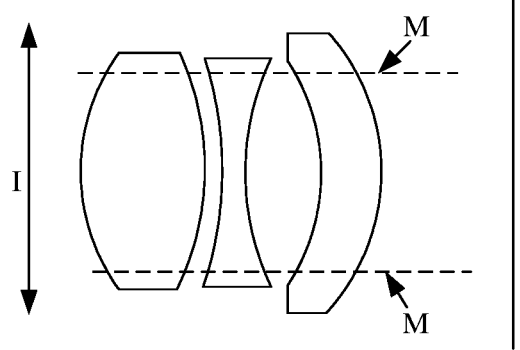
FIG. 1 is a schematic diagram of a structure of a camera lens in the conventional technology.
Figure 2:
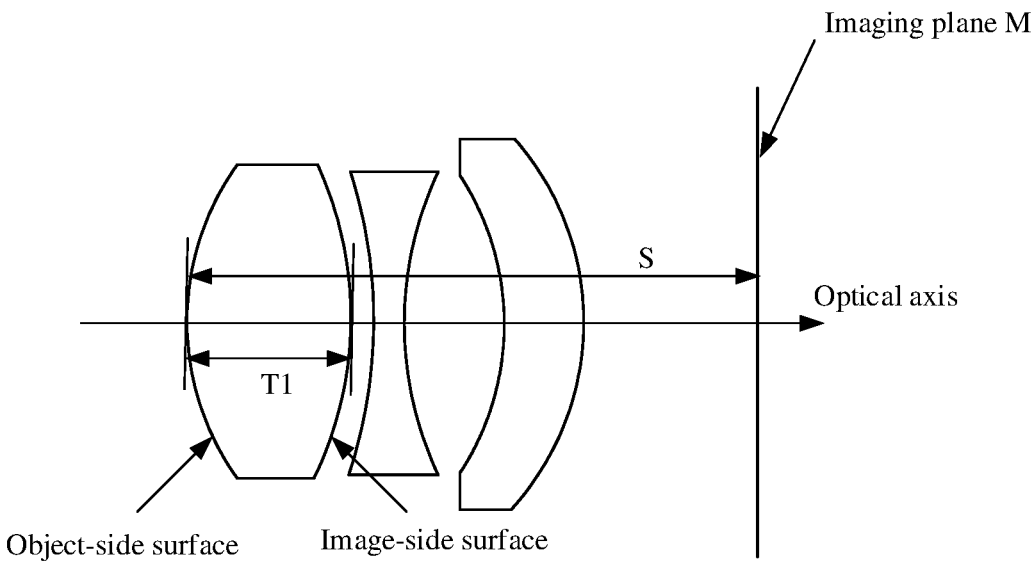
FIG. 2 is a schematic diagram of a partial structure of a camera lens.

For ease of understanding technical solutions, the following explains technical terms in this application with reference to FIG. 2.

Image-side surface and object-side surface: The image-side surface and the object-side surface are ranges in which an imaging ray passes. The imaging ray includes a chief ray and a marginal ray. The image-side surface is a surface facing an image field, and the object-side surface is a surface facing an object field.

Focal power: The focal power is equal to a difference between an image-side beam convergence degree and an object-side beam convergence degree, and represents a capability of an optical system to deflect incident parallel beams. The focal power is usually denoted as $\varphi$. A larger value of $\varphi$ indicates stronger refraction for parallel beams. When $\varphi$ is greater than 0, deflection is convergent. When $\varphi$ is less than 0, deflection is divergent. When $\varphi$ is equal to 0, planar refraction occurs. To be specific, axially parallel beams are still axially parallel beams after being refracted, without deflection.

Image height: A height of an image formed by a camera lens on an imaging plane is referred to as an image height, which is usually denoted as an IMH.

Thickness of a lens: A thickness of a lens on an optical axis is a thickness of the lens. As shown in FIG. 2, a thickness of a $1^{st}$ lens is T1.

Total track length (TTL): A length, on an optical axis, from an object-side surface of a $1^{st}$ optical element facing an object side in a camera lens to an imaging plane is a total track length. As shown in FIG. 2, a length S, on an optical axis, from an object-side surface of the $1^{st}$ lens to an imaging plane M is a TTL.

Aperture stop: The aperture stop is an apparatus for controlling an amount of light that enters a photosensitive surface of a camera through a camera lens. A size of the aperture stop is usually represented in an F/value form, for example, F/1.0.

The following describes in detail technical solutions in embodiments of this application with reference to accompanying drawings.

An embodiment of this application provides an electronic device. The electronic device includes a camera module having image shooting and video recording functions. The electronic device may include a mobile phone, a tablet computer (pad), an intelligent wearable product (for example, a smartwatch or a smart band), a monitor, an event data recorder, or the like. A specific form of the electronic device is not particularly limited in this embodiment of this application.

Figure 3A:
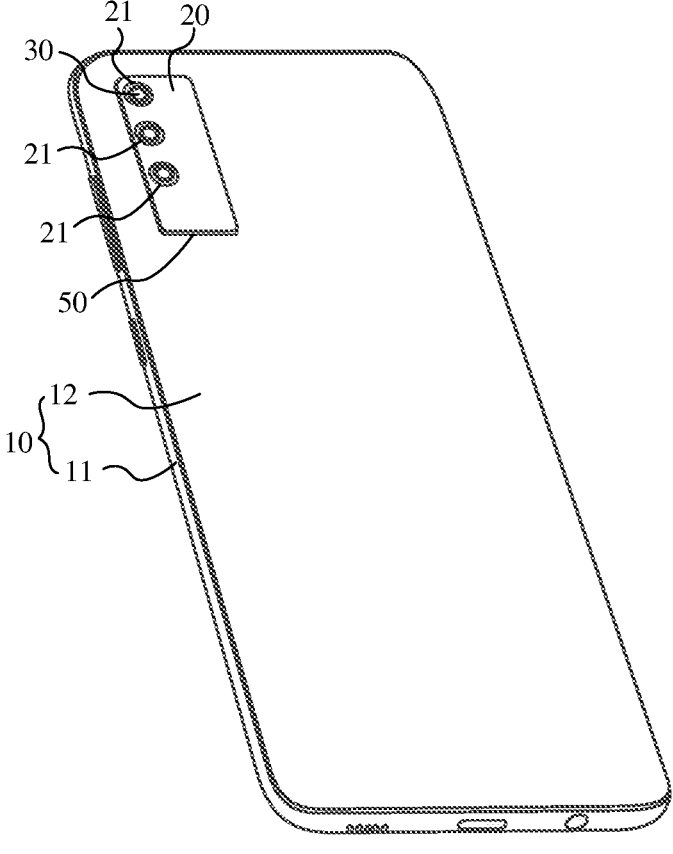
FIG. 3a is a schematic diagram of a structure of an electronic device according to an embodiment of this application.
Figure 3B:
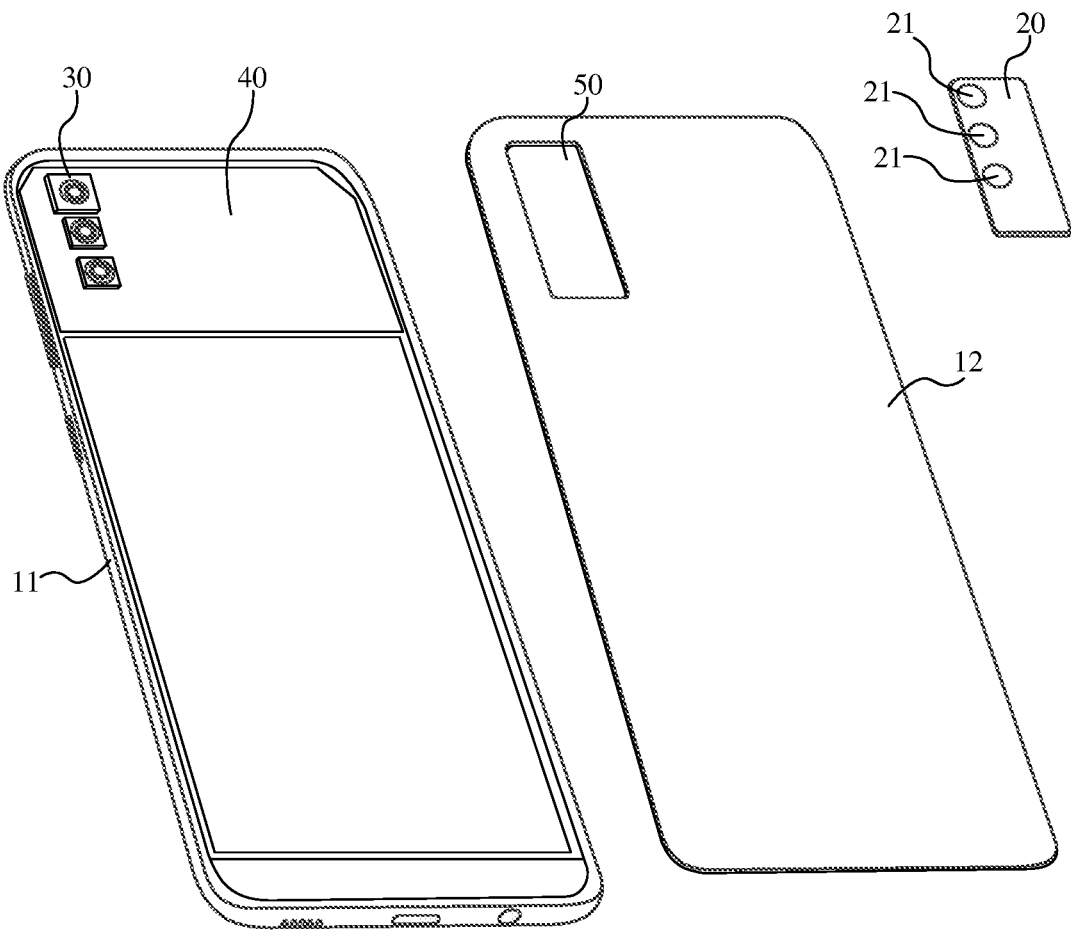

FIG. 3a is a three-dimensional diagram of an electronic device according to some embodiments of this application. FIG. 3b is an exploded view of the electronic device shown in FIG. 3a. In this embodiment, for example, the electronic device is a mobile phone. The electronic device includes a housing 10, a camera decorative cover 20, a camera module 30, and a mainboard 40.

The housing 10 is a housing structure formed by splicing a front cover (not shown in the figure), a bezel 11, and a rear cover 12, and is configured to protect internal electronic components and circuits of the electronic device.

An assembly opening 50 is provided on the rear cover 12. The camera decorative cover 20 covers the assembly opening 50, and the camera decorative cover 20 is configured to protect a rear-facing camera module of the electronic device. In some embodiments, the camera decorative cover 20 protrudes out of the housing 10. In this way, the camera decorative cover 20 can increase assembly space for the rear-facing camera module in the electronic device along a thickness direction of the electronic device. In some other implementations, the camera decorative cover 20 may alternatively not protrude out of the housing 10.

At least one transparent window 21 is provided on the camera decorative cover 20. The at least one transparent window 21 is configured to allow object light to enter the rear-facing camera module.

The camera module 30 is disposed in the housing 10, and the camera module 30 is configured to take a photo or record a video. There may be one or more camera modules 30 in the electronic device. When there is one camera module 30, the camera module 30 may serve as a front-facing camera module, or may serve as a rear-facing primary camera module or a rear-facing secondary camera module. The rear-facing secondary camera module includes but is not limited to a wide-angle camera module, a long-focus camera module, and the like. This is not specifically limited herein. When there are a plurality of camera modules 30, the plurality of camera modules 30 may respectively serve as a plurality of camera modules of a front-facing camera module, a rear-facing primary camera module, and a rear-facing secondary camera module. FIG. 3a and FIG. 3b show only an example in which there is one camera module 30 and the camera module 30 serves as a rear-facing primary camera module. This shall not be construed as a special limitation on this application.

Figure 4:
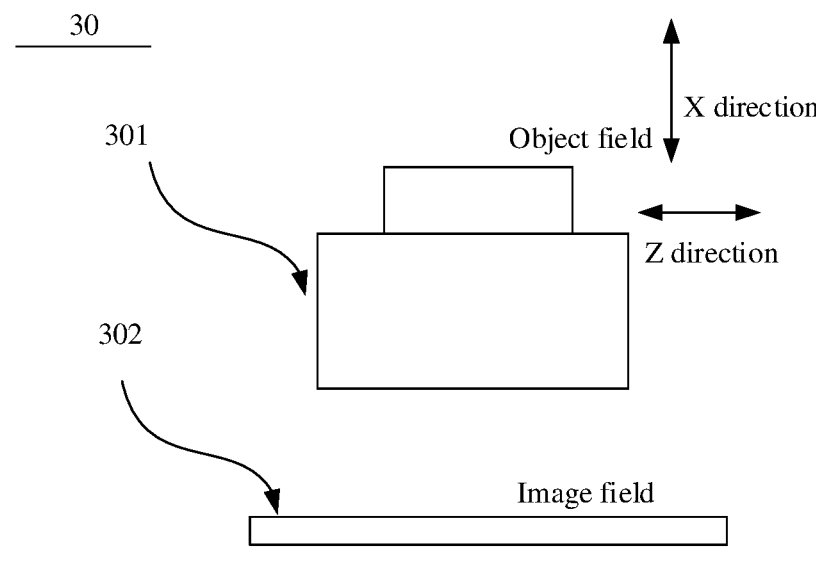
FIG. 4 is a schematic diagram of a structure of a camera module according to an embodiment of this application.

With reference to FIG. 4, the camera module 30 includes a camera lens 301 and an image sensor 302. A photosensitive surface of the image sensor 302 is opposite to an imaging plane of the camera lens 301. A processing unit connected to the image sensor 302 is integrated into the mainboard. An optical image generated by the camera lens 301 for an object in an object field is projected to the photosensitive surface of the image sensor 302 and then converted into an electrical signal. Then the electrical signal is converted into a digital image signal through analog-to-digital conversion, and the digital image signal is sent to a processor for processing. Then a processed signal is transmitted to a display (for example, a mobile phone screen). In this way, the image can be seen.

The camera lens 301 includes a plurality of lenses disposed along an optical axis, and a tube carrying the lenses. With a miniaturization and thinning design of a camera module, for example, with reference to FIG. 4, a size of the camera lens 301 along a height direction (for example, a Z direction in FIG. 4) becomes increasingly small, and a size of the camera lens 301 along a length direction (for example, an X direction in FIG. 4) becomes increasingly small, that is, a total track length of the camera lens becomes increasingly small. In addition, a camera lens that can implement a long focal length is increasingly popular, and a requirement for imaging quality and a magnification ratio is also increasingly high.

The following describes in detail a camera lens provided in this application with reference to accompanying drawings.

Figure 5:
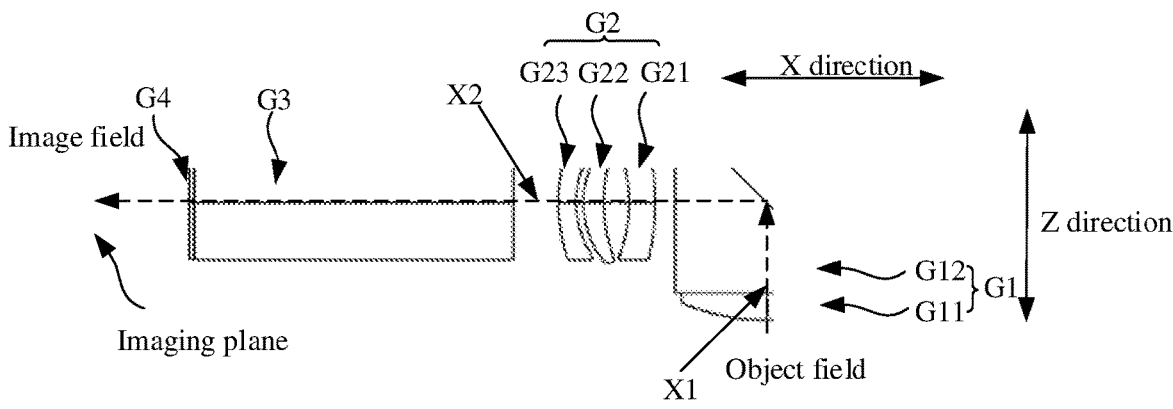
FIG. 5 is a schematic diagram of a structure of a camera lens according to an embodiment of this application.

FIG. 5 is a diagram of a structure of a camera lens. Along a direction from an object field to an image field, the camera lens includes a first lens G11 having positive focal power, a prism G12, and a lens group G2 including a plurality of lenses. The prism G12 refracts, from a first optical axis X1 to a second optical axis X2 intersecting the first optical axis X1, light received from the first lens G11. In addition, an object-side surface of the first lens G11 is a convex surface, and an image-side surface of the first lens G11 is in contact with an object-side surface of the prism G12. The first lens G11 and the prism G12 herein form a refractive prism group G1.

The first lens G11 whose object-side surface is a convex surface converges light received from the object field and transmits the light to the prism G12. Then the prism G12 refracts the light converged by the first lens G11 from the first optical axis X1 to the second optical axis X2, to provide a bent optical axis for the entire camera lens. In this way, compared with an I-cut process in the conventional technology, a size of the camera lens along a Z direction can be reduced, and an amount of light entering the camera lens can also be ensured, to ensure imaging quality. Because the size of the camera lens along the Z direction can be reduced, a size of an entire camera module along the Z direction can be reduced.

Herein, the first lens G11 may be attached to the prism G12 in a plurality of manners. In some implementations, the prism G12 is made of a glass material, the first lens G11 is made of a plastic (plastic) material, and the first lens G11 may be attached to the prism G12 through a bonding layer. In some other implementations, both the prism G12 and the first lens G11 are made of a plastic material, and may be prepared by using an integral molding process, for example, an injection molding process. In some other implementations, both the prism G12 and the first lens G11 are made of a glass material, and may be prepared by using an integral molding process.

In this application, the first optical axis X1 may be perpendicular to the second optical axis X2, for example, as shown in FIG. 5. Certainly, there may be another included angle between the first optical axis X1 and the second optical axis X2. A deflection angle of the bent optical axis is not limited in this application.

In addition, in the camera lens provided in this embodiment of this application, a total focal length f of the camera lens is as follows: 14 mm≤f≤33 mm. In this way, light convergence and imaging quality can be improved, and imaging quality is good even in a long-focus scenario.

In some optional implementations, a ratio of an Abbe number V1 of the first lens G11 to an Abbe number V2 of the prism G12 is as follows:

$$\left|\frac{V1}{V2}\right| \leq 3.$$

Still with reference to FIG. 5, the lens group G2 including the plurality of lenses includes at least three lenses, and the plurality of lenses are sequentially disposed along the second optical axis X2. In addition, an image-side surface of a lens, in the lens group G2, that is close to the image field of the camera lens is a convex surface.

Figure 6:
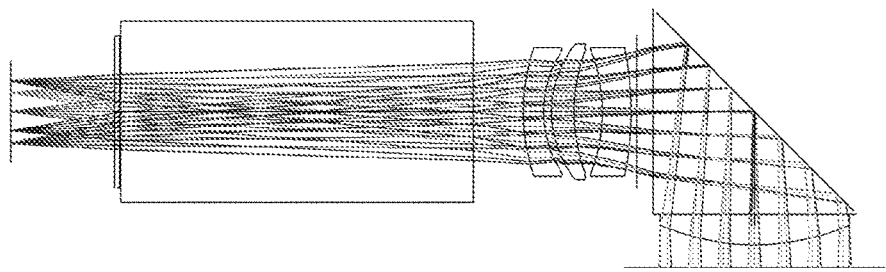
FIG. 6 is a diagram of an optical imaging path of a camera lens shown in FIG. 5.

FIG. 5 shows an example in which the lens group G2 includes three lenses sequentially disposed along the second optical axis X2. The three lenses are a second lens G21, a third lens G22, and a fourth lens G23. An image-side surface of the fourth lens G23 is a convex surface. FIG. 6 is a diagram of an optical path corresponding to FIG. 5. The image-side surface of the lens, in the lens group G2, that is close to the image field of the camera lens is designed as a convex surface, so that light transmitted through the lens group G2 can be converged, to improve imaging quality.

In addition, both an object-side surface and an image-side surface of a lens, in the lens group G2, that is close to the prism G12 are aspheric (ASP) surfaces. The aspheric surface enables the lens to be made into a shape other than a spherical surface, to obtain a large quantity of control variables. This can reduce aberration and improve imaging quality, and can further reduce a quantity of lenses required, so that a total track length can be effectively reduced.

At least one lens in the lens group G2 in the camera lens provided in this application is a diffractive optical element (DOE). In this way, an optical path of light entering the DOE can be changed, so that light within different wavelength ranges is converged to a same intersection point. In this way, chromatic aberration of the prism G12 in a meridional direction (the T direction) and a sagittal direction (the S direction) is corrected, to optimize imaging quality and reduce the total track length.

The camera lens provided in this application further includes at least one zoom liquid lens, and the lens group G2 may include a first zoom liquid lens. In some other implementations, a second zoom liquid lens may be disposed on a side of the first lens G11 that is close to the object field.

Figure 7:
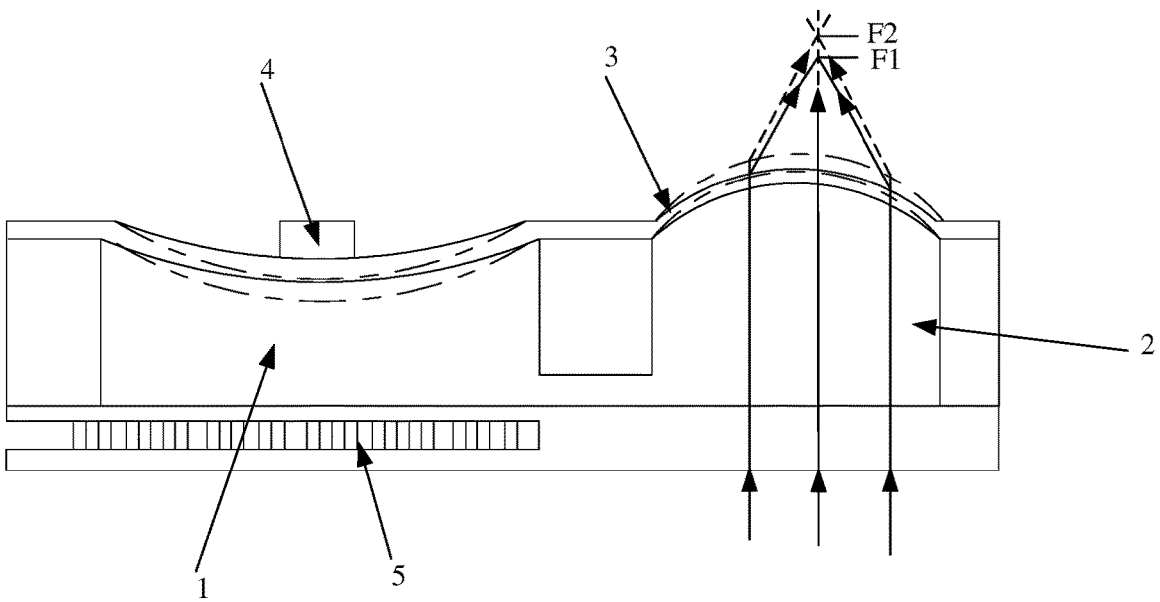
FIG. 7 is a schematic diagram of a zoom principle of a zoom liquid lens according to an embodiment of this application.

FIG. 7 is a schematic diagram of a structure of a zoom liquid lens. The zoom liquid lens includes a drive cavity 1 and an optical cavity 2 that are connected. To be specific, liquid in the drive cavity 1 and liquid in the optical cavity 2 can flow between the two cavities. When the liquid in the optical cavity 2 changes, surface tension of a light exit surface 3 changes, and therefore curvature of the light exit surface 3 changes. A permanent magnet 4 and a coil 5 form a driving source, to drive the liquid in the optical cavity 2 and the liquid in the drive cavity 1 to flow between the cavities.

An operating principle of the zoom liquid lens shown in FIG. 7 may be explained as follows: For example, at a first moment, after a first current is supplied to the coil 5, a magnetic field generated by the coil 5 is different from a magnetic field generated by the permanent magnet 4, and the permanent magnet 4 is attracted to move downward, so that a size of the drive cavity 1 decreases, and the liquid in the drive cavity 1 flows to the optical cavity 2. In this case, the light exit surface 3 is deformed to form first curvature (indicated by a solid line), and a focal length of the zoom liquid lens is F1. At a second moment, after a second current is supplied to the coil 5, a magnetic field generated by the coil 5 is different from a magnetic field generated by the permanent magnet 4, and the permanent magnet 4 is attracted to move downward, so that a size of the drive cavity 1 decreases, and the liquid in the drive cavity 1 flows to the optical cavity 2. In this case, the light exit surface 3 is deformed to form second curvature (indicated by a dashed line), and a focal length of the zoom liquid lens is F2.

The zoom liquid lens is disposed in the camera lens, so that a total focal length of the camera lens can be changed for zooming. In this way, the camera lens can be used in a long-focus scenario and a short-focus scenario.

In addition, the camera lens further includes an aperture stop. The aperture stop is disposed on a side of the first lens G11 that is close to the object field, and an amount of light entering the camera lens is controlled by using the aperture stop.

In some optional implementations, the camera lens may further include an IR filter, and the IR filter can reduce or eliminate interference of environmental noise on the image sensor.

The following describes an embodiment of a camera lens in which a lens group G2 includes three lenses, an embodiment of a camera lens in which a lens group G2 includes four lenses, and an embodiment of a camera lens in which a lens group G2 includes five lenses.

In a camera lens shown in FIG. 5, a lens group G2 includes three lenses. The three lenses are a second lens G21, a third lens G22, and a fourth lens G23 that are sequentially disposed along a second optical axis X2. An object-side surface of the second lens G21 is opposite to an image-side surface of a prism G12. An image-side surface of the fourth lens G23 is a convex surface, and an object-side surface of the fourth lens G23 is a concave surface. In addition, the camera lens further includes flat glass G3. In addition, the camera lens may further include an IR filter G4. The flat glass G3 is disposed on the image-side surface of the fourth lens G23, and the IR filter G4 is disposed on an image-side surface of the flat glass G3. The image-side surface of the fourth lens G23 is a convex surface, and the object-side surface of the fourth lens G23 is a concave surface.

A ratio of a focal length f1 of a refractive prism group G1 to a total focal length f of the camera lens is as follows:

$$\left| \frac{f1}{f} \right| = 0.538.$$

The second lens G21 has negative focal power, and a ratio of a focal length f2 of the second lens G21 to the total focal length f of the camera lens is as follows:

$$\left| \frac{f2}{f} \right| = 0.803.$$

The third lens G22 has positive focal power, and a ratio of a focal length f3 of the third lens G22 to the total focal length f of the camera lens is as follows:

$$\left| \frac{f3}{f} \right| = 0.595.$$

The fourth lens G23 has negative focal power, and a ratio of a focal length f4 of the fourth lens G23 to the total focal length f of the camera lens is as follows:

$$\left| \frac{f4}{f} \right| = 0.532.$$

In addition, a ratio of a total track length (total track length, TTL) of the camera lens to the total focal length f of the camera lens is as follows:

$$\frac{TTL}{f} = 1.02.$$

A ratio of an image height of the camera lens to the total focal length f of the camera lens is as follows:

$$\frac{IMH}{f} = 0.088.$$

Table 1-1 shows optical parameters of the camera lens.

TABLE 1-1

| | Optical parameter |
|---|---|
| System focal length (F) | 28.17 mm |
| Aperture number (F/#) | 3.79 |
| Image height (IMH) | 2.5 mm |
| Total track length (TTL) | 29.26 mm |
| Designed wavelength | 650 nm, 610 nm, 555 nm, 510 nm, and 470 nm |

Table 1-2 shows optical parameters of optical components in the camera lens.

Radius indicates a curvature radius, Thickness indicates a thickness of the lens, nd indicates a refractive index of the lens, vd indicates an Abbe number of the lens, Infinity indicates that the curvature radius is infinite, R1 in G1 indicates an object-side surface of the first lens G11, R2 in G1 indicates an image-side surface of the first lens G11, A-01 in G1 indicates an object-side surface of the prism G12, B-03 in G1 indicates a reflective surface of the prism G12, C-02 in G1 indicates an image-side surface of the prism G12, R1 in each remaining lens is an object-side surface of the corresponding lens, and R2 in each remaining lens is an image-side surface of the corresponding lens.

TABLE 1-2

| | | Radius | | Thickness | | nd | | vd |
|---|---|---|---|---|---|---|---|---|
| G1 | R1 | 9.4 | d1 | 1.2 | n1 | 1.618 | v1 | 63.85 |
| | R2 | Infinity | d2 | 0 | | | | |
| | A-01 | Infinity | d3 | 4 | n2 | 1.90 | v2 | 31.05 |
| | B-03 | Infinity | d4 | 4 | | | | |
| | C-02 | Infinity | d5 | 0 | | | | |
| G21 | R1 | −10.224 | d6 | 1.133 | n1 | 1.76 | v1 | 49.64 |
| | R2 | −6.137 | d7 | 1.118 | | | | |
| G22 | R1 | 6.802 | d8 | 0.876 | n1 | 1.603 | v1 | 65.45 |
| | R2 | 4.267 | d9 | 0.313 | | | | |
| G23 | R1 | 4.347 | d10 | 0.8 | n1 | 1.74 | v1 | 27.76 |
| | R2 | 7.672 | d11 | 1.964 | | | | |
| G3 | R1 | Infinity | d12 | 13.903 | n1 | 1.90 | v1 | 37.05 |
| | R2 | Infinity | d13 | 0.03 | | | | |
| G4 | R1 | Infinity | d14 | 0.193 | n1 | 1.51 | v1 | 64.21 |
| | R2 | Infinity | d15 | 4.078 | | | | |

Table 1-3 shows aspheric coefficients of the lenses in Table 1-2.

K is a quadric surface constant, and $A_2, A_3, A_4, A_5, A_6, A_7$, and $A_8$ are a second-order aspheric coefficient, a third-order aspheric coefficient, a fourth-order aspheric coefficient, a fifth-order aspheric coefficient, a sixth-order aspheric coefficient, a seventh-order aspheric coefficient, and an eighth-order aspheric coefficient respectively.

TABLE 1-3

| | | Type | K | A2 | A3 | A4 | A5 | A6 | A7 | A8 |
|---|---|---|---|---|---|---|---|---|---|---|
| G21 | R1 | Even-order aspheric surface | 0.0 | 9.85E−04 | −5.55E−06 | −1.96E−05 | 2.02E−05 | −6.30E−06 | 8.94E−07 | −4.82E−08 |
| | R2 | Even-order aspheric surface | 0.0 | 9.64E−04 | −1.17E−04 | 6.14E−05 | −6.56E−06 | −2.20E−06 | 7.44E−07 | −6.15E−08 |

It can be learned from Table 1-3 that the camera lens provided in this embodiment includes two aspheric surfaces that are even-order aspheric surfaces. In this embodiment, vector heights Z of all even-order aspheric surfaces may be defined by using the following formula, but are not limited to the following formula:

$$Z = \frac{CX^2}{1 + \sqrt{1 - KC^2X^2}} + A_2r^4 + A_3r^6 + A_4r^8 + A_5r^{10} + A_6r^{12},$$

where

Z indicates a vector height of an aspheric surface, r indicates a radial coordinate of the aspheric surface, and C indicates vertex curvature of the aspheric surface.

Figure 8A:
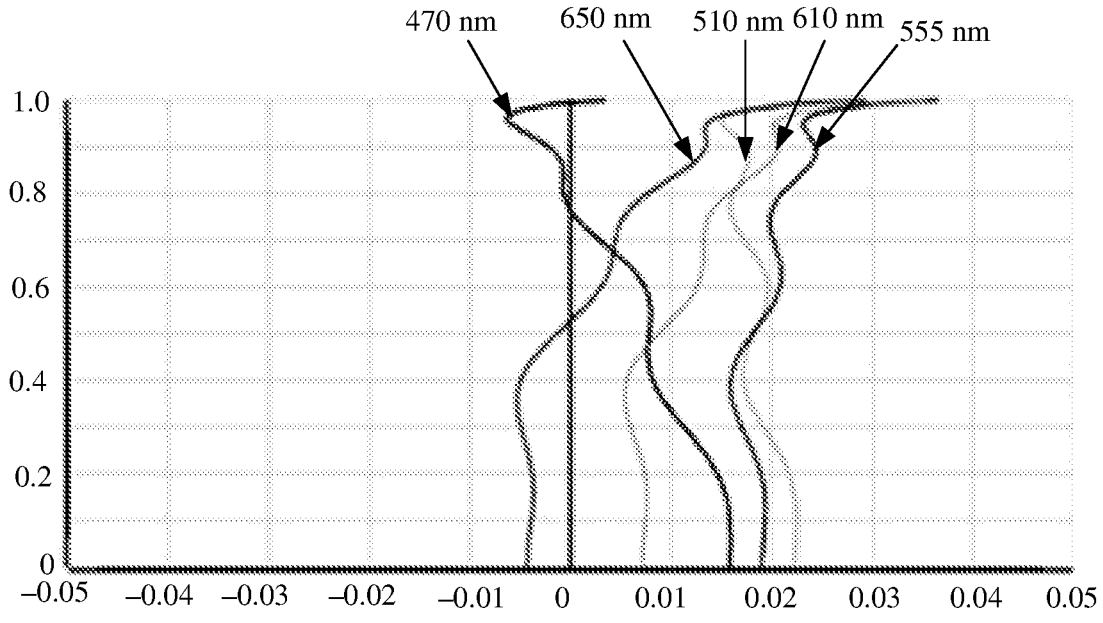
FIG. 8a is a line graph of axial aberration of a camera lens shown in FIG. 5.

FIG. 8a shows curves of axial aberration in the structure of the camera lens shown in FIG. 5 based on the data shown in Table 1-1, Table 1-2, and Table 1-3. In FIG. 8a, a horizontal coordinate indicates axial aberration, which may be measured in micrometers (μm); and a vertical coordinate indicates a field of view, which may be measured in degrees. Five curves shown in FIG. 8a are curves of axial aberration corresponding to designed wavelengths of 650 nm, 610 nm, 555 nm, 510 nm, and 470 nm respectively. It can be learned from FIG. 8a that axial aberration of light with different wavelengths is controlled within −0.1 μm to 0.1 μm, that is, controlled within a quite small range.

Figure 8B:
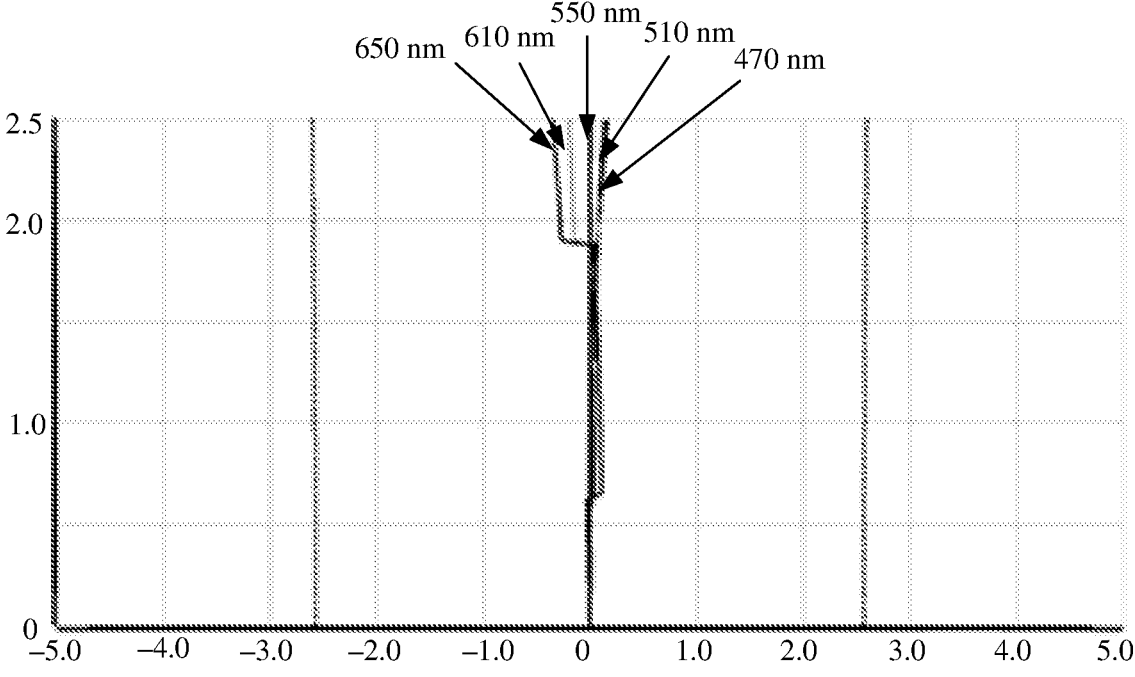
FIG. 8b is a line graph of lateral aberration of a camera lens shown in FIG. 5.

FIG. 8b shows curves of lateral aberration in the structure of the camera lens shown in FIG. 5 based on the data shown in Table 1-1, Table 1-2, and Table 1-3. In FIG. 8b, a horizontal coordinate indicates lateral aberration, and a vertical coordinate indicates a field of view. Five curves shown in FIG. 8b are curves of lateral aberration corresponding to designed wavelengths of 650 nm, 610 nm, 555 nm, 510 nm, and 470 nm respectively, and a dashed line indicates a diffraction limit range. It can be learned from FIG. 8b that lateral aberration of light with different wavelengths is within the diffraction limit range.

Figure 8C:
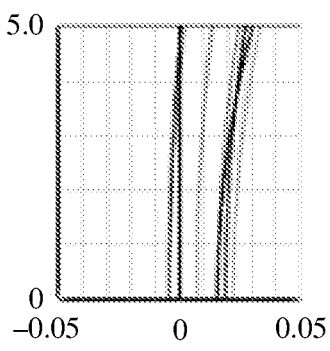
FIG. 8c is a line graph of distortion aberration of a camera lens shown in FIG. 5.
Figure 8D:
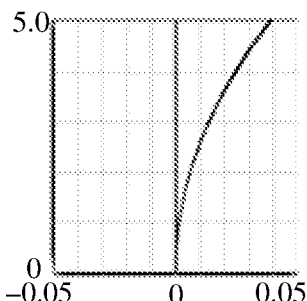
FIG. 8d is a line graph of ideal distortion aberration of a camera lens shown in FIG. 5.

FIG. 8c shows curves of distortion aberration in the structure of the camera lens shown in FIG. 5 based on the data shown in Table 1-1, Table 1-2, and Table 1-3. FIG. 8d shows a curve of ideal distortion aberration. In FIG. 8c and FIG. 8d, a horizontal coordinate indicates distortion aberration, and a vertical coordinate indicates a field of view. It can be learned through comparison between FIG. 8c and FIG. 8d that distortion aberration of light with different wavelengths is within a range recognizable to naked eyes. This may be understood as follows: As shown in FIG. 8d, the ideal distortion aberration is approximately 0.05 μm. As shown in FIG. 8c, distortion aberration of light with different wavelengths is controlled to be less than 0.01 μm, where 0.01 μm herein is obtained by 0.05 μm×2%. That is, the distortion aberration of the light with different wavelengths is controlled to be less than 2% of the ideal distortion aberration.

Figure 9:
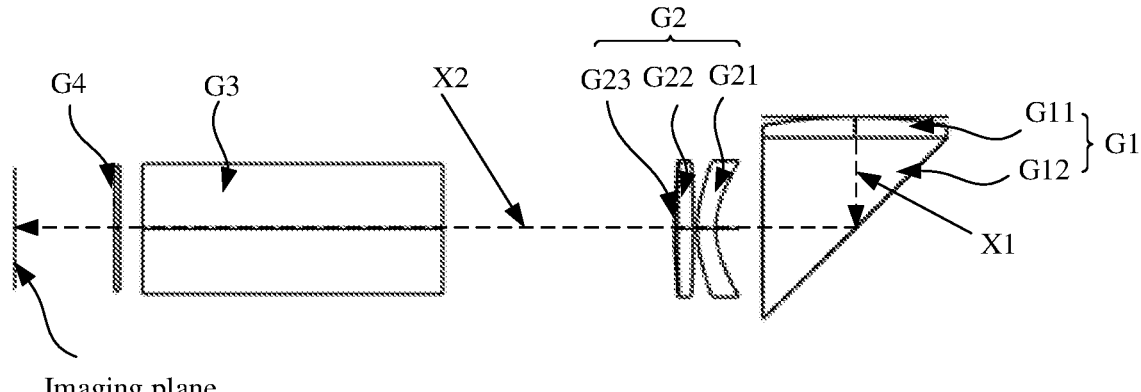
FIG. 9 is a schematic diagram of a structure of a camera lens according to an embodiment of this application.

FIG. 9 is a diagram of a structure of another camera lens. A lens group G2 includes three lenses, and the three lenses are a second lens G21, a third lens G22, and a fourth lens G23 that are sequentially disposed along a second optical axis X2. In addition, the camera lens further includes flat glass G3. In addition, the camera lens may further include an IR filter G4.

In addition, the fourth lens G23 is a DOE, an image-side surface of the fourth lens G23 is a convex surface, and an object-side surface of the fourth lens G23 is a concave surface. In some optional implementations, the object-side surface of the fourth lens G23 is in contact with the third lens G22.

A ratio of a focal length f1 of a refractive prism group G1 to a total focal length f of the camera lens is as follows:

$$\left| \frac{f1}{f} \right| = 0.954.$$

The second lens G21 has negative focal power, and a ratio of a focal length f2 of the second lens G21 to the total focal length f of the camera lens is as follows:

$$\left| \frac{f2}{f} \right| = 0.609.$$

The third lens G22 has positive focal power, and a ratio of a focal length f3 of the third lens G22 to the total focal length f of the camera lens is as follows:

$$\left| \frac{f3}{f} \right| = 2.12.$$

The fourth lens G23 has positive focal power, and a ratio of a focal length f4 of the fourth lens G23 to the total focal length f of the camera lens is as follows:

$$\left| \frac{f4}{f} \right| = 0.883.$$

A ratio of a total track length (total track length, TTL) of the camera lens to the total focal length f of the camera lens is as follows:

$$\frac{TTL}{f} = 1.27.$$

A ratio of an image height of the camera lens to the total focal length f of the camera lens is as follows:

$$\frac{IMH}{f} = 0.095.$$

Table 2-1 shows optical parameters of the camera lens.

TABLE 2-1

| | Optical parameter |
|---|---|
| System focal length (F) | 28.37 mm |
| Aperture number (F/#) | 4.07 |
| Image height (IMH) | 2.7 mm |
| Total track length (TTL) | 36.37 mm |
| Designed wavelength | 650 nm, 610 nm, 555 nm, 510 nm, and 470 nm |

Table 2-2 shows optical parameters of optical components in the camera lens. A physical meaning represented by each optical parameter is the same as that in Table 1-2. Details are not described herein again.

TABLE 2-2

| | | Radius | | Thickness | | nd | | vd |
|---|---|---|---|---|---|---|---|---|
| G1 | R1 | 23.158 | d1 | 0.906 | n1 | 1.851 | v1 | 40.104 |
| | R2 | Infinity | d2 | 0 | | | | |
| | A-01 | Infinity | d3 | 4 | n2 | 1.90 | v2 | 37.05 |
| | B-03 | Infinity | d4 | 4 | | | | |
| | C-02 | Infinity | d5 | 2.008 | | | | |
| G21 | R1 | 3.453 | d6 | 0.799 | n1 | 1.639 | v1 | 23.157 |
| | R2 | 5.460 | d7 | 0.175 | | | | |
| G22 | R1 | −49.357 | d8 | 0.679 | n1 | 1.729 | v1 | 54.673 |
| G23 | R1 | 49.357 | d9 | 0.159 | n1 | 1.689 | v1 | 36.69 |
| | R2 | 18.169 | d10 | 10 | | | | |
| G3 | R1 | Infinity | d12 | 13 | n1 | 1.77 | v1 | 49.61 |
| | R2 | Infinity | d13 | 1 | | | | |
| G4 | R1 | Infinity | d14 | 0.21 | n1 | 1.51 | v1 | 64.21 |
| | R2 | Infinity | d15 | 4.321 | | | | |

Table 2-3 shows aspheric coefficients of the lenses in Table 2-2. An image-side surface and an object-side surface of the second lens G21 each are an even-order aspheric surface. The object-side surface of the fourth lens G23 is a binary 2 (Binary 2) diffractive surface, and the image-side surface of the fourth lens G23 is an even-order aspheric surface.

TABLE 2-3

| | | Type | K | A2 | A3 | A4 | A5 | A6 | A7 | A8 |
|---|---|---|---|---|---|---|---|---|---|---|
| G21 | R1 | Even-order aspheric surface | 0.0 | −9.87E−03 | 5.02E−04 | −7.07E−05 | 7.72E−06 | −9.29E−07 | 6.38E−08 | −2.51E−09 |
| | R2 | Even-order aspheric surface | 0.0 | −4.95E−03 | 3.30E−04 | −1.39E−05 | 1.30E−07 | 4.92E−08 | −8.72E−09 | 4.43E−10 |
| G23 | R2 | Even-order aspheric surface | 0.0 | −1.10E−03 | 4.68E−05 | −1.29E−05 | 1.54E−06 | 1.54E−06 | −7.64E−08 | 1.28E−09 |

Table 2-4 shows a diffractive coefficient of the object-side surface of the fourth lens G23 in Table 2-3.

TABLE 2-4

| | Binary 2 | | | | |
|---|---|---|---|---|---|
| | Diffraction order (Diffract Order) | Norm radius (Norm Radius) | Quadratic term coefficient (coeff. on p^2) | Quartic term coefficient (coeff. on p^4) | Sextic term coefficient (coeff. on p^6) | Octic term coefficient (coeff. on p^8) |
| G4 R1 | 1 | 3 | −51.78 | 53.51 | −80.19 | 31.50 |

It can be learned from Table 2-3 that the camera lens provided in this embodiment includes three even-order aspheric surfaces. In this embodiment, vector heights z of all even-order aspheric surfaces may also be defined by using the following formula, but are not limited to the following formula:

$$Z = \frac{CX^2}{1 + \sqrt{1 - KC^2 X^2}} + A_2 r^4 + A_3 r^6 + A_4 r^8 + A_5 r^{10} + A_6 r^{12},$$

where

Z indicates a vector height of an aspheric surface, r indicates a radial coordinate of the aspheric surface, and C indicates vertex curvature of the aspheric surface.

In this embodiment, a vector height Z2 of the binary 2 diffractive surface may be defined by using the following formula:

$$Z2 = \frac{Cr^2}{1 + \sqrt{1 - KC^2 r^2}} + \sum_{t-1}^{8} a_j r^{2i} + M \sum_{J-1}^{N} A_j p^{2j},$$

where

M indicates a diffraction order, P indicates a phase distribution power, A indicates a phase distribution coefficient, C indicates vertex curvature of an aspheric surface, and r indicates a radial coordinate of the aspheric surface.

Figure 10A:
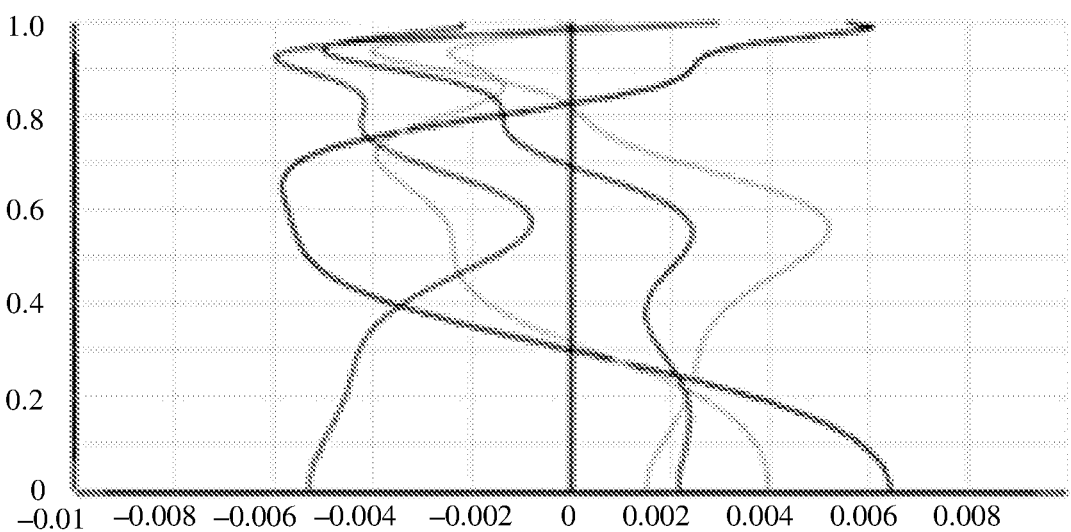
FIG. 10a is a line graph of axial aberration of a camera lens shown in FIG. 9.

FIG. 10a shows curves of axial aberration in the structure of the camera lens shown in FIG. 9 based on the data shown in Table 2-1, Table 2-2, Table 2-3, and Table 2-4. Five curves shown in FIG. 10a are curves of axial aberration corresponding to designed wavelengths of 650 nm, 610 nm, 555 nm, 510 nm, and 470 nm respectively. It can be learned from FIG. 10a that axial aberration of light with different wavelengths is controlled within a quite small range.

Figure 10B:
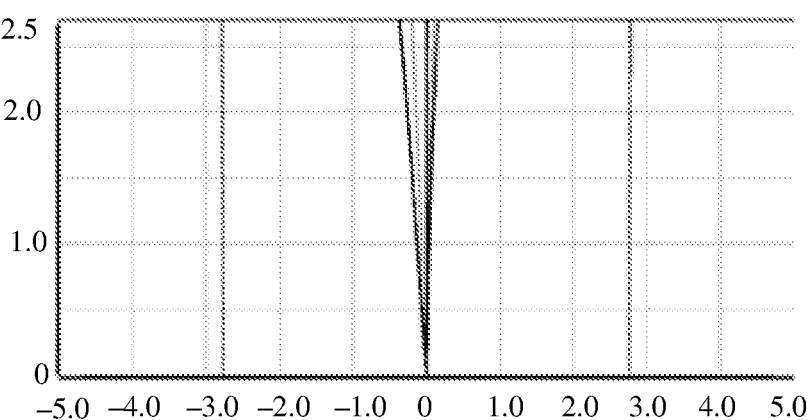
FIG. 10b is a line graph of lateral aberration of a camera lens shown in FIG. 9.

FIG. 10b shows curves of lateral aberration in the structure of the camera lens shown in FIG. 9 based on the data shown in Table 2-1, Table 2-2, Table 2-3, and Table 2-4. Five curves shown in FIG. 10b are curves of lateral aberration corresponding to designed wavelengths of 650 nm, 610 nm, 555 nm, 510 nm, and 470 nm respectively, and a dashed line indicates a diffraction limit range. It can be learned from FIG. 10b that lateral aberration of light with different wavelengths is within the diffraction range.

Figure 10C:
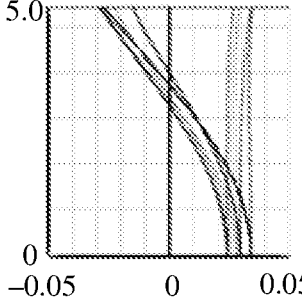
FIG. 10d is a line graph of ideal distortion aberration of a camera lens shown in FIG. 9.
Figure 10D:
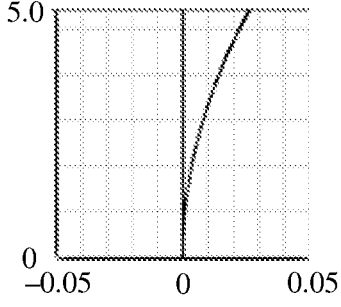

FIG. 10c shows curves of distortion aberration in the structure of the camera lens shown in FIG. 9 based on the data shown in Table 2-1, Table 2-2, Table 2-3, and Table 2-4. FIG. 10d shows a curve of ideal distortion aberration. It can be learned through comparison between FIG. 10c and FIG. 10d that distortion aberration of light with different wavelengths is within a range recognizable to naked eyes.

Figure 11:
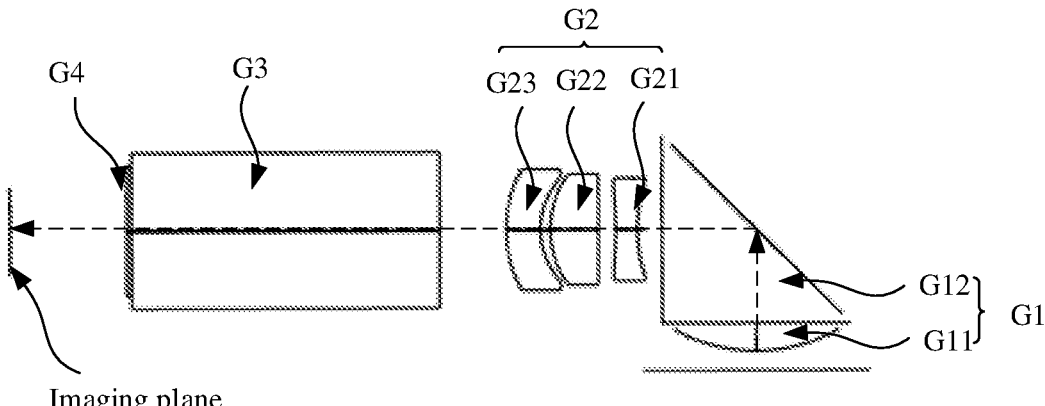
FIG. 11 is a schematic diagram of a structure of a camera lens according to an embodiment of this application.

FIG. 11 is a diagram of a structure of another camera lens. A lens group G2 includes three lenses, and the three lenses are a second lens G21, a third lens G22, and a fourth lens G23 that are sequentially disposed along a second optical axis X2. In addition, the camera lens further includes flat glass G3. In addition, the camera lens may further include an IR filter G4. The flat glass G3 is disposed on the image-side surface of the fourth lens G23, and the IR filter G4 is disposed on an image-side surface of the flat glass G3. The image-side surface of the fourth lens G23 is a convex surface, and an object-side surface of the fourth lens G23 is a concave surface.

A ratio of a focal length f1 of a refractive prism group G1 to a total focal length f of the camera lens is as follows:

$$\left| \frac{f1}{f} \right| = 0.499.$$

The second lens G21 has negative focal power, and a ratio of a focal length f2 of the second lens G21 to the total focal length f of the camera lens is as follows:

$$\left| \frac{f2}{f} \right| = 0.244.$$

The third lens G22 has positive focal power, and a ratio of a focal length f3 of the third lens G22 to the total focal length f of the camera lens is as follows:

$$\left| \frac{f3}{f} \right| = 0.248.$$

The fourth lens G23 has negative focal power, and a ratio of a focal length f4 of the fourth lens G23 to the total focal length f of the camera lens is as follows:

$$\left| \frac{f4}{f} \right| = 0.647.$$

In addition, a ratio of a total track length (total track length, TTL) of the camera lens to the total focal length f of the camera lens is as follows:

$$\frac{TTL}{f} = 1.18.$$

A ratio of an image height of the camera lens to the total focal length f of the camera lens is as follows:

$$\frac{IMH}{f} = 0.087.$$

Table 3-1 shows optical parameters of the camera lens.

TABLE 3-1

| | Optical parameter |
| --- | --- |
| System focal length (F) | 28.58 mm |
| Aperture number (F/#) | 3.84 |
| Image height (IMH) | 2.5 mm |
| Total track length (TTL) | 33.67 mm |
| Designed wavelength | 650 nm, 610 nm, 555 nm, 510 nm, and 470 nm |

Table 3-2 shows optical parameters of optical components in the camera lens.

TABLE 3-2

| | | Radius | | Thickness | | nd | | vd |
|---|---|---|---|---|---|---|---|---|
| G1 | R1 | 7.737 | d1 | 1.279 | n1 | 1.54 | v1 | 55.98 |
| | R2 | Infinity | d2 | 0 | | | | |
| | A-01 | Infinity | d3 | 4.25 | n2 | 1.90 | v2 | 37.05 |
| | B-03 | Infinity | d4 | 4.25 | | | | |
| | C-02 | Infinity | d5 | 1.08 | | | | |
| G21 | R1 | 9.977 | d6 | 0.998 | n1 | 1.76 | v1 | 49.64 |
| | R2 | −12.23 | d7 | 0.766 | | | | |
| G22 | R1 | −238.706 | d8 | 2.188 | n1 | 1.60 | v1 | 65.45 |
| | R2 | 4.35 | d9 | 0.43 | | | | |
| G23 | R1 | 3.607 | d10 | 1.552 | n1 | 1.74 | v1 | 27.76 |
| | R2 | 5.783 | d12 | 3.007 | | | | |
| G3 | R1 | Infinity | d13 | 13.903 | n1 | 1.90 | v1 | 37.05 |
| | R2 | Infinity | d14 | 0.03 | | | | |
| G4 | R1 | Infinity | d15 | 0.193 | n1 | 1.51 | v1 | 64.21 |
| | R2 | Infinity | d16 | 5.264 | | | | |

Table 3-3 shows aspheric coefficients of the lenses in Table 3-2.

TABLE 3-3

| | | Type | K | A2 | A3 | A4 | A5 | A6 | A7 | A8 |
|---|---|---|---|---|---|---|---|---|---|---|
| G21 | R1 | Even-order aspheric surface | 0.0 | 6.10E−03 | −4.86E−04 | 1.24E−04 | −5.23E−05 | 1.52E−05 | −2.28E−06 | 1.41E−07 |
| | R2 | Even-order aspheric surface | 0.0 | 5.78E−03 | −3.56E−04 | −8.84E−06 | 1.28E−05 | −2.00E−06 | 1.33E−07 | −1.01E−09 |

It can be learned from Table 3-3 that the camera lens provided in this embodiment includes two even-order aspheric surfaces. In this embodiment, vector heights of all even-order aspheric surfaces may be defined by using the following formula, but are not limited to the following formula:

$$Z = \frac{CX^2}{1 + \sqrt{1 - KC^2X^2}} + A_2r^4 + A_3r^6 + A_4r^8 + A_5r^{10} + A_6r^{12},$$

Z indicates a vector height of an aspheric surface, r indicates a radial coordinate of the aspheric surface, and C indicates vertex curvature of the aspheric surface.

Figure 12A:
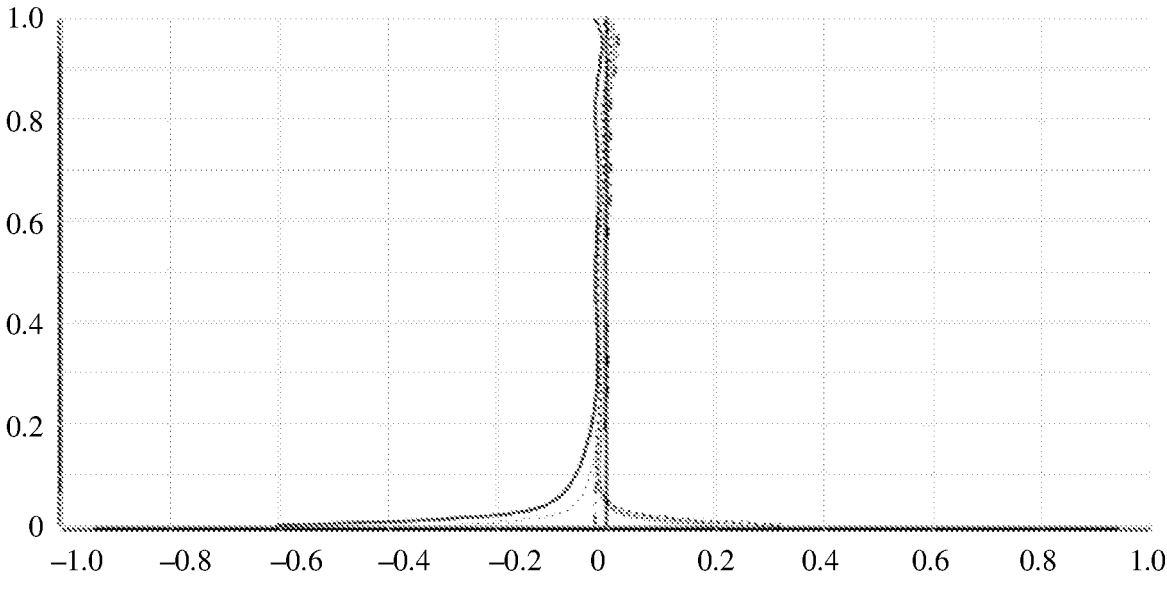
FIG. 12a is a line graph of axial aberration of a camera lens shown in FIG. 11.

FIG. 12a shows curves of axial aberration in the structure of the camera lens shown in FIG. 11 based on the data shown in Table 3-1, Table 3-2, and Table 3-3. Five curves shown in FIG. 12a are curves of axial aberration corresponding to designed wavelengths of 650 nm, 610 nm, 555 nm, 510 nm, and 470 nm respectively. It can be learned from FIG. 12a that axial aberration of light with different wavelengths is controlled within a quite small range.

Figure 12B:
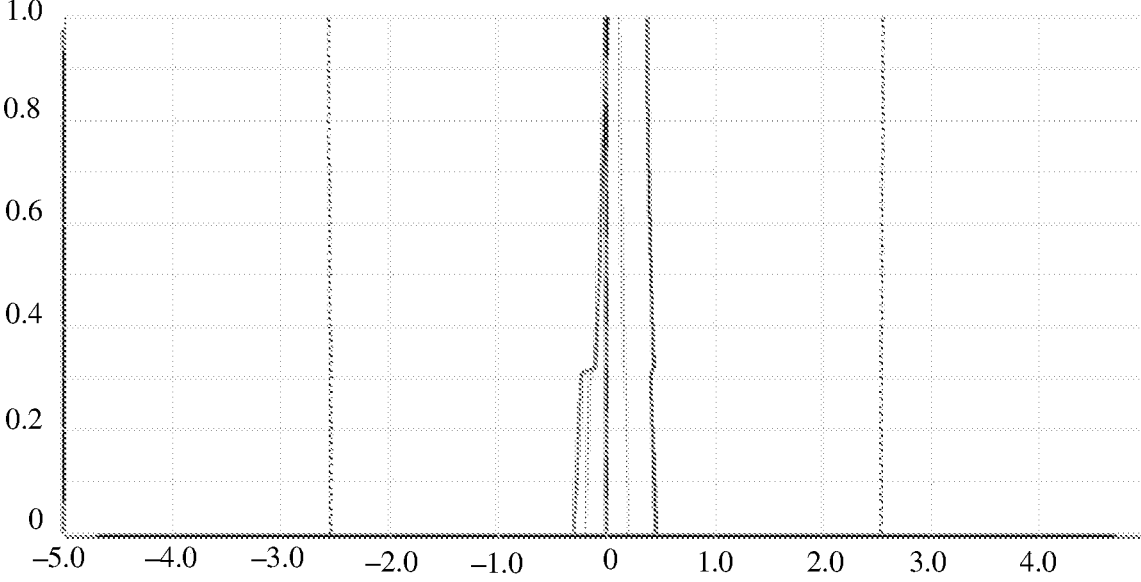
FIG. 12b is a line graph of lateral aberration of a camera lens shown in FIG. 11.

FIG. 12b shows curves of lateral aberration in the structure of the camera lens shown in FIG. 11 based on the data shown in Table 3-1, Table 3-2, and Table 3-3. Five curves shown in FIG. 12b are curves of lateral aberration corresponding to designed wavelengths of 650 nm, 610 nm, 555 nm, 510 nm, and 470 nm respectively, and a dashed line indicates a diffraction limit range. It can be learned from FIG. 12b that lateral aberration of light with different wavelengths is within the diffraction range.

Figure 12C:
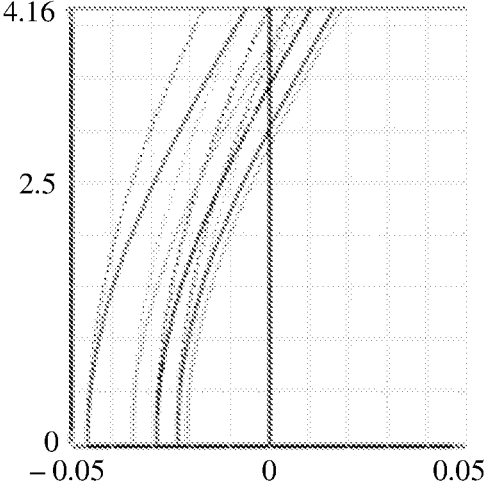
FIG. 12c is a line graph of distortion aberration of a camera lens shown in FIG. 11.
Figure 12D:
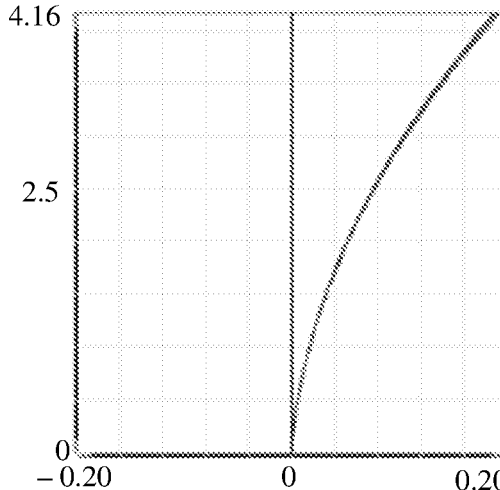
FIG. 12d is a line graph of ideal distortion aberration of a camera lens shown in FIG. 11.

FIG. 12c shows curves of distortion aberration in the structure of the camera lens shown in FIG. 11 based on the data shown in Table 3-1, Table 3-2, and Table 3-3. FIG. 12d shows a curve of ideal distortion aberration. It can be learned through comparison between FIG. 12c and FIG. 12d that distortion aberration of light with different wavelengths is within a range recognizable to naked eyes.

Figure 13:
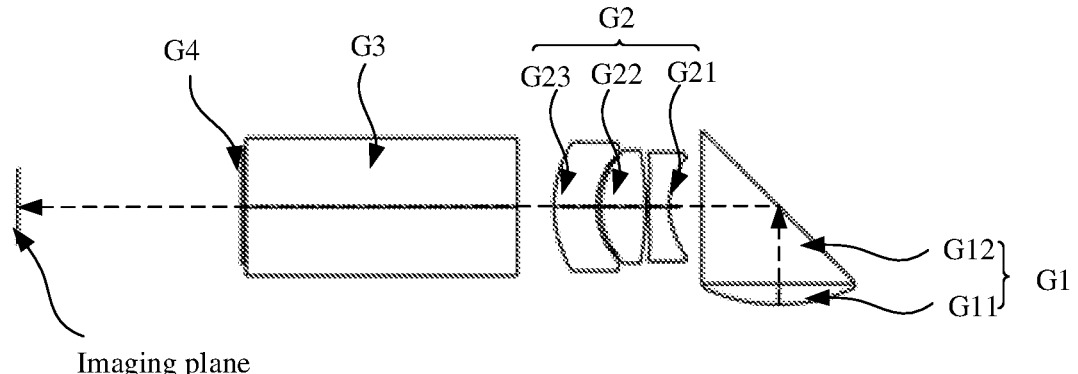
FIG. 13 is a schematic diagram of a structure of a camera lens according to an embodiment of this application.

FIG. 13 is a diagram of a structure of another camera lens. A lens group G2 includes three lenses. The three lenses are a second lens G21, a third lens G22, and a fourth lens G23 that are sequentially disposed along a second optical axis X2. An object-side surface of the second lens G21 is opposite to an image-side surface of a prism G12. In addition, the camera lens further includes flat glass G3. In addition, the camera lens may further include an IR filter G4.

A ratio of a focal length f1 of a refractive prism group G1 to a total focal length f of the camera lens is as follows:

$$\left|\frac{f1}{f}\right| = 0.631.$$

The second lens G21 has negative focal power, and a ratio of a focal length f2 of the second lens G21 to the total focal length f of the camera lens is as follows:

$$\left|\frac{f2}{f}\right| = 0.192.$$

The third lens G22 has positive focal power, and a ratio of a focal length f3 of the third lens G22 to the total focal length f of the camera lens is as follows:

$$\left|\frac{f3}{f}\right| = 0.201.$$

The fourth lens G23 has negative focal power, and a ratio of a focal length f4 of the fourth lens G23 to the total focal length f of the camera lens is as follows:

$$\left|\frac{f4}{f}\right| = 0.924.$$

In addition, a ratio of a total track length (total track length, TTL) of the camera lens to the total focal length f of the camera lens is as follows:

$$\frac{TTL}{f} = 1.37.$$

A ratio of an image height of the camera lens to the total focal length f of the camera lens is as follows:

$$\frac{IMH}{f} = 0.088.$$

Table 4-1 shows optical parameters of the camera lens.

TABLE 4-1

|  | Optical parameter |
|---|---|
| System focal length (F) | 28.35 mm |
| Aperture number (F/#) | 3.87 |
| Image height (IMH) | 2.5 mm |
| Total track length (TTL) | 38.95 mm |
| Designed wavelength | 650 nm, 610 nm, 555 nm, 510 nm, and 470 nm |

Table 4-2 shows optical parameters of optical components in the camera lens.

TABLE 4-2

|  |  | Radius | | Thickness | | nd | | vd |
|---|---|---|---|---|---|---|---|---|
| G1 | R1 | 9.7 | d1 | 1.05 | n1 | 1.54 | v1 | 55.98 |
|  | R2 | Infinity | d2 | 0.0 |  |  |  |  |
|  | A-01 | Infinity | d3 | 3.95 |  |  |  |  |
|  | B-03 | Infinity | d4 | 3.95 |  |  |  |  |
|  | C-02 | Infinity | d5 | 1.662 |  |  |  |  |
| G21 | R1 | 3.003 | d6 | 1.046 | n1 | 1.76 | v1 | 49.64 |
|  | R2 | 12.095 | d7 | 0.15 |  |  |  |  |
| G22 | R1 | −14.914 | d8 | 2.3 | n1 | 1.603 | v1 | 65.45 |
|  | R2 | 4.216 | d9 | 0.203 |  |  |  |  |
| G23 | R1 | 4.114 | d10 | 2.2 | n1 | 1.74 | v1 | 27.76 |
|  | R2 | 6.402 | d11 | 1.883 |  |  |  |  |
| G3 | R1 | Infinity | d12 | 13.9 | n1 | 1.90 | v1 | 37.05 |
|  | R2 | Infinity | d13 | 0.03 |  |  |  |  |
| G4 | R1 | Infinity | d14 | 11.439 | n1 | 1.51 | v1 | 64.21 |

Table 4-3 shows aspheric coefficients of the lenses in Table 4-2. An image-side surface and an object-side surface of the second lens G21 each are an even-order aspheric surface.

TABLE 4-3

|  |  | Type | K | A2 | A3 | A4 | A5 | A6 | A7 | A8 |
|---|---|---|---|---|---|---|---|---|---|---|
| G21 | R1 | Even-order aspheric surface | 0.0 | −1.71E−02 | 1.55E−03 | −3.97E−04 | 1.22E−04 | −2.89E−05 | 3.63E−06 | −1.88E−07 |
|  | R2 | Even-order aspheric surface | 0.0 | −1.04E−02 | 9.04E−04 | −9.71E−05 | 2.42E−05 | −5.07E−06 | 5.52E−07 | −2.38E−08 |

It can be learned from Table 4-3 that the camera lens provided in this embodiment includes two even-order aspheric surfaces. In this embodiment, vector heights z of all even-order aspheric surfaces may be defined by using the following formula, but are not limited to the following formula:

$$Z = \frac{CX^2}{1 + \sqrt{1 - KC^2X^2}} + A_2r^4 + A_3r^6 + A_4r^8 + A_5r^{10} + A_6r^{12},$$

where

Z indicates a vector height of an aspheric surface, r indicates a radial coordinate of the aspheric surface, and C indicates vertex curvature of the aspheric surface.

Figure 14A:
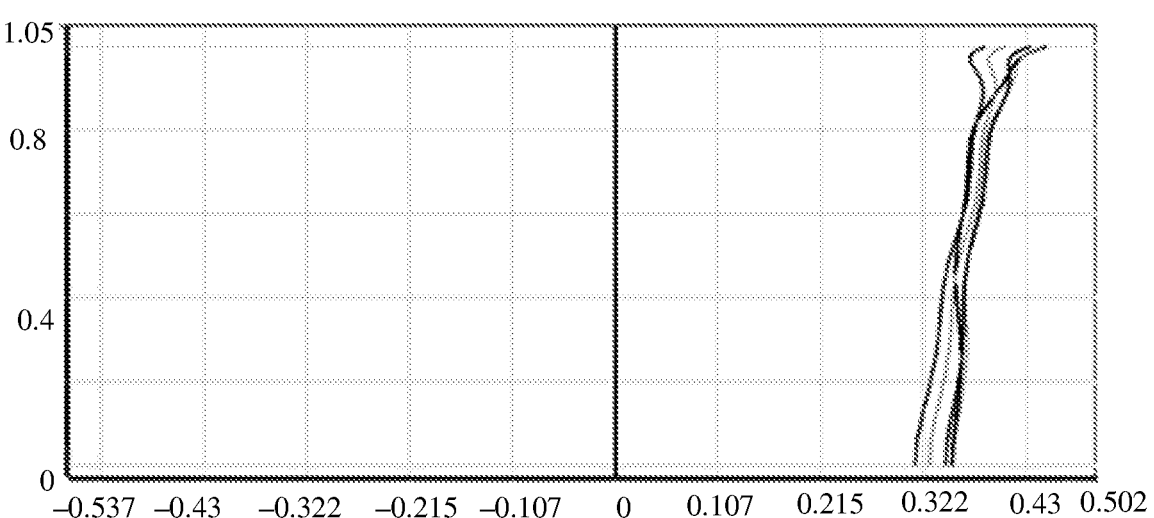
FIG. 14a is a line graph of axial aberration of a camera lens shown in FIG. 13.

FIG. 14a shows curves of axial aberration in the structure of the camera lens shown in FIG. 13 based on the data shown in Table 4-1, Table 4-2, and Table 4-3. Five curves shown in FIG. 14a are curves of axial aberration corresponding to designed wavelengths of 650 nm, 610 nm, 555 nm, 510 nm, and 470 nm respectively. It can be learned from FIG. 14a that axial aberration of light with different wavelengths is controlled within a quite small range.

Figure 14B:
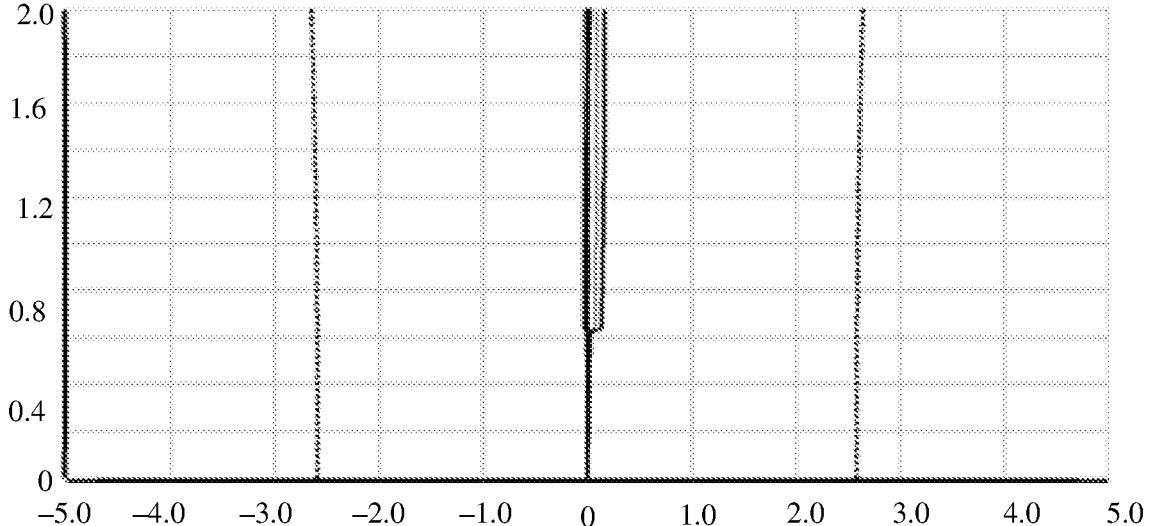
FIG. 14b is a line graph of lateral aberration of a camera lens shown in FIG. 13.

FIG. 14b shows curves of lateral aberration in the structure of the camera lens shown in FIG. 13 based on the data shown in Table 4-1, Table 4-2, and Table 4-3. Five curves shown in FIG. 14b are curves of lateral aberration corresponding to designed wavelengths of 650 nm, 610 nm, 555 nm, 510 nm, and 470 nm respectively, and a dashed line indicates a diffraction limit range. It can be learned from FIG. 14b that lateral aberration of light with different wavelengths is within the diffraction range.

Figure 14C:
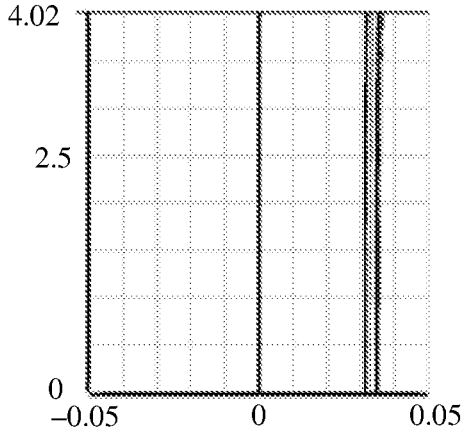
FIG. 14c is a line graph of distortion aberration of a camera lens shown in FIG. 13.
Figure 14D:
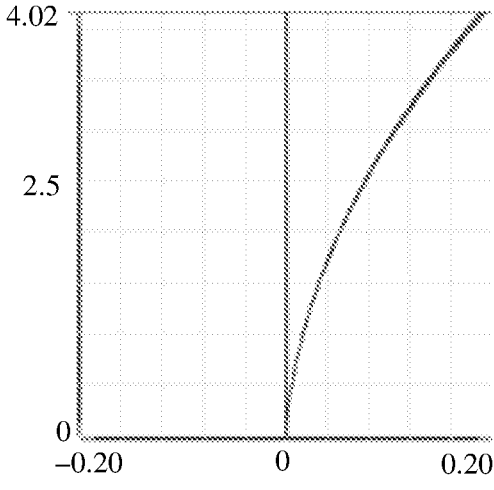
FIG. 14d is a line graph of ideal distortion aberration of a camera lens shown in FIG. 13.

FIG. 14c shows curves of distortion aberration in the structure of the camera lens shown in FIG. 13 based on the data shown in Table 4-1, Table 4-2, and Table 4-3. FIG. 14d shows a curve of ideal distortion aberration. It can be learned through comparison between FIG. 14c and FIG. 14d that distortion aberration of light with different wavelengths is within a range recognizable to naked eyes.

Figure 15:
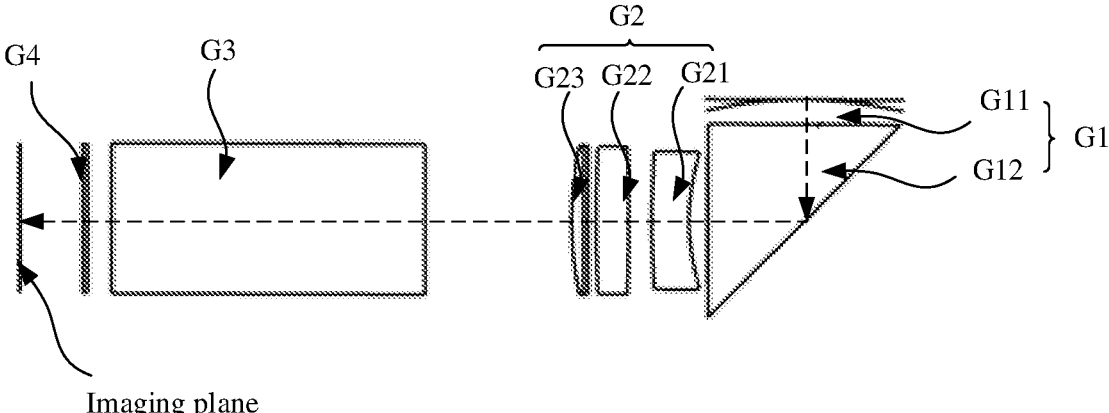
FIG. 15 is a schematic diagram of a structure of a camera lens according to an embodiment of this application.

FIG. 15 is a diagram of a structure of another camera lens. A lens group G2 includes three lenses. The three lenses are a second lens G21, a third lens G22, and a fourth lens G23 that are sequentially disposed along a second optical axis X2. An object-side surface of the second lens G21 is opposite to an image-side surface of a prism G12. The fourth lens G23 is a zoom liquid lens. In addition, the camera lens further includes flat glass G3. In addition, the camera lens may further include an IR filter G4.

An image-side surface of the third lens G22 is a convex surface. The image-side surface of the third lens G22 is designed as a convex surface, so that light can be converged, to further improve image quality.

An image-side surface of the fourth lens G23 is a convex surface, and an object-side surface of the fourth lens G23 is a concave surface.

A ratio of a focal length f1 of a refractive prism group G1 to a total focal length f of the camera lens is as follows:

$$\left|\frac{f1}{f}\right| = 0.867.$$

The second lens G21 has negative focal power, and a ratio of a focal length f2 of the second lens G21 to the total focal length f of the camera lens is as follows:

$$\left|\frac{f2}{f}\right| = 0.766.$$

The third lens G22 has positive focal power, and a ratio of a focal length f3 of the third lens G22 to the total focal length f of the camera lens is as follows:

$$\left|\frac{f3}{f}\right| = 2.136.$$

The fourth lens G23 has negative focal power, and a ratio of a focal length f4 of the fourth lens G23 to the total focal length f of the camera lens is as follows:

$$1.45 < \left|\frac{f4}{f}\right| < 2.38.$$

An aperture of the camera lens is as follows: 3.4<F/#<5.

In addition, a ratio of a total track length (total track length, TTL) of the camera lens to the total focal length f of the camera lens is as follows:

$$0.980 < \frac{TTL}{f} < 1.356.$$

A ratio of an image height of the camera lens to the total focal length f of the camera lens is as follows:

$$0.075 < \frac{IMH}{f} < 0.12.$$

Table 5-1 shows optical parameters of the camera lens.

TABLE 5-1

| | Optical parameter |
|---|---|
| System focal length (F) | 27.997 mm, 24.007 mm, and 32.998 mm |
| Aperture number (F/#) | 4.13, 3.44, and 4.98 |
| Image height (IMH) | 2.5 mm |
| Total track length (TTL) | 32.54 mm |
| Designed wavelength | 650 nm, 610 nm, 555 nm, 510 nm, and 470 nm |

Table 5-2 shows optical parameters of optical components in the camera lens.

TABLE 5-2

| | | Radius | | Thickness | | nd | | vd |
|---|---|---|---|---|---|---|---|---|
| G1 | R1 | 18.833 | d1 | 1.021 | n1 | 1.54 | v1 | 55.98 |
| | R2 | Infinity | d2 | 0 | | | | |
| | A-01 | Infinity | d3 | 4 | n2 | 1.90 | v2 | 37.05 |
| | B-03 | Infinity | d4 | 4 | | | | |
| | C-02 | Infinity | d5 | 0.8 | | | | |
| G21 | R1 | 7.356 | d6 | 1.55 | n1 | 1.63 | v1 | 23.51 |
| | R2 | 21.03 | d7 | 0.936 | | | | |
| G22 | R1 | −93.407 | d8 | 1.347 | n1 | 1.72 | v1 | 54.67 |
| | R2 | 62.324 | d9 | 0.319 | | | | |
| G23 | R1 | Infinity | d10 | 0.2 | n1 | 1.51 | v1 | 64.21 |
| | R2 | Infinity | d11 | 0.5 | n1 | 1.291 | v1 | 108.49 |
| | R3 | Same as that in Table 5-3 | d12 | 6.059 | | | | |
| G3 | R1 | Infinity | d13 | 13 | n1 | 1.90 | v1 | 37.05 |
| | R2 | Infinity | d14 | 1 | | | | |
| G4 | R1 | Infinity | d15 | 0.21 | n1 | 1.51 | v1 | 64.21 |
| | R2 | Infinity | d16 | 2.61 | | | | |

Table 5-3 shows a curvature radius of the zoom liquid lens and a corresponding focal length.

TABLE 5-3

| Curvature radius R3 and focal length of the zoom liquid lens | | | |
|---|---|---|---|
| | CONF1 | CONF2 | CONF3 |
| R3 | 14.345 | 22.857 | 10.186 |
| Total focal length | 27.99 mm | 33.001 mm | 24.008 mm |

Table 5-4 shows aspheric coefficients of the lenses in Table 5-2. An image-side surface and an object-side surface of the second lens G21 each are an even-order aspheric surface.

TABLE 5-4

| | | Type | K | A2 | A3 | A4 | A5 | A6 | A7 | A8 |
|---|---|---|---|---|---|---|---|---|---|---|
| G21 | R1 | Even-order aspheric surface | 0.0 | −2.35E−03 | 1.65E−04 | −2.77E−05 | 3.07E−06 | −1.36E−07 | 0.00E+00 | 0.00E+00 |
| | R2 | Even-order aspheric surface | 0.0 | −1.78E−03 | 8.58E−05 | −5.08E−06 | −1.84E−06 | 5.66E−07 | −5.84E−08 | 2.13E−09 |

25

26

Similarly, in this embodiment, vector heights Z of all even-order aspheric surfaces may be defined by using the following formula, but are not limited to the following formula:

$$Z = \frac{CX^2}{1 + \sqrt{1 - KC^2X^2}} + A_2r^4 + A_3r^6 + A_4r^8 + A_5r^{10} + A_6r^{12},$$

where

Z indicates a vector height of an aspheric surface, r indicates a radial coordinate of the aspheric surface, and C indicates vertex curvature of the aspheric surface.

Figure 16A:
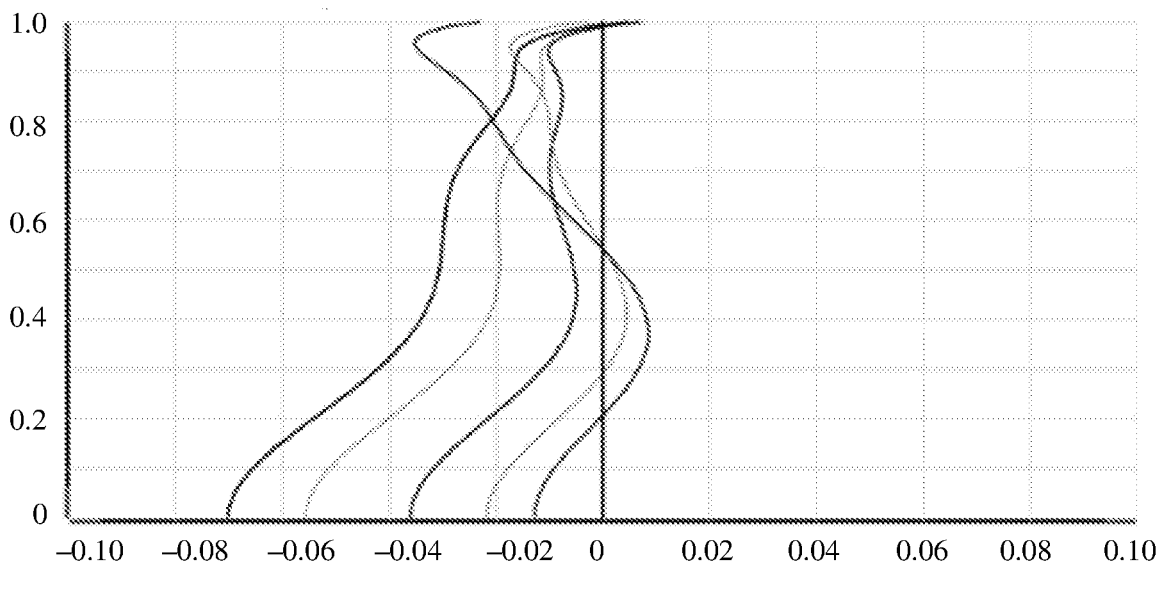
FIG. 16a is a line graph of axial aberration of a camera lens shown in FIG. 15.

FIG. 16*a* shows curves of axial aberration in the structure of the camera lens shown in FIG. 15 based on the data shown in Table 5-1, Table 5-2, Table 5-3, and Table 5-4. Five curves shown in FIG. 16*a* are curves of axial aberration corresponding to designed wavelengths of 650 nm, 610 nm, 555 nm, 510 nm, and 470 nm respectively. It can be learned from FIG. 16*a* that axial aberration of light with different wavelengths is controlled within a quite small range.

Figure 16B:
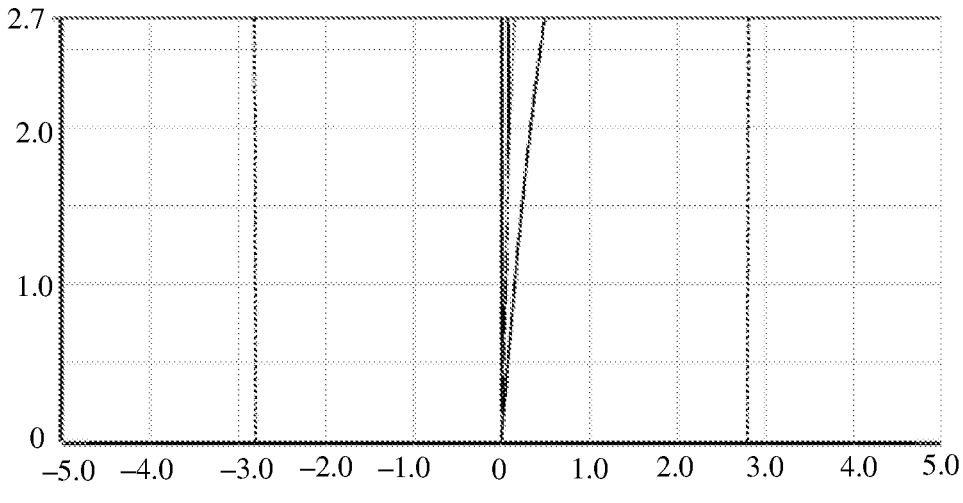
FIG. 16b is a line graph of lateral aberration of a camera lens shown in FIG. 15.

FIG. 16*b* shows curves of lateral aberration in the structure of the camera lens shown in FIG. 15 based on the data shown in Table 5-1, Table 5-2, Table 5-3, and Table 5-4. Five curves shown in FIG. 16*b* are curves of lateral aberration corresponding to designed wavelengths of 650 nm, 610 nm, 555 nm, 510 nm, and 470 nm respectively, and a dashed line indicates a diffraction limit range. It can be learned from FIG. 16*b* that lateral aberration of light with different wavelengths is within the diffraction range.

Figure 16C:
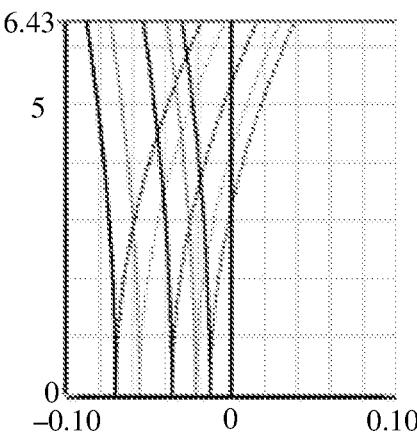
FIG. 16c is a line graph of distortion aberration of a camera lens shown in FIG. 15.
Figure 16D:
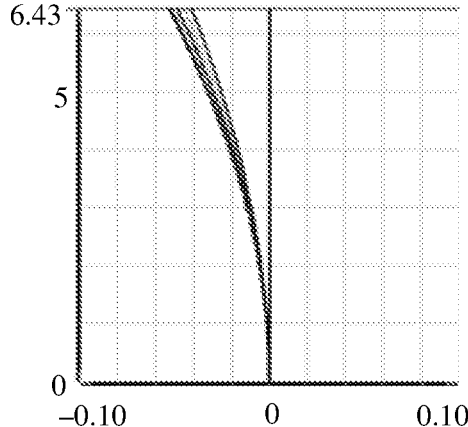
FIG. 16d is a line graph of ideal distortion aberration of a camera lens shown in FIG. 15.

FIG. 16*c* shows curves of distortion aberration in the structure of the camera lens shown in FIG. 15 based on the data shown in Table 5-1, Table 5-2, Table 5-3, and Table 5-4. FIG. 16*d* shows a curve of ideal distortion aberration. It can be learned through comparison between FIG. 16*c* and FIG. 16*d* that distortion aberration of light with different wavelengths is within a range recognizable to naked eyes.

In the camera lenses shown in FIG. 5, FIG. 9, FIG. 11, FIG. 13, and FIG. 15, the lens group G2 includes three lenses, and these camera lens structures may be referred to as combined three-piece lens groups.

In these three-piece lens groups, the ratio of the focal length f2 of the second lens to the total focal length f of the camera lens is as follows:

$$0.1 \le \left| \frac{f2}{f} \right| \le 0.9.$$

Figure 17:
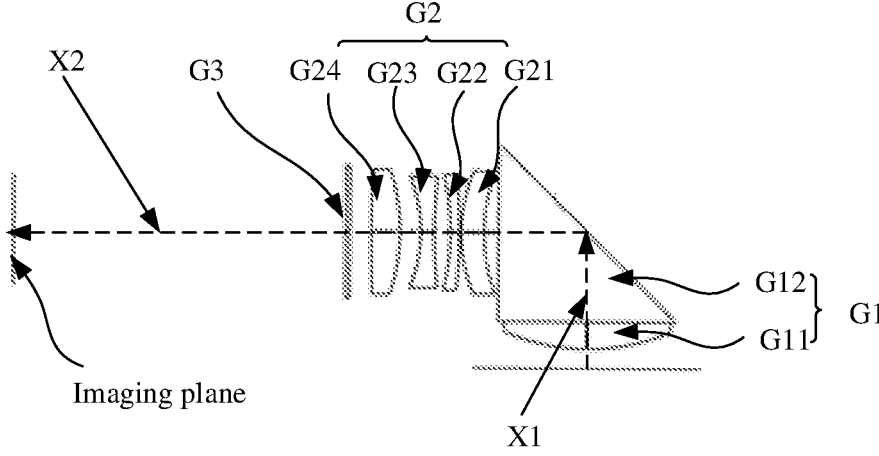
FIG. 17 is a schematic diagram of a structure of a camera lens according to an embodiment of this application.

FIG. 17 is a diagram of a structure of another camera lens. A lens group G2 includes four lenses. The three lenses are a second lens G21, a third lens G22, a fourth lens G23, and a fifth lens G24 that are sequentially disposed along a second optical axis X2. An object-side surface of the second lens G21 is opposite to an image-side surface of a prism G12. In addition, the camera lens further includes an IR filter G3. An image-side surface of the fifth lens G24 is a convex surface.

A ratio of a focal length f1 of a refractive prism group G1 to a total focal length f of the camera lens is as follows:

$$\left| \frac{f1}{f} \right| = 0.631.$$

The second lens G21 has negative focal power, and a ratio of a focal length f2 of the second lens G21 to the total focal length f of the camera lens is as follows:

$$\left| \frac{f2}{f} \right| = 0.192.$$

The third lens G22 has positive focal power, and a ratio of a focal length f3 of the third lens G22 to the total focal length f of the camera lens is as follows:

$$\left| \frac{f3}{f} \right| = 0.201.$$

The fourth lens G23 has negative focal power, and a ratio of a focal length f4 of the fourth lens G23 to the total focal length f of the camera lens is as follows:

$$\left| \frac{f4}{f} \right| = 0.924.$$

The fifth lens G24 has positive focal power, and a ratio of a focal length f5 of the fifth lens G24 to the total focal length f of the camera lens is as follows:

$$\left| \frac{f4}{f} \right| = 0.33.$$

In addition, a ratio of a total track length (total track length, TTL) of the camera lens to the total focal length f of the camera lens is as follows:

$$\frac{TTL}{f} = 1.37.$$

A ratio of an image height of the camera lens to the total focal length f of the camera lens is as follows:

$$\frac{IMH}{f} = 0.088.$$

Table 6-1 shows optical parameters of the camera lens.

TABLE 6-1

|  | Optical parameter |
| --- | --- |
| System focal length (F) | 28.40 mm |
| Aperture number (F/#) | 3.81 |
| Image height (IMH) | 2.5 mm |
| Total track length (TTL) | 25.74 mm |
| Designed wavelength | 650 nm, 610 nm, 555 nm, 510 nm, and 470 nm |

Table 6-2 shows optical parameters of optical components in the camera lens.

TABLE 6-2

|  |  | Radius |  | Thickness |  | nd |  | vd |
|---|---|---|---|---|---|---|---|---|
| G1 | R | 9.4 | d1 | 1.2 | n1 | 1.61 | v1 | 63.8 |
|  | R2 | Infinity | d2 | 0 |  |  |  |  |
|  | A-01 | Infinity | d3 | 4 | n1 | 1.90 | v1 | 37.8 |
|  | B-03 | Infinity | d4 | 4 |  |  |  |  |
|  | C-02 | Infinity | d5 | 0.662 |  |  |  |  |
| G21 | R1 | 7.453 | d6 | 1.02 | n1 | 1.76 | v1 | 49.64 |
|  | R2 | 7.081 | d7 | 0.075 |  |  |  |  |
| G22 | R1 | −25.59 | d8 | 0.407 | n1 | 1.603 | v1 | 65.45 |
|  | R2 | −11.27 | d9 | 0.714 |  |  |  |  |
| G23 | R1 | 23.928 | d10 | 0.602 | n1 | 1.74 | v1 | 27.76 |
|  | R2 | −6.549 | d11 | 0.930 |  |  |  |  |
| G24 | R1 | −9.099 | d12 | 1.311 | n1 | 1.90 | v1 | 37.05 |
|  | R2 | 80 | d13 | 0.951 |  |  |  |  |
| G3 | R1 | Infinity | d14 | 0.193 | n1 | 1.51 | v1 | 64.21 |
|  | R2 | Infinity | d15 | 14.877 |  |  |  |  |

Table 6-3 shows aspheric coefficients of the lenses in Table 6-2. An image-side surface and an object-side surface of the second lens G21 each are an even-order aspheric surface.

TABLE 6-3

|  |  | Type | K | A2 | A3 | A4 | A5 | A6 | A7 | A8 |
|---|---|---|---|---|---|---|---|---|---|---|
| G21 | R1 | Even-order aspheric surface | 0.0 | 2.07E−04 | −3.21E−05 | 6.01E−06 | −2.44E−06 | 4.71E−07 | −4.25E−08 | 1.46E−09 |
|  | R2 | Even-order aspheric surface | 0.0 | −1.15E−04 | −9.43E−06 | −1.92E−06 | −3.72E−07 | 1.58E−07 | −1.75E−08 | 6.43E−10 |

It can be learned from Table 6-3 that the camera lens provided in this embodiment includes two even-order aspheric surfaces. In this embodiment, vector heights z of all even-order aspheric surfaces may be defined by using the following formula, but are not limited to the following formula:

$$Z = \frac{CX^2}{1 + \sqrt{1 - KC^2X^2}} + A_2r^4 + A_3r^6 + A_4r^8 + A_5r^{10} + A_6r^{12},$$

where

Z indicates a vector height of an aspheric surface, r indicates a radial coordinate of the aspheric surface, and C indicates vertex curvature of the aspheric surface.

Figures 18A, 18B:
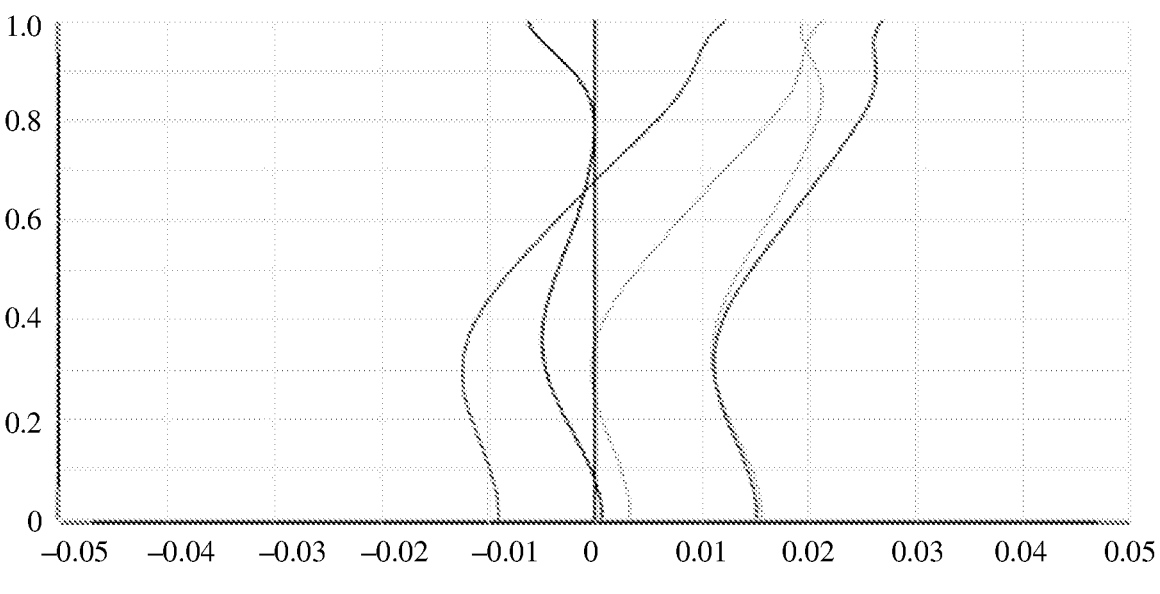
FIG. 18a is a line graph of axial aberration of a camera lens shown in FIG. 17.
FIG. 18b is a line graph of lateral aberration of a camera lens shown in FIG. 17.

FIG. 18a shows curves of axial aberration in the structure of the camera lens shown in FIG. 17 based on the data shown in Table 6-1, Table 6-2, and Table 6-3. Five curves shown in FIG. 18a are curves of axial aberration corresponding to designed wavelengths of 650 nm, 610 nm, 555 nm, 510 nm, and 470 nm respectively. It can be learned from FIG. 18a that axial aberration of light with different wavelengths is controlled within a quite small range.

FIG. 18b shows curves of lateral aberration in the structure of the camera lens shown in FIG. 17 based on the data shown in Table 6-1, Table 6-2, and Table 6-3. Five curves shown in FIG. 18b are curves of lateral aberration corresponding to designed wavelengths of 650 nm, 610 nm, 555 nm, 510 nm, and 470 nm respectively, and a dashed line indicates a diffraction limit range. It can be learned from FIG. 18b that lateral aberration of light with different wavelengths is within the diffraction range.

Figure 19:
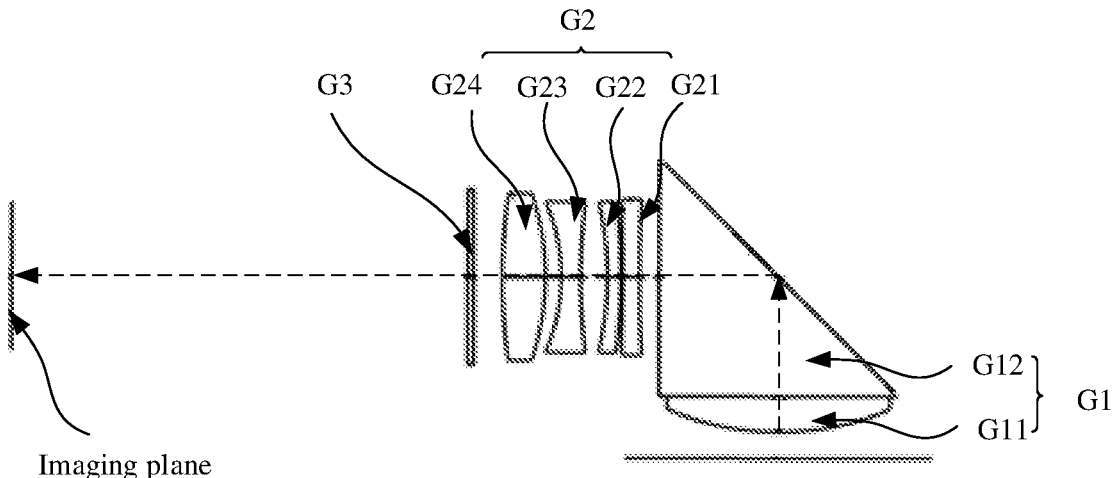
FIG. 19 is a schematic diagram of a structure of a camera lens according to an embodiment of this application.

FIG. 19 is a diagram of a structure of another camera lens. A lens group G2 includes four lenses. The three lenses are a second lens G21, a third lens G22, a fourth lens G23, and a fifth lens G24 that are sequentially disposed along a second optical axis X2. An object-side surface of the second lens G21 is opposite to an image-side surface of a prism G12. In addition, the camera lens further includes an IR filter G3. An object-side surface of the fifth lens G24 is a convex surface.

A ratio of a focal length f1 of a refractive prism group G1 to a total focal length f of the camera lens is as follows:

$$\left| \frac{f1}{f} \right| = 0.533.$$

The second lens G21 has negative focal power, and a ratio of a focal length f2 of the second lens G21 to the total focal length f of the camera lens is as follows:

$$\left| \frac{f2}{f} \right| = 1.261.$$

The third lens G22 has negative focal power, and a ratio of a focal length f3 of the third lens G22 to the total focal length f of the camera lens is as follows:

$$\left| \frac{f3}{f} \right| = 1.431.$$

The fourth lens G23 has negative focal power, and a ratio of a focal length f4 of the fourth lens G23 to the total focal length f of the camera lens is as follows:

$$\left| \frac{f4}{f} \right| = 0.226.$$

The fifth lens G24 has positive focal power, and a ratio of a focal length f5 of the fifth lens G24 to the total focal length f of the camera lens is as follows:

$$\left| \frac{f5}{f} \right| = 0.242.$$

In addition, a ratio of a total track length (total track length, TTL) of the camera lens to the total focal length f of the camera lens is as follows:

$$\frac{TTL}{f} = 0.912.$$

A ratio of an image height of the camera lens to the total focal length f of the camera lens is as follows:

$$\frac{IMH}{f} = 0.088.$$

Table 7-1 shows optical parameters of the camera lens.

TABLE 7-1

| | Optical parameter |
|---|---|
| System focal length (F) | 28.4 mm |
| Aperture number (F/#) | 3.81 |
| Image height (IMH) | 2.5 mm |
| Total track length (TTL) | 25.6 mm |
| Designed wavelength | 650 nm, 610 nm, 555 nm, 510 nm, and 470 nm |

Table 7-2 shows optical parameters of optical components in the camera lens.

TABLE 7-2

| | | Radius | | Thickness | | nd | | vd |
|---|---|---|---|---|---|---|---|---|
| G1 | R1 | | d1 | 1.2 | n1 | 1.618 | v1 | 63.85 |
| | R2 | Infinity | d2 | 0 | | | | |
| | A-01 | Infinity | d3 | 4 | n2 | 1.90 | v2 | 31.05 |
| | B-03 | Infinity | d4 | 4 | | | | |
| | C-02 | Infinity | d5 | 0.662 | | | | |
| G21 | R1 | 62.0 | d6 | 0.548 | n1 | 1.76 | v1 | 49.64 |
| | R2 | −50 | d7 | 0.075 | | | | |
| G22 | R1 | −21 | d8 | 0.447 | n1 | 1.603 | v1 | 65.45 |
| | R2 | −11.233 | d9 | 0.895 | | | | |
| G23 | R1 | 19.726 | d10 | 0.644 | n1 | 1.74 | v1 | 27.76 |
| | R2 | −6.409 | d11 | 0.525 | | | | |
| G24 | R1 | −8.175 | d12 | 1.441 | n1 | 1.90 | v1 | 37.05 |
| | R2 | 20 | d13 | 0.957 | | | | |
| G3 | R1 | Infinity | d14 | 0.193 | n1 | 1.51 | v1 | 64.21 |
| | R2 | Infinity | d15 | 15.231 | | | | |

Table 7-3 shows aspheric coefficients of the lenses in Table 7-2. An image-side surface and an object-side surface of the second lens G21 each are an even-order aspheric surface.

TABLE 7-3

| | | Type | K | A2 | A3 | A4 | A5 | A6 | A7 | A8 |
|---|---|---|---|---|---|---|---|---|---|---|
| G21 | R1 | Even-order aspheric surface | 0.0 | 9.53E−04 | −1.04E−04 | 3.76E−05 | −1.10E−05 | 1.85E−06 | −1.55E−07 | 5.09E−09 |
| | R2 | Even-order aspheric surface | 0.0 | 8.99E−04 | −6.56E−05 | 2.43E−05 | −8.43E−06 | 1.62E−06 | −1.48E−07 | 5.20E−09 |

It can be learned from Table 7-3 that the camera lens provided in this embodiment includes two aspheric surfaces. In this embodiment, vector heights z of all even-order aspheric surfaces may be defined by using the following formula, but are not limited to the following formula:

$$Z = \frac{CX^2}{1 + \sqrt{1 - KC^2X^2}} + A_2r^4 + A_3r^6 + A_4r^8 + A_5r^{10} + A_6r^{12},$$

Z indicates a vector height of an aspheric surface, r indicates a radial coordinate of the aspheric surface, and C indicates vertex curvature of the aspheric surface.

Figure 20A:
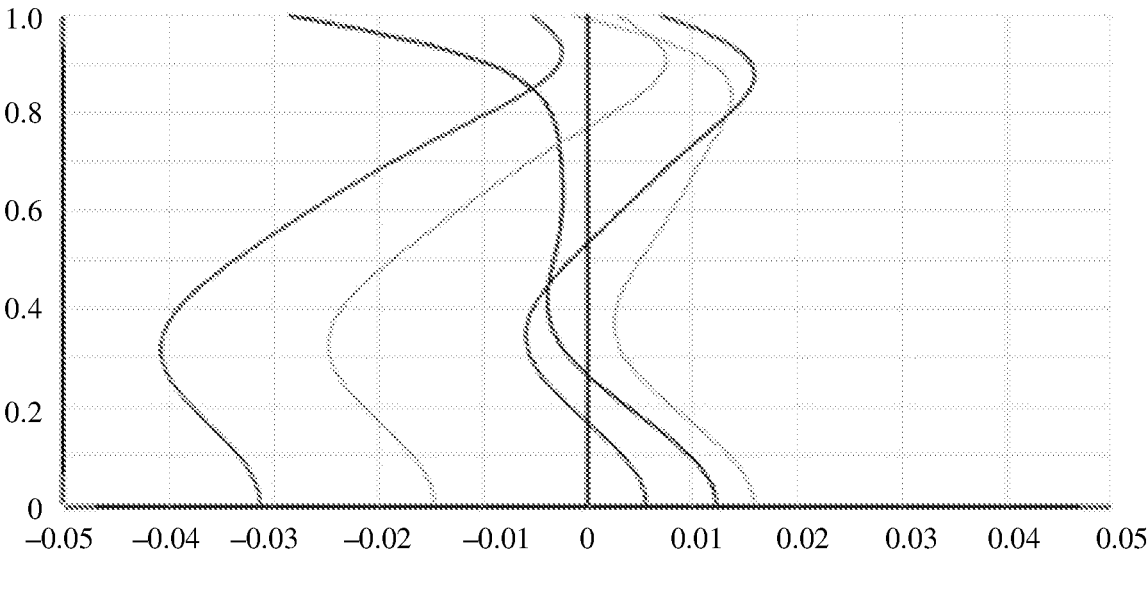
FIG. 20a is a line graph of axial aberration of a camera lens shown in FIG. 19.

FIG. 20a shows curves of axial aberration in the structure of the camera lens shown in FIG. 19 based on the data shown in Table 7-1, Table 7-2, and Table 7-3. Five curves shown in FIG. 20a are curves of axial aberration corresponding to designed wavelengths of 650 nm, 610 nm, 555 nm, 510 nm, and 470 nm respectively. It can be learned from FIG. 20a that axial aberration of light with different wavelengths is controlled within a quite small range.

Figures 20B, 20C:
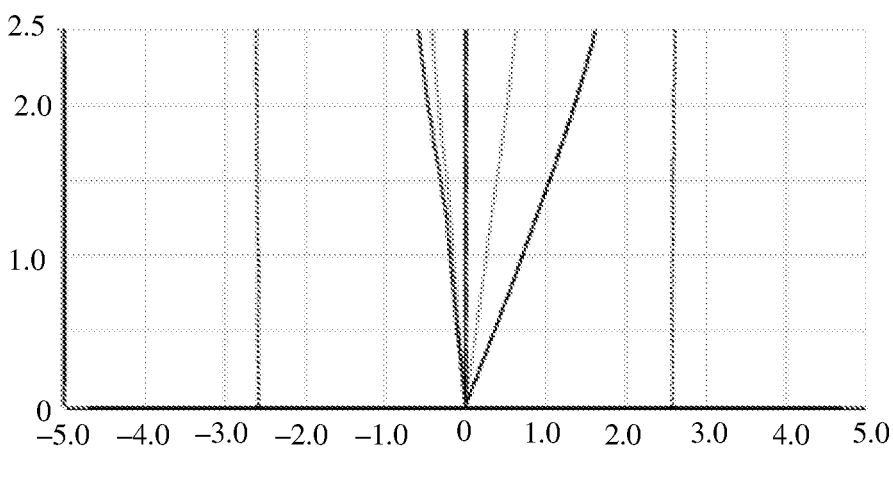
FIG. 20b is a line graph of lateral aberration of a camera lens shown in FIG. 19.
FIG. 20c is a line graph of distortion aberration of a camera lens shown in FIG. 19.

FIG. 20b shows curves of lateral aberration in the structure of the camera lens shown in FIG. 19 based on the data shown in Table 7-1, Table 7-2, and Table 7-3. Five curves shown in FIG. 20b are curves of lateral aberration corresponding to designed wavelengths of 650 nm, 610 nm, 555 nm, 510 nm, and 470 nm respectively, and a dashed line indicates a diffraction limit range. It can be learned from FIG. 20b that lateral aberration of light with different wavelengths is within the diffraction range.

Figure 20D:
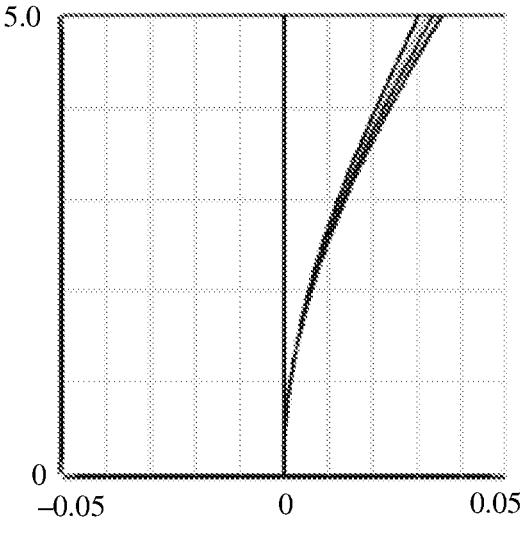
FIG. 20d is a line graph of ideal distortion aberration of a camera lens shown in FIG. 19.

FIG. 20c shows curves of distortion aberration in the structure of the camera lens shown in FIG. 19 based on the data shown in Table 7-1, Table 7-2, and Table 7-3. FIG. 20d shows a curve of ideal distortion aberration. It can be learned through comparison between FIG. 20c and FIG. 20d that distortion aberration of light with different wavelengths is within a range recognizable to naked eyes.

Figure 21:
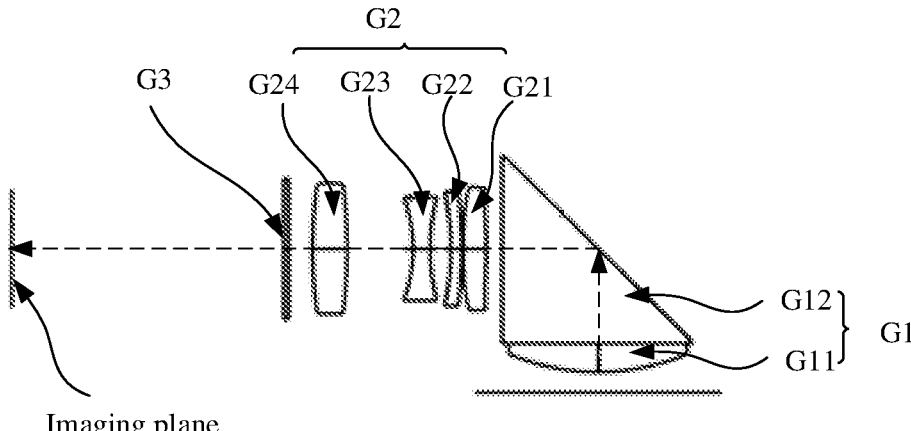
FIG. 21 is a schematic diagram of a structure of a camera lens according to an embodiment of this application.

FIG. 21 is a diagram of a structure of another camera lens. A lens group G2 includes four lenses. The three lenses are a second lens G21, a third lens G22, a fourth lens G23, and a fifth lens G24 that are sequentially disposed along a second optical axis X2. An object-side surface of the second lens G21 is opposite to an image-side surface of a prism G12. In addition, the camera lens further includes an IR filter G3. An image-side surface of the fifth lens G24 is a convex surface.

A ratio of a focal length f1 of a refractive prism group G1 to a total focal length f of the camera lens is as follows:

$$\left| \frac{f1}{f} \right| = 0.534.$$

The second lens G21 has positive focal power, and a ratio of a focal length f2 of the second lens G21 to the total focal length f of the camera lens is as follows:

$$\left|\frac{f2}{f}\right| = 0.594.$$

The third lens G22 has negative focal power, and a ratio of a focal length f3 of the third lens G22 to the total focal length f of the camera lens is as follows:

$$\left|\frac{f3}{f}\right| = 1.432.$$

The fourth lens G23 has negative focal power, and a ratio of a focal length f4 of the fourth lens G23 to the total focal length f of the camera lens is as follows:

$$\left|\frac{f4}{f}\right| = 0.167.$$

The fifth lens G24 has positive focal power, and a ratio of a focal length f5 of the fifth lens G24 to the total focal length f of the camera lens is as follows:

$$\left|\frac{f5}{f}\right| = 0.416.$$

In addition, a ratio of a total track length (TTL) of the camera lens to the total focal length f of the camera lens is as follows:

$$\frac{TTL}{f} = 0.861.$$

A ratio of an image height of the camera lens to the total focal length f of the camera lens is as follows:

$$\frac{IMH}{f} = 0.095.$$

Table 8-1 shows optical parameters of the camera lens.

TABLE 8-1

| | Optical parameter |
| --- | --- |
| System focal length (F) | 28.39 mm |
| Aperture number (F/#) | 3.81 |
| Image height (IMH) | 2.5 mm |
| Total track length (TTL) | 24.4 mm |
| Designed wavelength | 650 nm, 610 nm, 555 nm, 510 nm, and 470 nm |

Table 8-2 shows optical parameters of optical components in the camera lens.

TABLE 8-2

| | | Radius | | Thickness | | nd | | vd |
| --- | --- | --- | --- | --- | --- | --- | --- | --- |
| G1 | R1 | 9.4 | d1 | 1.2 | n1 | 1.851 | v1 | 40.104 |
| | R2 | Infinity | d2 | 0 | | | | |
| | A-01 | Infinity | d3 | 4 | n2 | 1.90 | v2 | 37.05 |
| | B-03 | Infinity | d4 | 4 | | | | |
| | C-02 | Infinity | d5 | 0.662 | | | | |
| G21 | R1 | −20 | d6 | 0.963 | n1 | 1.768 | v1 | 49.64 |
| | R2 | 36.374 | d7 | 0.075 | | | | |
| G22 | R1 | −21 | d8 | 0.446 | n1 | 1.60 | v1 | 65.45 |
| | R2 | −11.233 | d9 | 0.861 | | | | |
| G23 | R1 | 8.455 | d10 | 0.724 | n1 | 1.74 | v1 | 27.76 |
| | R2 | −6.321 | | 2.751 | | | | |
| G24 | R1 | −22.232 | d12 | 1.43 | n1 | 1.90 | v1 | 37.05 |
| | R2 | 20 | d13 | 1.001 | | | | |
| G3 | R1 | Infinity | d14 | 0.193 | n1 | 1.51 | v1 | 64.21 |
| | R2 | Infinity | d15 | 11.346 | | | | |

Table 8-3 shows aspheric coefficients of the lenses in Table 8-2. An image-side surface and an object-side surface of the second lens G21 each are an even-order aspheric surface.

TABLE 8-3

| | | Type | K | A2 | A3 | A4 | A5 |
| --- | --- | --- | --- | --- | --- | --- | --- |
| G21 | R1 | Even-order aspheric surface | 0.0 | 2.16E−03 | 6.13E−05 | 2.59E−05 | −3.10E−06 |
| | R2 | Even-order aspheric surface | 0.0 | 2.83E−03 | 2.66E−06 | 4.73E−05 | −9.72E−06 |

| | | Type | K | A6 | A7 | A8 |
| --- | --- | --- | --- | --- | --- |
| | R1 | Even-order aspheric surface | 0.0 | 3.13E−07 | −1.43E−08 | 1.33E−09 |
| | R2 | Even-order aspheric surface | 0.0 | 1.17E−06 | −6.05E−08 | 1.25E−09 |

It can be learned from Table 8-3 that the camera lens provided in this embodiment includes two aspheric surfaces. In this embodiment, vector heights z of all even-order aspheric surfaces may be defined by using the following formula, but are not limited to the following formula:

$$Z = \frac{CX^2}{1 + \sqrt{1 - KC^2X^2}} + A_2r^4 + A_3r^6 + A_4r^8 + A_5r^{10} + A_6r^{12},$$

where

Z indicates a vector height of an aspheric surface, r indicates a radial coordinate of the aspheric surface, and C indicates vertex curvature of the aspheric surface.

Figure 22A:
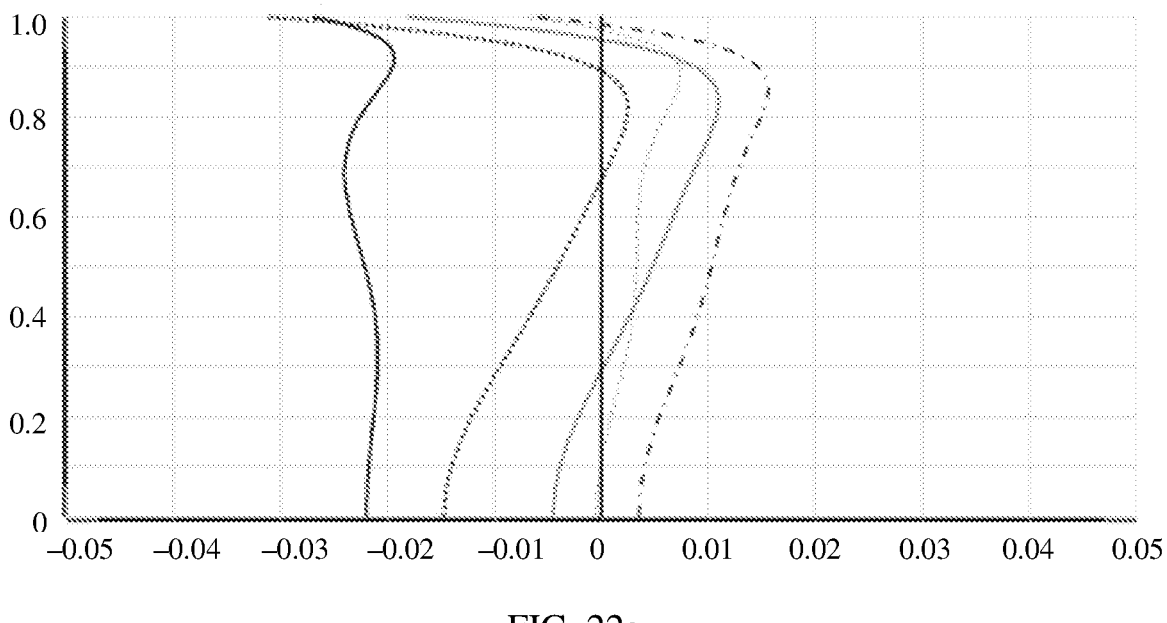
FIG. 22a is a line graph of axial aberration of a camera lens shown in FIG. 21.

FIG. 22a shows curves of axial aberration in the structure of the camera lens shown in FIG. 21 based on the data shown in Table 8-1, Table 8-2, and Table 8-3. Five curves shown in FIG. 22a are curves of axial aberration corresponding to designed wavelengths of 850 nm, 810 nm, 555 nm, 510 nm, and 470 nm respectively. It can be learned from FIG. 22a that axial aberration of light with different wavelengths is controlled within a quite small range.

Figure 22B:
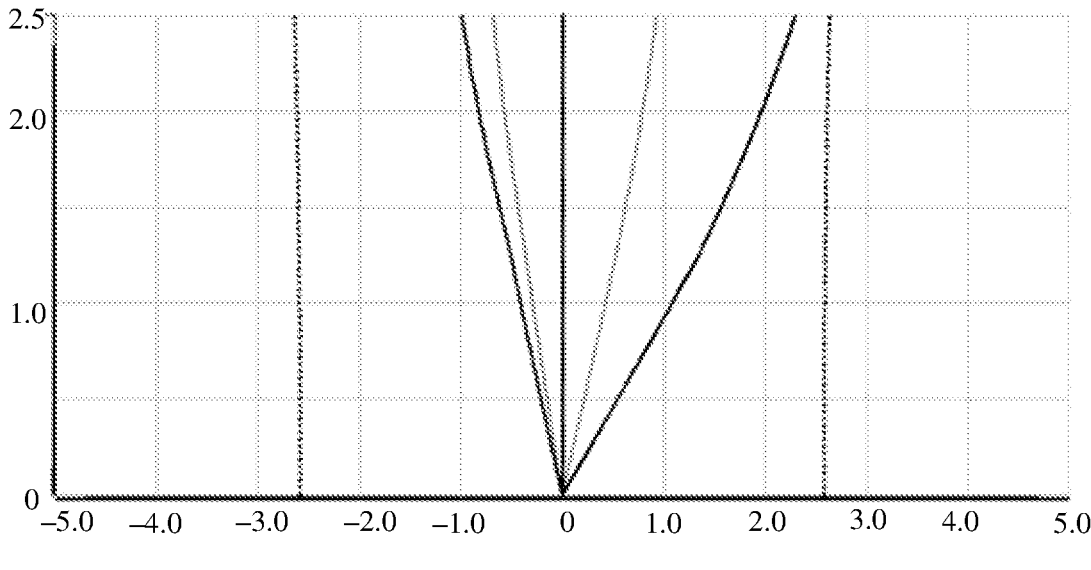
FIG. 22b is a line graph of lateral aberration of a camera lens shown in FIG. 21.

FIG. 22b shows curves of lateral aberration in the structure of the camera lens shown in FIG. 21 based on the data shown in Table 8-1, Table 8-2, and Table 8-3. Five curves shown in FIG. 22b are curves of lateral aberration corresponding to designed wavelengths of 850 nm, 810 nm, 555 nm, 510 nm, and 470 nm respectively, and a dashed line indicates a diffraction limit range. It can be learned from FIG. 22b that lateral aberration of light with different wavelengths is within the diffraction range.

Figure 22C:
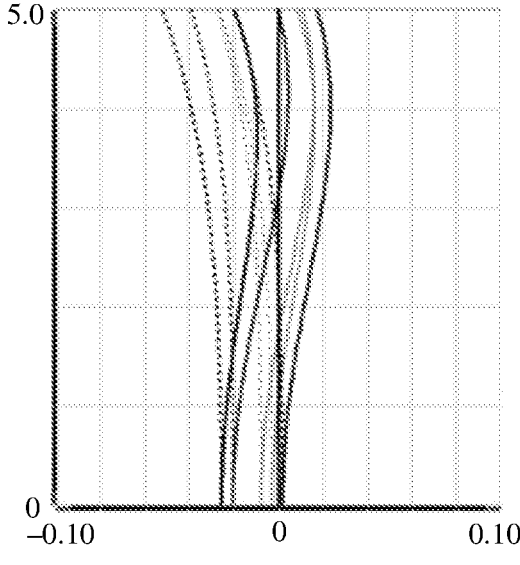
FIG. 22c is a line graph of distortion aberration of a camera lens shown in FIG. 21.
Figure 22D:
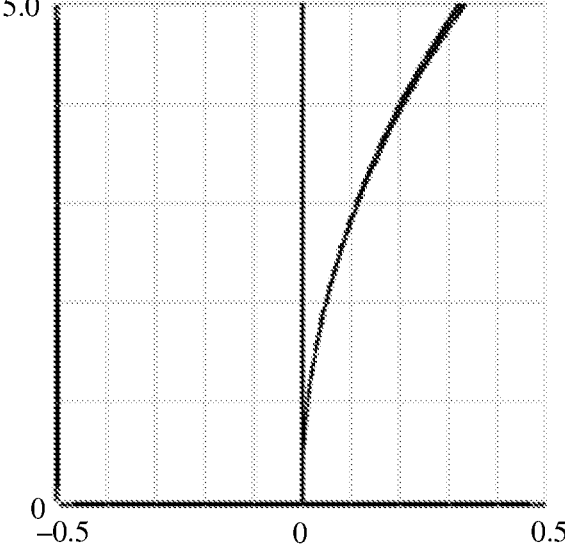
FIG. 22d is a line graph of ideal distortion aberration of a camera lens shown in FIG. 21.

FIG. 22c shows curves of distortion aberration in the structure of the camera lens shown in FIG. 21 based on the data shown in Table 8-1, Table 8-2, and Table 8-3. FIG. 22d shows a curve of ideal distortion aberration. It can be learned through comparison between FIG. 22c and FIG. 22d that distortion aberration of light with different wavelengths is within a range recognizable to naked eyes.

Figure 23:
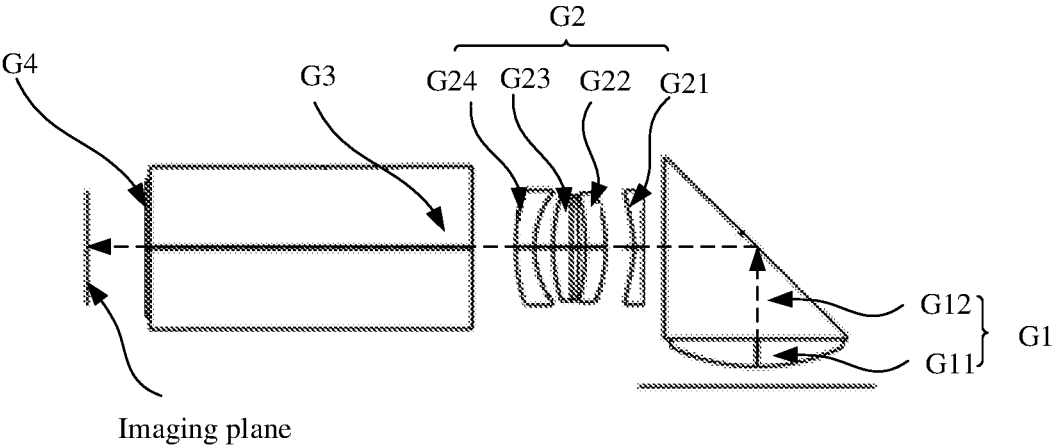
FIG. 23 is a schematic diagram of a structure of a camera lens according to an embodiment of this application.

FIG. 23 is a diagram of a structure of another camera lens. A lens group G2 includes four lenses. The three lenses are a second lens G21, a third lens G22, a fourth lens G23, and a fifth lens G24 that are sequentially disposed along a second optical axis X2. An object-side surface of the second lens G21 is opposite to an image-side surface of a prism G12. In addition, the camera lens further includes a prism group G3 and an IR filter G4. The fourth lens G23 is a DOE.

A ratio of a focal length f1 of a refractive prism group G1 to a total focal length f of the camera lens is as follows:

$$\left| \frac{f1}{f} \right| = 0.446.$$

The second lens G21 has negative focal power, and a ratio of a focal length f2 of the second lens G21 to the total focal length f of the camera lens is as follows:

$$\left| \frac{f2}{f} \right| = 0.286.$$

The third lens G22 has positive focal power, and a ratio of a focal length f3 of the third lens G22 to the total focal length f of the camera lens is as follows:

$$\left| \frac{f3}{f} \right| = 0.967.$$

The fourth lens G23 has positive focal power, and a ratio of a focal length f4 of the fourth lens G23 to the total focal length f of the camera lens is as follows:

$$\left| \frac{f4}{f} \right| = 0.364.$$

The fifth lens G24 has negative focal power, and a ratio of a focal length f5 of the fifth lens G24 to the total focal length f of the camera lens is as follows:

$$\left| \frac{f5}{f} \right| = 0.441.$$

In addition, a ratio of a total track length (total track length, TTL) of the camera lens to the total focal length f of the camera lens is as follows:

$$\frac{TTL}{f} = 1.032.$$

A ratio of an image height of the camera lens to the total focal length f of the camera lens is as follows:

$$\frac{IMH}{f} = 0.089.$$

Table 9-1 shows optical parameters of the camera lens.

TABLE 9-1

| | Optical parameter |
| --- | --- |
| System focal length (F) | 28.005 mm |
| Aperture number (F/#) | 4.06 |
| Image height (IMH) | 2.5 mm |
| Total track length (TTL) | 28.9 mm |
| Designed wavelength | 650 nm, 610 nm, 555 nm, 510 nm, and 470 nm |

Table 9-2 shows optical parameters of optical components in the camera lens.

TABLE 9-2

| | | Radius | Thickness | | | nd | | vd |
| --- | --- | --- | --- | --- | --- | --- | --- | --- |
| G1 | R1 | 8.547 | d1 | 1.2 | n1 | 1.62 | v1 | 63.8 |
| | R2 | Infinity | d2 | 0 | | | | |
| | A-01 | Infinity | d3 | 4 | n2 | 1.90 | v2 | 37.05 |
| | B-03 | Infinity | d4 | 4 | | | | |
| | C-02 | Infinity | d5 | 0.86 | | | | |
| G21 | R1 | −10.224 | d6 | 0.439 | n1 | 1.768 | v1 | 49.64 |
| | R2 | −3.782 | d7 | 1.214 | | | | |
| G22 | R1 | −6.371 | d8 | 0.876 | n1 | 1.60 | v1 | 65.45 |
| | R2 | −9.892 | d9 | 0.3 | | | | |
| G23 | R1 | −21.006 | d10 | 0.313 | n1 | 1.63 | v1 | 24.3 |
| | R2 | Infinity | d11 | 0.8 | n1 | 1.51 | v1 | 64.21 |
| | R3 | 7.591 | d12 | 0.8 | | | | |
| G24 | R1 | 3.998 | d13 | 0.8 | n1 | 1.74 | v1 | 27.8 |
| | R2 | 7.672 | d14 | 1.893 | | | | |

TABLE 9-2-continued

|    |    | Radius   |     | Thickness |    | nd   |    | vd    |
|----|----|----------|-----|-----------|----|------|----|-------|
| G3 | R1 | Infinity | d15 | 13.903    | n1 | 1.90 | v1 | 37.5  |
|    | R2 | Infinity | d16 | 0.03      |    |      |    |       |
| G4 | R1 | Infinity | d17 | 0.193     | n1 | 1.51 | v1 | 64.21 |
|    | R2 | Infinity | d18 | 2.481     |    |      |    |       |

Table 9-3 shows aspheric coefficients of the lenses in Table 9-2. An image-side surface and an object-side surface of the second lens G21 each are an even-order aspheric surface. The object-side surface of the fourth lens G23 is a binary 2 diffractive surface.

TABLE 9-3

|     |    | Type                         | K   | A2       | A3        | A4       | A5        |
|-----|----|------------------------------|-----|----------|-----------|----------|-----------|
| G21 | R1 | Even-order aspheric surface  | 0.0 | 1.99E−02 | −3.30E−03 | 3.21E−04 | 1.35E−05  |
|     | R2 | Even-order aspheric surface  | 0.0 | 2.48E−02 | −4.09E−03 | 5.43E−04 | −1.37E−05 |

|    | Type                        | K   | A6        | A7       | A8        |
|----|-----------------------------|-----|-----------|----------|-----------|
| R1 | Even-order aspheric surface | 0.0 | −9.09E−06 | 1.15E−06 | −5.09E−08 |
| R2 | Even-order aspheric surface | 0.0 | −8.38E−06 | 1.38E−06 | −7.03E−08 |

Table 9-4 shows a diffractive coefficient of the fourth lens G23 in Table 9-3.

TABLE 9-4

| Binary 2 | | | | | |
|----------|---|---|---|---|---|
| Diffraction order (Diffract Order) | Norm radius (Norm Radius) | coeff. on p^2 | coeff. on p^4 | coeff. on p^6 | coeff. on p^8 |
| G4 R1 1 | 2.3 | −42.352 | 16.633 | −4.962 | 0 |

It can be learned from Table 9-3 that the camera lens provided in this embodiment includes three aspheric surfaces. In this embodiment, vector heights z of all even-order aspheric surfaces may also be defined by using the following formula, but are not limited to the following formula:

$$Z = \frac{CX^2}{1 + \sqrt{1 - KC^2X^2}} + A_2r^4 + A_3r^6 + A_4r^8 + A_5r^{10} + A_6r^{12},$$

where

Z indicates a vector height of an aspheric surface, r indicates a radial coordinate of the aspheric surface, and C indicates vertex curvature of the aspheric surface.

In this embodiment, a vector height Z2 of the binary 2 diffractive surface may be defined by using the following formula:

$$Z2 = \frac{Cr^2}{1 + \sqrt{1 - KC^2r^2}} + \sum_{i=1}^{8} a_i r^{2i} + M\sum_{J=1}^{N} A_j p^{2j},$$

where

M indicates a diffraction order, P indicates a phase distribution power, A indicates a phase distribution coefficient, C indicates vertex curvature of an aspheric surface, and r indicates a radial coordinate of the aspheric surface.

Figure 24A:
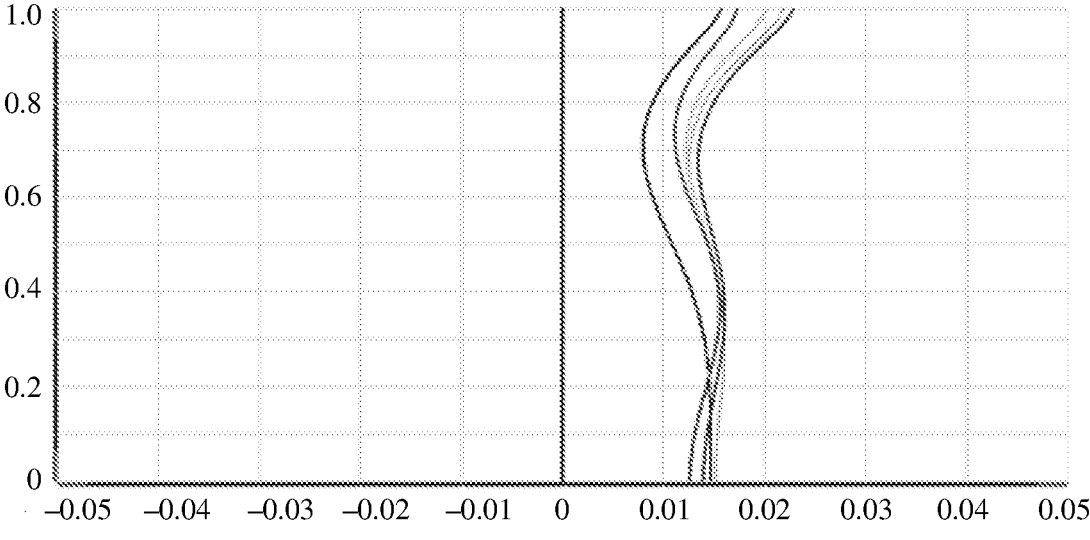
FIG. 24a is a line graph of axial aberration of a camera lens shown in FIG. 23.

FIG. 24a shows curves of axial aberration in the structure of the camera lens shown in FIG. 23 based on the data shown in Table 9-1, Table 9-2, Table 9-3, and Table 9-4. Five curves shown in FIG. 24a are curves of axial aberration corresponding to designed wavelengths of 650 nm, 624 nm, 555 nm, 524 nm, and 470 nm respectively. It can be learned from FIG. 24a that axial aberration of light with different wavelengths is controlled within a quite small range.

Figure 24B:
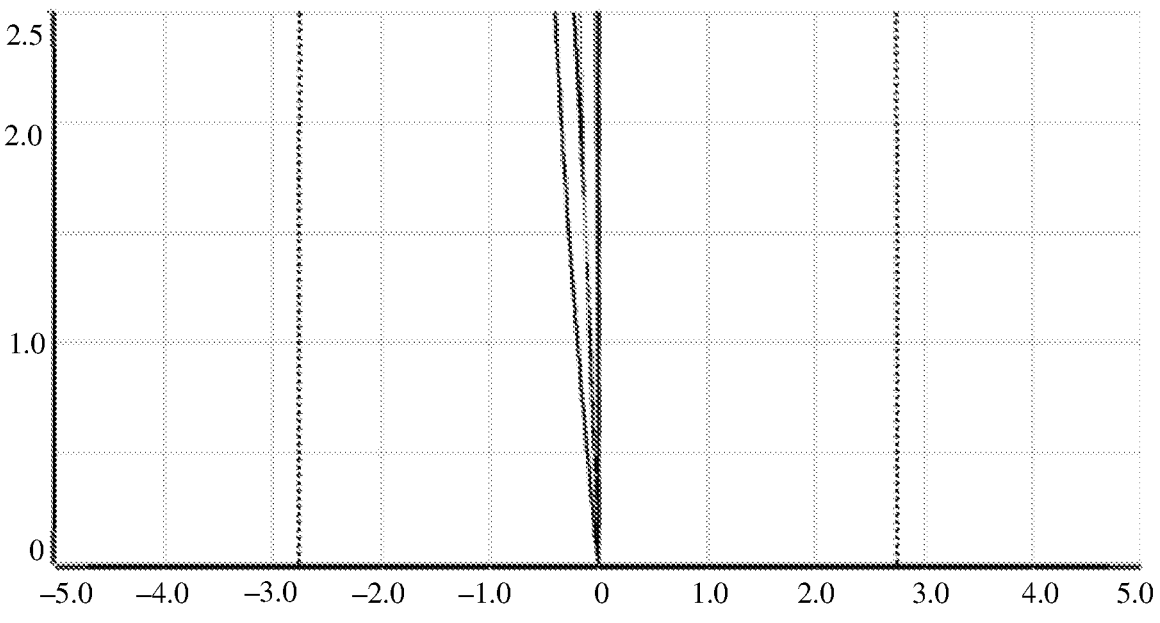
FIG. 24b is a line graph of lateral aberration of a camera lens shown in FIG. 23.

FIG. 24b shows curves of lateral aberration in the structure of the camera lens shown in FIG. 23 based on the data shown in Table 9-1, Table 9-2, Table 9-3, and Table 9-4. Five curves shown in FIG. 24b are curves of lateral aberration corresponding to designed wavelengths of 650 nm, 624 nm, 555 nm, 524 nm, and 470 nm respectively, and a dashed line indicates a diffraction limit range. It can be learned from FIG. 24b that lateral aberration of light with different wavelengths is within the diffraction range.

Figure 24C:
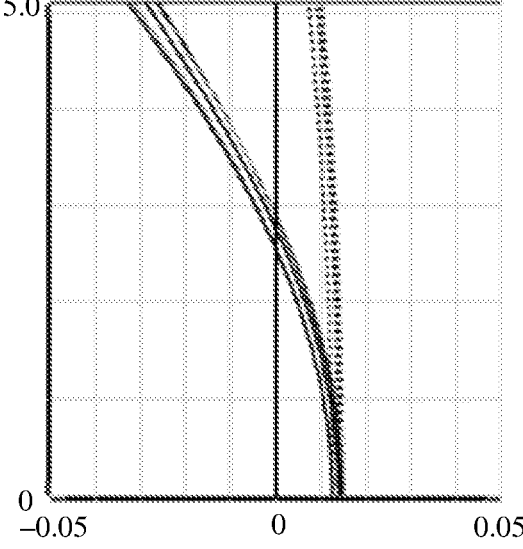
FIG. 24c is a line graph of distortion aberration of a camera lens shown in FIG. 23.
Figure 24D:
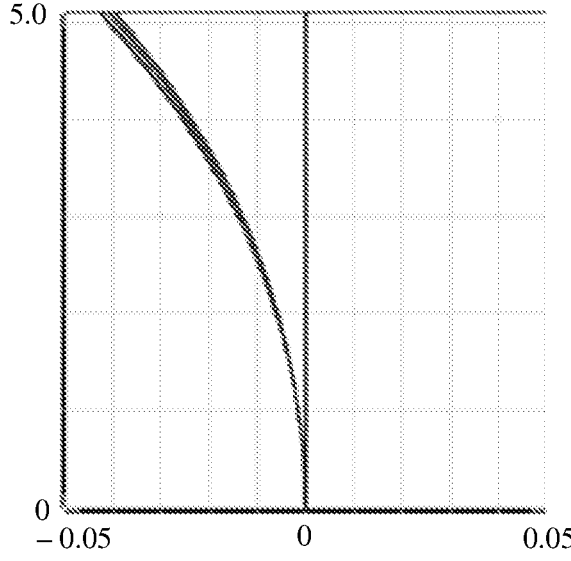
FIG. 24d is a line graph of ideal distortion aberration of a camera lens shown in FIG. 23.

FIG. 24c shows curves of distortion aberration in the structure of the camera lens shown in FIG. 23 based on the data shown in Table 9-1, Table 9-2, Table 9-3, and Table 9-4. FIG. 24d shows a curve of ideal distortion aberration. It can be learned through comparison between FIG. 24c and FIG. 24d that distortion aberration of light with different wavelengths is within a range recognizable to naked eyes.

Figure 25:
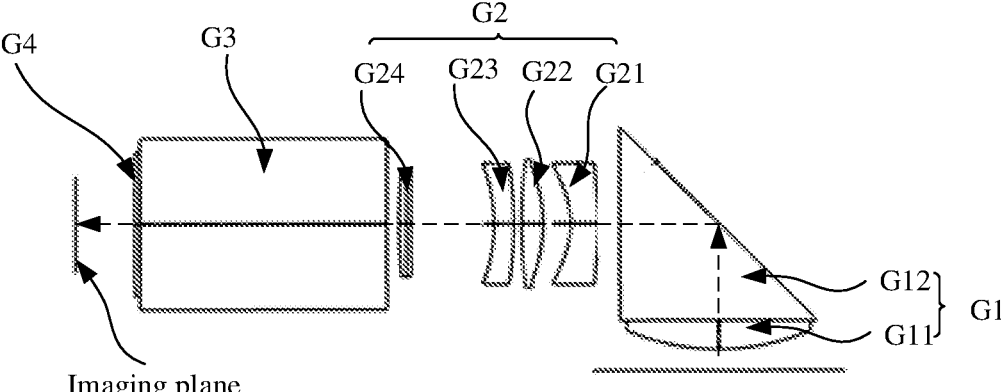
FIG. 25 is a schematic diagram of a structure of a camera lens according to an embodiment of this application.

FIG. 25 is a diagram of a structure of another camera lens. A lens group G2 includes four lenses. The three lenses are a second lens G21, a third lens G22, a fourth lens G23, and a fifth lens G24 that are sequentially disposed along a second optical axis X2. An object-side surface of the second lens G21 is opposite to an image-side surface of a prism G12. In addition, the camera lens further includes flat glass G3 and an IR filter G4. The fourth lens G23 is a DOE. The fifth lens G24 is a zoom liquid lens. An image-side surface of the fifth lens G24 is a convex surface.

A ratio of a focal length f of a refractive prism group G1 to a total focal length f of the camera lens is as follows:

$$0.55 < \left|\frac{f1}{f}\right| < 0.61.$$

The second lens G21 has negative focal power, and a ratio of a focal length f2 of the second lens G21 to the total focal length f of the camera lens is as follows:

$$0.27 < \left|\frac{f2}{f}\right| < 0.3.$$

The third lens G22 has positive focal power, and a ratio of a focal length f3 of the third lens G22 to the total focal length f of the camera lens is as follows:

$$0.29 < \left|\frac{f3}{f}\right| < 0.33.$$

The fourth lens G23 has negative focal power, and a ratio of a focal length f4 of the fourth lens G23 to the total focal length f of the camera lens is as follows:

$$0.67 < \left|\frac{f4}{f}\right| < 0.75.$$

The fifth lens G24 has positive focal power, and a ratio of a focal length f5 of the fifth lens G24 to the total focal length f of the camera lens is as follows:

$$\left|\frac{f5}{f}\right| < 3.65.$$

An aperture of the camera lens is as follows: 3.35<F/#<3.7.

In addition, a ratio of a total track length (total track length, TTL) of the camera lens to the total focal length f of the camera lens is as follows:

$$0.98 < \frac{TTL}{f} < 1.05.$$

A ratio of an image height of the camera lens to the total focal length f of the camera lens is as follows:

$$0.09 < \frac{IMH}{f} < 0.1.$$

Table 10-1 shows optical parameters of the camera lens.

TABLE 10-1

| | Optical parameter |
|---|---|
| System focal length (F) | 24.8 mm < F < 27.4 mm |
| Aperture number (F/#) | 3.35 < F/# < 3.74 |
| Image height (IMH) | 2.5 mm |
| Total track length (TTL) | 26 mm < TTL < 27 mm |
| Designed wavelength | 650 nm, 610 nm, 555 nm, 510 nm, and 470 nm |

Table 10-2 shows optical parameters of optical components in the camera lens.

TABLE 10-2

| | | Radius | | Thickness | | nd | | vd |
|---|---|---|---|---|---|---|---|---|
| G1 | R1 | 9.4 | d1 | 1.2 | n1 | 1.62 | v1 | 63.8 |
| | R2 | Infinity | d2 | 0 | | | | |
| | A-01 | Infinity | d3 | 4 | n2 | 1.90 | v2 | 37.05 |
| | B-03 | Infinity | d4 | 4 | | | | |
| | C-02 | Infinity | d5 | 0.862 | | | | |
| G21 | R1 | −10.224 | d6 | 1.133 | n1 | 1.768 | v1 | 49.64 |
| | R2 | −3.497 | d7 | 1.133 | | | | |
| G22 | R1 | −6.337 | d8 | 0.876 | n1 | 1.60 | v1 | 65.4 |
| | R2 | 19.965 | d9 | 0.313 | | | | |
| G23 | R1 | −15.128 | d10 | 0.8 | n1 | 1.74 | v1 | 27.76 |
| | R2 | −7.039 | d11 | 3.354 | | | | |
| G24 | R1 | Infinity | d12 | 0.2 | n1 | 1.51 | v1 | 64.21 |
| | R2 | Infinity | d13 | 0.3 | n1 | 1.29 | v1 | 108.49 |
| | R3 | Infinity or 25.28 | d14 | 0.5 | | | | |
| G3 | R1 | Infinity | d15 | 10 | n1 | 1.90 | v1 | 37.5 |
| | R2 | Infinity | d16 | 0.03 | | | | |
| G4 | R1 | Infinity | d17 | 0.193 | n1 | 1.51 | v1 | 64.21 |
| | R2 | Infinity | d18 | 2.403 | | | | |

Table 10-3 shows aspheric coefficients of the lenses in Table 10-2. An image-side surface and an object-side surface of the second lens G21 each are an even-order aspheric surface.

TABLE 10-3

|  |  | Type | K | A2 | A3 | A4 | A5 |
|---|---|---|---|---|---|---|---|
| G21 | R1 | Even-order aspheric surface | 0.0 | 5.22E–03 | –2.21E–04 | –1.10E–05 | 3.91E–06 |
|  | R2 | Even-order aspheric surface | 0.0 | 8.51E–03 | –2.56E–04 | –2.89E–05 | 2.11E–05 |

|  |  | Type | K | A6 | A7 | A8 |
|---|---|---|---|---|---|---|
|  | R1 | Even-order aspheric surface | 0.0 | –2.40E–07 | –3.69E–08 | 4.24E–09 |
|  | R2 | Even-order aspheric surface | 0.0 | –4.29E–06 | 4.08E–07 | –1.30E–08 |

Similarly, in this embodiment, vector heights z of all even-order aspheric surfaces may be defined by using the following formula, but are not limited to the following formula:

$$Z = \frac{CX^2}{1 + \sqrt{1 - KC^2X^2}} + A_2r^4 + A_3r^6 + A_4r^8 + A_5r^{10} + A_6r^{12},$$

where

Z indicates a vector height of an aspheric surface, r indicates a radial coordinate of the aspheric surface, and C indicates vertex curvature of the aspheric surface.

Figure 26A:
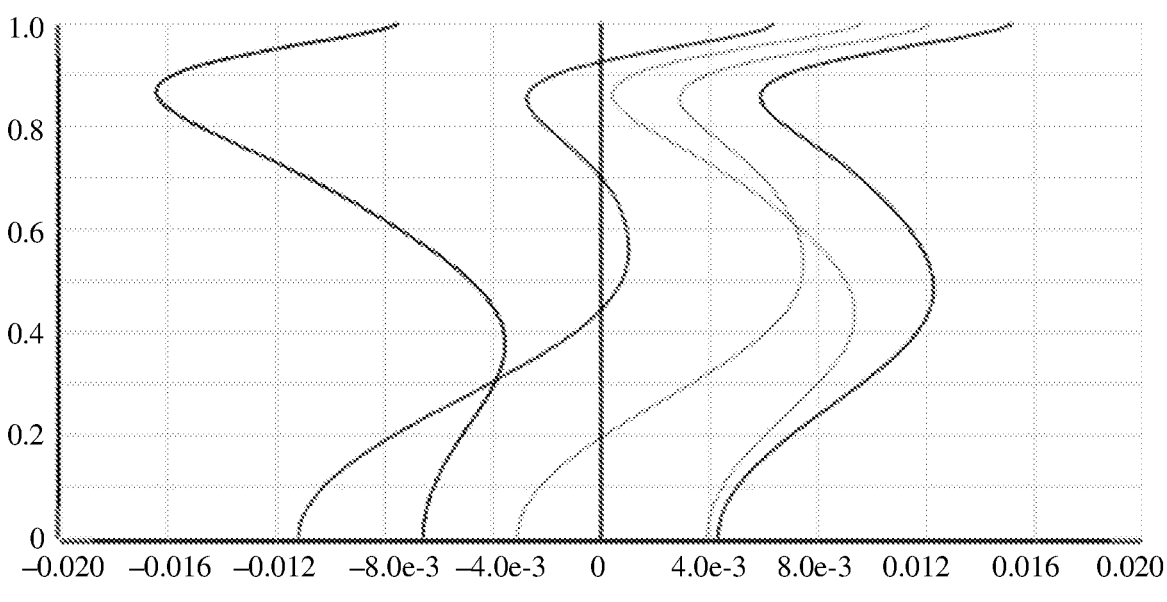
FIG. 26a is a line graph of axial aberration of a camera lens shown in FIG. 25.

FIG. 26a shows curves of axial aberration in the structure of the camera lens shown in FIG. 25 based on the data shown in Table 10-1, Table 10-2, Table 10-3, and Table 10-4. Five curves shown in FIG. 26a are curves of axial aberration corresponding to designed wavelengths of 650 nm, 610 nm, 555 nm, 510 nm, and 470 nm respectively. It can be learned from FIG. 26a that axial aberration of light with different wavelengths is controlled within a quite small range.

Figure 26B:
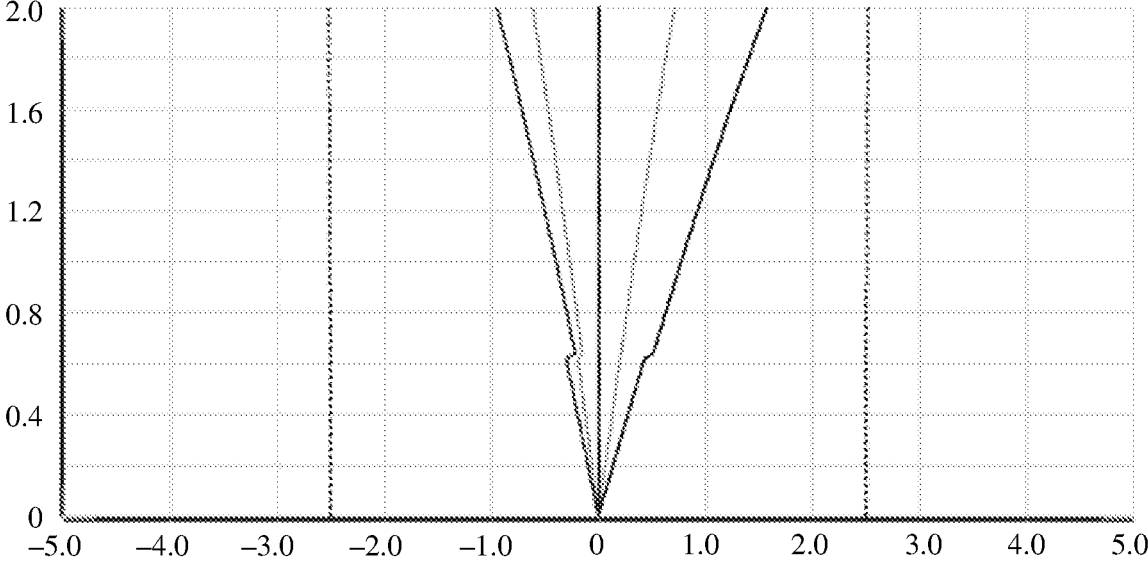
FIG. 26b is a line graph of lateral aberration of a camera lens shown in FIG. 25.

FIG. 26b shows curves of lateral aberration in the structure of the camera lens shown in FIG. 25 based on the data shown in Table 10-1, Table 10-2, Table 10-3, and Table 10-4. Five curves shown in FIG. 26b are curves of lateral aberration corresponding to designed wavelengths of 650 nm, 610 nm, 555 nm, 510 nm, and 470 nm respectively, and a dashed line indicates a diffraction limit range. It can be learned from FIG. 26b that lateral aberration of light with different wavelengths is within the diffraction range.

Figure 26C:
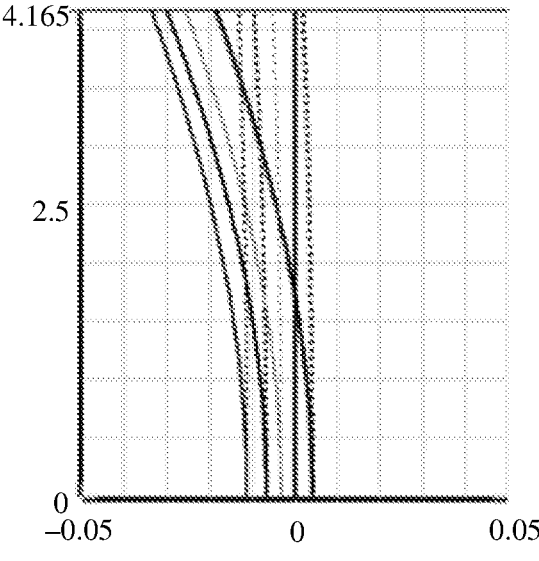
FIG. 26c is a line graph of distortion aberration of a camera lens shown in FIG. 25.
Figure 26D:
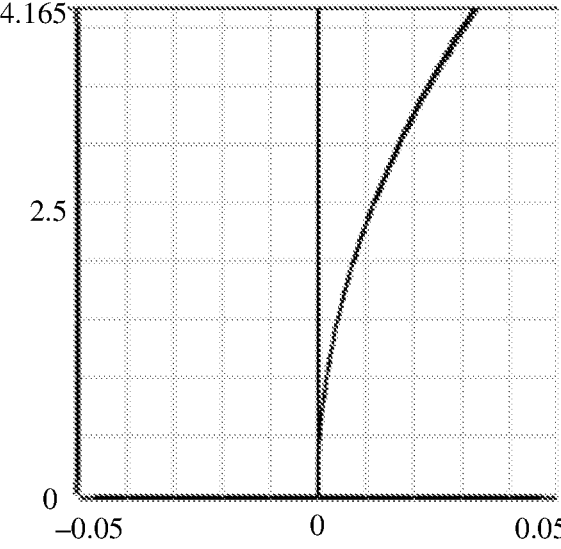
FIG. 26d is a line graph of ideal distortion aberration of a camera lens shown in FIG. 25.

FIG. 26c shows curves of distortion aberration in the structure of the camera lens shown in FIG. 25 based on the data shown in Table 10-1, Table 10-2, Table 10-3, and Table 10-4. FIG. 26d shows a curve of ideal distortion aberration. It can be learned through comparison between FIG. 26c and FIG. 26d that distortion aberration of light with different wavelengths is within a range recognizable to naked eyes.

In the camera lenses shown in FIG. 17, FIG. 19, FIG. 21, FIG. 23, and FIG. 25, the lens group G2 includes four lenses, and these camera lens structures may be referred to as combined four-piece lens groups.

In the foregoing combined four-piece lens groups, the ratio of the focal length f2 of the second lens to the total focal length f of the camera lens is as follows:

$$0.2 \le \left| \frac{f2}{f} \right| \le 1.3.$$

Figure 27:
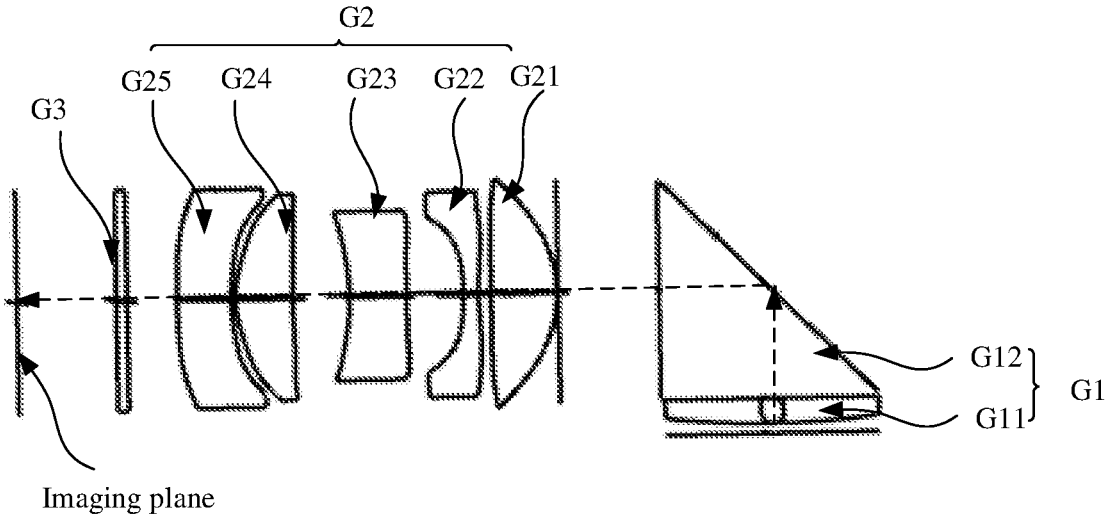
FIG. 27 is a schematic diagram of a structure of a camera lens according to an embodiment of this application.

FIG. 27 is a diagram of a structure of another camera lens. A lens group G2 includes five lenses. The five lenses are a second lens G21, a third lens G22, a fourth lens G23, a fifth lens G24, and a sixth lens G25 that are sequentially disposed along a second optical axis X2. An object-side surface of the second lens G21 is opposite to an image-side surface of a prism G12. In addition, the camera lens further includes an IR filter G3. An image-side surface of the fifth lens G24 is a convex surface, and an image-side surface of the sixth lens G25 is a convex surface.

A ratio of a focal length f1 of a refractive prism group G1 to a total focal length f of the camera lens is as follows:

$$\left| \frac{f1}{f} \right| = 1.297.$$

The second lens G21 has positive focal power, and a ratio of a focal length f2 of the second lens G21 to the total focal length f of the camera lens is as follows:

$$\left| \frac{f2}{f} \right| = 0.317.$$

The third lens G22 has negative focal power, and a ratio of a focal length f3 of the third lens G22 to the total focal length f of the camera lens is as follows:

$$\left| \frac{f3}{f} \right| = 0.253.$$

The fourth lens G23 has negative focal power, and a ratio of a focal length f4 of the fourth lens G23 to the total focal length f of the camera lens is as follows:

$$\left|\frac{f4}{f}\right| = 0.64.$$

The fifth lens G24 has positive focal power, and a ratio of a focal length f5 of the fifth lens G24 to the total focal length f of the camera lens is as follows:

$$\left|\frac{f5}{f}\right| = 0.185.$$

The sixth lens G25 has negative focal power, and a ratio of a focal length f6 of the sixth lens G25 to the total focal length f of the camera lens is as follows:

$$\left|\frac{f6}{f}\right| = 0.268.$$

In addition, a ratio of a total track length (total track length, TTL) of the camera lens to the total focal length f of the camera lens is as follows:

$$\frac{TTL}{f} = 1.036.$$

A ratio of an image height of the camera lens to the total focal length f of the camera lens is as follows:

$$\frac{IMH}{f} = 0.157.$$

Table 11-1 shows optical parameters of the camera lens.

TABLE 11-1

| | Optical parameter |
| --- | --- |
| System focal length (F) | 14.37 mm |
| Aperture number (F/#) | 3.34 |
| Image height (IMH) | 2.25 mm |

TABLE 11-1-continued

| | Optical parameter |
| --- | --- |
| Total track length (TTL) | 14.9 mm |
| Designed wavelength | 650 nm, 610 nm, 555 nm, 510 nm, and 470 nm |

Table 11-2 shows optical parameters of optical components in the camera lens.

TABLE 11-2

| | | Radius | | Thickness | | nd | | vd |
| --- | --- | --- | --- | --- | --- | --- | --- | --- |
| G1 | R1 | 16.873 | d1 | 0.5 | n1 | 1.90 | v1 | 37.05 |
| | R2 | Infinity | d2 | 0 | | | | |
| | A-01 | Infinity | d3 | 2.2 | n2 | 1.90 | v2 | 37.05 |
| | B-03 | Infinity | d4 | 2.2 | | | | |
| | C-02 | Infinity | d5 | 2.03 | | | | |
| G21 | R1 | −2.588 | d6 | 1.3 | n1 | 1.54 | v1 | 55.86 |
| | R2 | 53.188 | d7 | 0.25 | | | | |
| G22 | R1 | 5.344 | d8 | 0.297 | n1 | 1.650 | v1 | 21.53 |
| | R2 | −4.396 | d9 | 1.125 | | | | |
| G23 | R1 | −29.197 | d10 | 1.137 | n1 | 1.54 | v1 | 55.86 |
| | R2 | −4.23 | d11 | 1.13 | | | | |
| G24 | R1 | 7.644 | d13 | 1.137 | n1 | 1.65 | v1 | 21.53 |
| | R2 | 1.506 | d14 | 0.091 | | | | |
| G25 | R1 | 2.259 | d15 | 1.059 | n1 | 1.65 | v1 | 21.53 |
| | R2 | 25.142 | d16 | 1.00 | | | | |
| G3 | R1 | Infinity | d17 | 0.21 | n1 | 1.51 | v1 | 64.16 |
| | R2 | Infinity | d18 | 1.97 | | | | |

Table 11-3 shows aspheric coefficients of the lenses in Table 11-2.

TABLE 11-3

| | | Type | K | Norm Rad | a2 | a3 | a4 | a5 |
| --- | --- | --- | --- | --- | --- | --- | --- | --- |
| G21 | R1 | EA | 0.00 | 1.206 | −5.02E−03 | −1.28E−03 | 1.90E−03 | −5.61E−06 |
| | R2 | EA | 44.46 | 1.206 | −2.97E−02 | 2.07E−02 | −3.44E−03 | 5.49E−05 |
| G22 | R1 | EA | −50.00 | 1.206 | −2.09E−02 | −5.48E−02 | 3.51E−02 | −6.06E−03 |
| | R2 | EA | 6.64 | 1.206 | −6.20E−02 | −2.27E−03 | −7.15E−02 | 3.58E−02 |
| G23 | R1 | EA | 0.00 | 1.206 | 8.54E−02 | −3.57E−02 | −2.95E−03 | −2.11E−04 |
| | R2 | EA | −27.75 | 1.206 | −7.11E−02 | 5.93E−02 | −1.84E−02 | −7.61E−05 |
| G24 | R1 | EA | 0.00 | 1.206 | −8.72E−02 | 2.19E−02 | 2.77E−03 | −9.68E−04 |
| | R2 | EA | −12.05 | 1.206 | 1.46E−02 | 1.74E−02 | −2.50E−03 | 1.03E−04 |
| G25 | R1 | EA | −47.55 | 1.206 | −2.57E−02 | 9.35E−02 | −2.88E−02 | 2.21E−03 |
| | R2 | EA | 45.97 | 1.206 | 2.69E−02 | 5.91E−03 | −2.38E−03 | 9.77E−05 |

The camera lens includes a total of 10 extended aspheric surfaces (Extended Asphere, EA).

In this embodiment, vector heights Z of all extended aspheric surfaces may be defined by using the following formula, but are not limited to the following formula:

$$Z = \frac{Cr^2}{1 + \sqrt{1 - (K+1)C^2 r^2}} + a_1 r^2 + a_2 r^4 + a_3 r^6 + a_4 r^8 + a_5 r^{10} + \ldots,$$

where

Z indicates a vector height of an aspheric surface, r indicates a radial coordinate of the aspheric surface, C indicates vertex curvature of the aspheric surface, and $a_1$, $a_2$, $a_3$, and the like are aspheric coefficients.

Figure 28A:
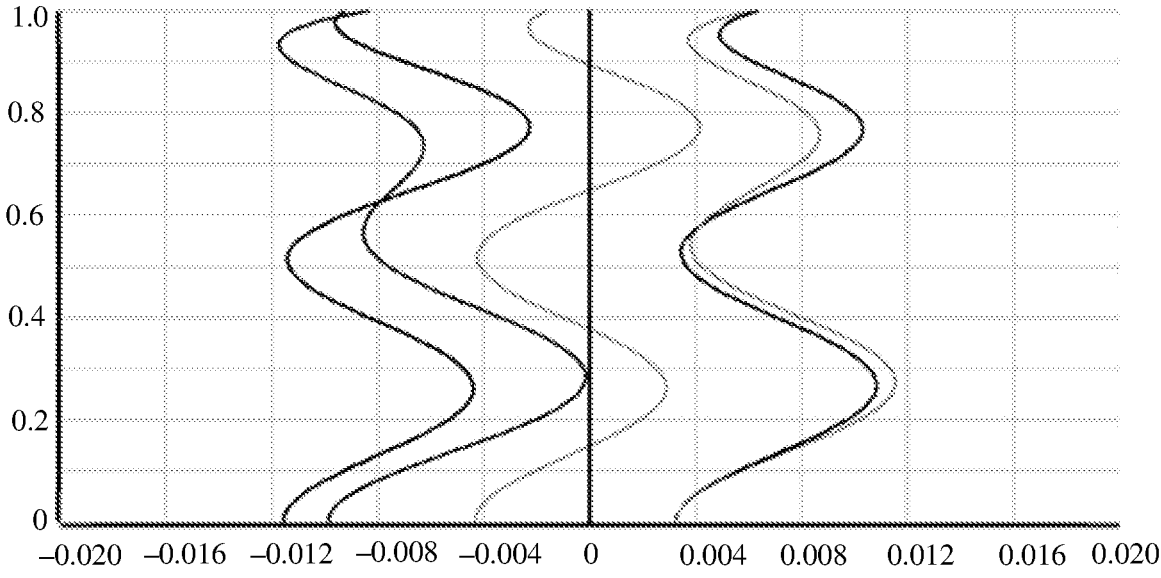
FIG. 28a is a line graph of axial aberration of a camera lens shown in FIG. 27.

FIG. 28a shows curves of axial aberration in the structure of the camera lens shown in FIG. 27 based on the data shown in Table 11-1, Table 11-2, and Table 11-3. Five curves shown in FIG. 28a are curves of axial aberration corresponding to designed wavelengths of 650 nm, 610 nm, 555 nm, 510 nm, and 470 nm respectively. It can be learned from FIG. 28a that axial aberration of light with different wavelengths is controlled within a quite small range.

Figure 28B:
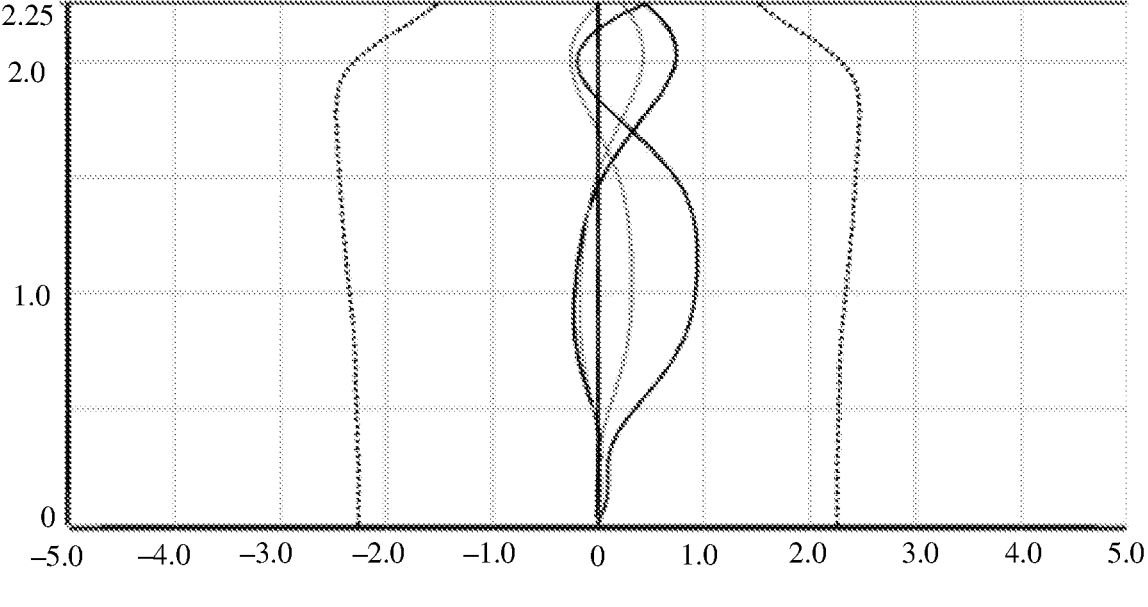
FIG. 28b is a line graph of lateral aberration of a camera lens shown in FIG. 27.

FIG. 28b shows curves of lateral aberration in the structure of the camera lens shown in FIG. 27 based on the data shown in Table 11-1, Table 11-2, and Table 11-3. Five curves shown in FIG. 28b are curves of lateral aberration corresponding to designed wavelengths of 650 nm, 610 nm, 555 nm, 510 nm, and 470 nm respectively, and a dashed line indicates a diffraction limit range. It can be learned from FIG. 28b that lateral aberration of light with different wavelengths is within the diffraction range.

Figure 28C:
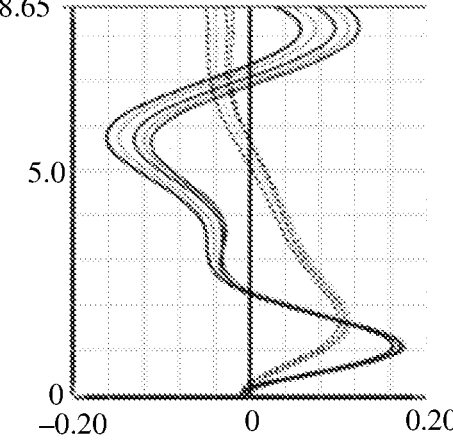
FIG. 28c is a line graph of distortion aberration of a camera lens shown in FIG. 27.
Figures 28D, 29:
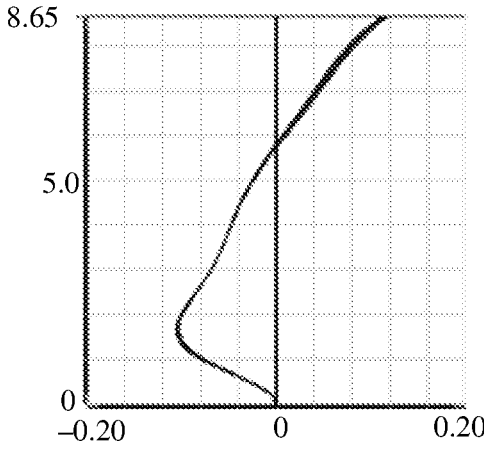
FIG. 28d is a line graph of ideal distortion aberration of a camera lens shown in FIG. 27.
FIG. 29 is a schematic diagram of a structure of a camera lens according to an embodiment of this application.

FIG. 28c shows curves of distortion aberration in the structure of the camera lens shown in FIG. 27 based on the data shown in Table 11-1, Table 11-2, and Table 11-3. FIG. 28d shows a curve of ideal distortion aberration. It can be learned through comparison between FIG. 28c and FIG. 28d that distortion aberration of light with different wavelengths is within a range recognizable to naked eyes.

FIG. 29 is a diagram of a structure of another camera lens. A lens group G2 includes five lenses. The five lenses are a second lens G21, a third lens G22, a fourth lens G23, a fifth lens G24, and a sixth lens G25 that are sequentially disposed along a second optical axis X2. An object-side surface of the second lens G21 is opposite to an image-side surface of a prism G12. In addition, the camera lens further includes an IR filter G3. An image-side surface of the fifth lens G24 is a convex surface.

A ratio of a focal length f1 of a refractive prism group G1 to a total focal length f of the camera lens is as follows:

$$\left| \frac{f1}{f} \right| = 2.536.$$

The second lens G21 has positive focal power, and a ratio of a focal length f2 of the second lens G21 to the total focal length f of the camera lens is as follows:

$$\left| \frac{f2}{f} \right| = 0.379.$$

The third lens G22 has negative focal power, and a ratio of a focal length f3 of the third lens G22 to the total focal length f of the camera lens is as follows:

$$\left| \frac{f3}{f} \right| = 0.489.$$

The fourth lens G23 has negative focal power, and a ratio of a focal length f4 of the fourth lens G23 to the total focal length f of the camera lens is as follows:

$$\left| \frac{f4}{f} \right| = 0.792.$$

The fifth lens G24 has positive focal power, and a ratio of a focal length f5 of the fifth lens G24 to the total focal length f of the camera lens is as follows:

$$\left| \frac{f5}{f} \right| = 0.279.$$

The sixth lens G25 has negative focal power, and a ratio of a focal length f6 of the sixth lens G25 to the total focal length f of the camera lens is as follows:

$$\left| \frac{f6}{f} \right| = 0.361.$$

In addition, a ratio of a total track length (total track length, TTL) of the camera lens to the total focal length f of the camera lens is as follows:

$$\frac{TTL}{f} = 1.104.$$

A ratio of an image height of the camera lens to the total focal length f of the camera lens is as follows:

$$\frac{IMH}{f} = 0.156.$$

Table 12-1 shows optical parameters of the camera lens.

TABLE 12-1

| | Optical parameter |
| --- | --- |
| System focal length (F) | 14.44 mm |
| Aperture number (F/#) | 3.38 |
| Image height (IMH) | 2.25 mm |
| Total track length (TTL) | 15.9 mm |
| Designed wavelength | 650 nm, 610 nm, 555 nm, 510 nm, and 470 nm |

Table 12-2 shows optical parameters of optical components in the camera lens.

TABLE 12-2

| | | Radius | | Thickness | | nd | | vd |
| --- | --- | --- | --- | --- | --- | --- | --- | --- |
| G1 | R1 | 24.818 | d1 | 0.5 | n1 | 1.63 | v1 | 24 |
| | R2 | Infinity | d2 | 0.1 | n1 | 1.90 | v1 | 37.05 |
| | Binary 2 | | | | | | | |
| | A-01 | Infinity | d3 | 2.2 | n2 | 1.90 | v2 | 37.05 |
| | B-03 | Infinity | d4 | 2.2 | | | | |
| | C-02 | Infinity | d5 | 2.03 | | | | |
| G21 | R1 | −2.734 | d6 | 1.3 | n1 | 1.54 | v1 | 55.86 |
| | R2 | −26.953 | d7 | 0.25 | | | | |
| G22 | R1 | 87.477 | d8 | 0.297 | n1 | 1.650 | v1 | 21.53 |
| | R2 | −4.904 | d9 | 1.211 | | | | |
| G23 | R1 | −29.01 | d10 | 0.343 | n1 | 1.54 | v1 | 55.86 |
| | R2 | −5.116 | d11 | 1.096 | | | | |
| G24 | R1 | 4.551 | d13 | 0.984 | n1 | 1.65 | v1 | 21.53 |
| | R2 | 1.816 | d14 | 0.086 | | | | |
| G25 | R1 | 2.983 | d15 | 0.574 | n1 | 1.65 | v1 | 21.53 |
| | R2 | 25.142 | d16 | 1.013 | | | | |
| G3 | R1 | Infinity | d17 | 0.21 | n1 | 1.51 | v1 | 64.16 |
| | R2 | Infinity | d18 | 4.397 | | | | |

Table 12-3 shows aspheric coefficients of the lenses in Table 12-2.

TABLE 12-3

| | | Type | K | Norm Rad | a2 | a3 | a4 | a5 |
|---|---|---|---|---|---|---|---|---|
| G21 | R1 | EA | 0.00 | 1.206 | −6.6890E−03 | 9.5986E−05 | 5.0331E−04 | −5.6132E−06 |
| | R2 | EA | 44.46 | 1.206 | −1.8564E−02 | 9.2626E−03 | −1.4363E−03 | 5.4934E−05 |
| G22 | R1 | EA | −50.00 | 1.206 | −2.6173E−02 | −3.4575E−02 | 1.5572E−02 | −1.8848E−03 |
| | R2 | EA | 6.64 | 1.206 | −1.9182E−02 | −4.7482E−02 | −1.1398E−03 | 2.3351E−03 |
| G23 | R1 | EA | 0.00 | 1.206 | 4.8108E−02 | −1.1214E−02 | −5.4199E−03 | −2.1081E−04 |
| | R2 | EA | −27.75 | 1.206 | −2.6036E−02 | 4.0110E−02 | −1.5614E−02 | −7.6137E−05 |
| G24 | R1 | EA | 0.00 | 1.206 | −5.7529E−02 | 2.4011E−02 | −4.2569E−05 | −9.6843E−04 |
| | R2 | EA | −12.05 | 1.206 | 5.8719E−02 | 4.0044E−03 | −1.3005E−03 | 1.0331E−04 |
| G25 | R1 | EA | −47.55 | 1.206 | 5.8848E−02 | 6.0604E−02 | −2.5079E−02 | 2.2110E−03 |
| | R2 | EA | 45.97 | 1.206 | 5.8953E−02 | −1.0575E−03 | −2.3201E−03 | 9.7718E−05 |

The camera lens includes a total of 10 extended aspheric surfaces.

In this embodiment, vector heights z of all extended aspheric surfaces may be defined by using the following formula, but are not limited to the following formula:

$$Z = \frac{Cr^2}{1 + \sqrt{1 - (K+1)C^2 r^2}} + a_1 r^2 + a_2 r^4 + a_3 r^6 + a_4 r^8 + a_5 r^{10} + \dots ,$$

where

Z indicates a vector height of an aspheric surface, r indicates a radial coordinate of the aspheric surface, C indicates vertex curvature of the aspheric surface, and $a_1$, $a_2$, $a_3$, and the like are aspheric coefficients.

Figure 30A:
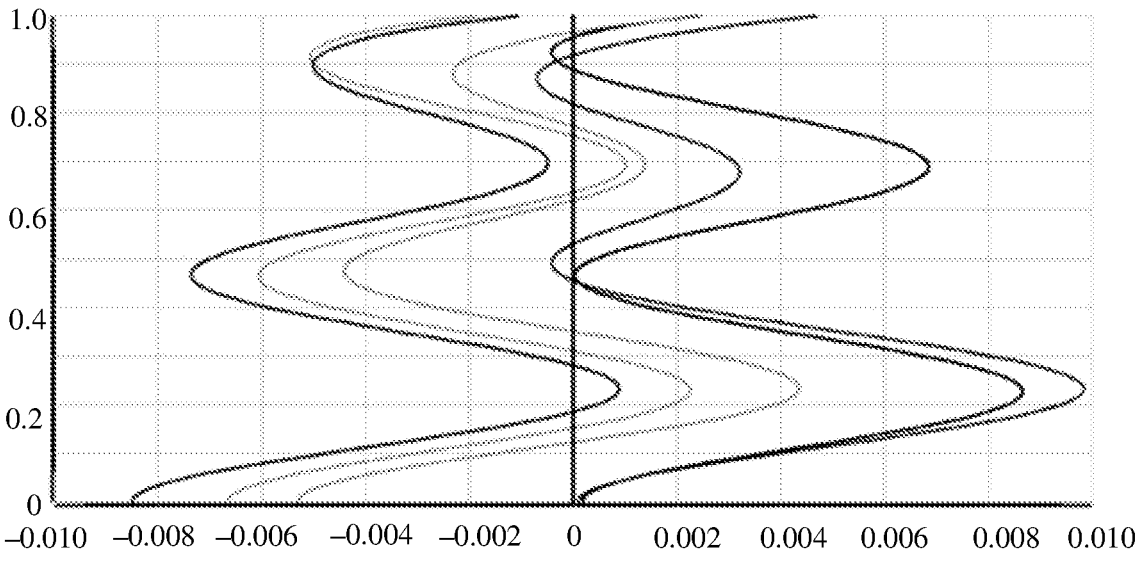
FIG. 30a is a line graph of axial aberration of a camera lens shown in FIG. 29.

FIG. 30a shows curves of axial aberration in the structure of the camera lens shown in FIG. 29 based on the data shown in Table 12-1, Table 12-2, and Table 12-3. Five curves shown in FIG. 30a are curves of axial aberration corresponding to designed wavelengths of 650 nm, 610 nm, 555 nm, 510 nm, and 470 nm respectively. It can be learned from FIG. 30a that axial aberration of light with different wavelengths is controlled within a quite small range.

Figure 30B:
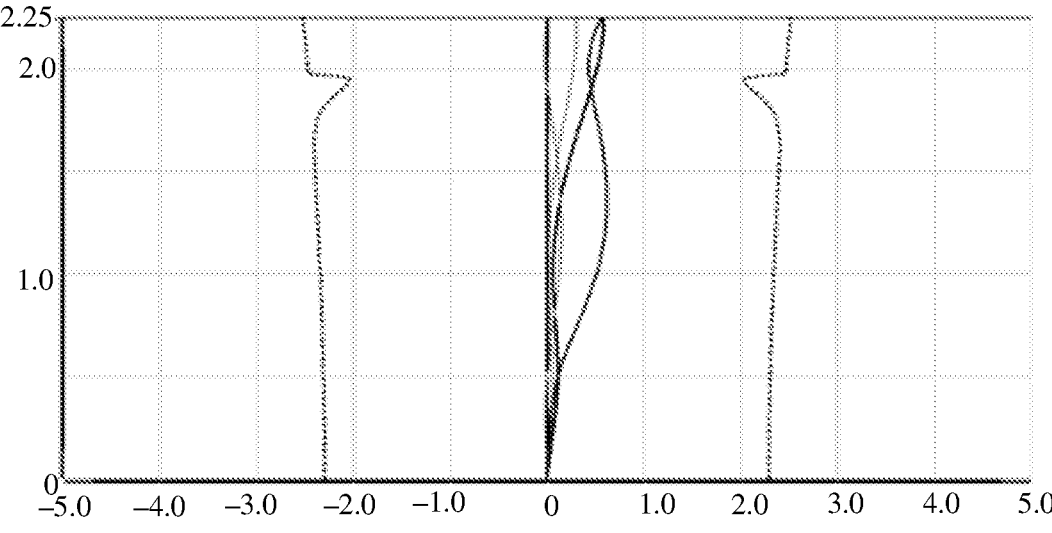
FIG. 30b is a line graph of lateral aberration of a camera lens shown in FIG. 29.

FIG. 30b shows curves of lateral aberration in the structure of the camera lens shown in FIG. 29 based on the data shown in Table 12-1, Table 12-2, and Table 12-3. Five curves shown in FIG. 30b are curves of lateral aberration corresponding to designed wavelengths of 650 nm, 610 nm, 555 nm, 510 nm, and 470 nm respectively, and a dashed line indicates a diffraction limit range. It can be learned from FIG. 30b that lateral aberration of light with different wavelengths is within the diffraction range.

Figure 30C:
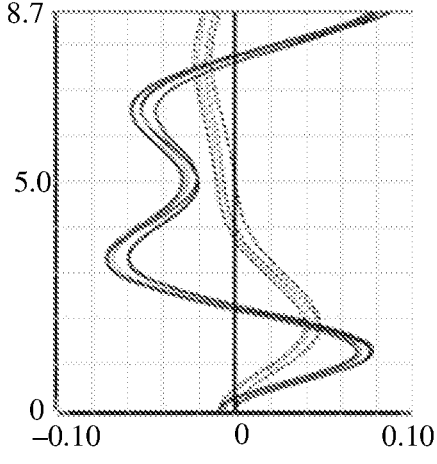
FIG. 30c is a line graph of distortion aberration of a camera lens shown in FIG. 29.
Figure 30D:
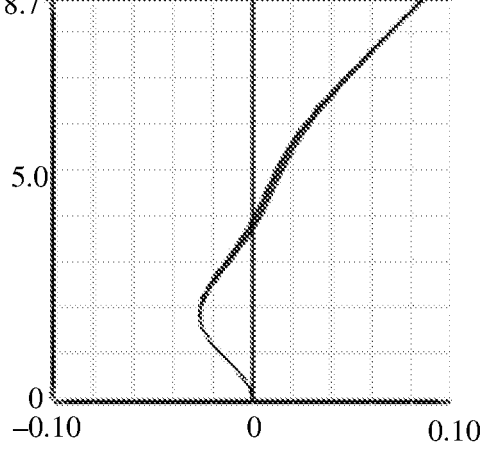
FIG. 30d is a line graph of ideal distortion aberration of a camera lens shown in FIG. 29.

FIG. 30c shows curves of distortion aberration in the structure of the camera lens shown in FIG. 29 based on the data shown in Table 12-1, Table 12-2, and Table 12-3. FIG. 30d shows a curve of ideal distortion aberration. It can be learned through comparison between FIG. 30c and FIG. 30d that distortion aberration of light with different wavelengths is within a range recognizable to naked eyes.

Figure 31:
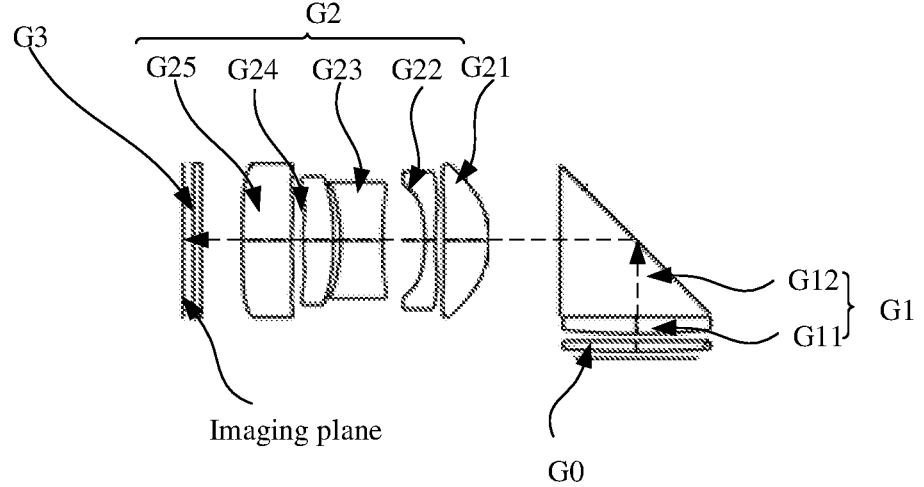
FIG. 31 is a schematic diagram of a structure of a camera lens according to an embodiment of this application.

FIG. 31 is a diagram of a structure of another camera lens. A lens group G2 includes five lenses. The five lenses are a second lens G21, a third lens G22, a fourth lens G23, a fifth lens G24, and a sixth lens G25 that are sequentially disposed along a second optical axis X2. An object-side surface of the second lens G21 is opposite to an image-side surface of a prism G12. In addition, the camera lens further includes an IR filter G3. In addition, the camera lens further includes a zoom liquid lens G0. The zoom liquid lens G0 is disposed on a side of an image-side surface of the first lens G11. An image-side surface of the sixth lens G25 is a convex surface.

A ratio of a focal length f1 of a refractive prism group G1 to a total focal length f of the camera lens is as follows:

$$8.8 < \left| \frac{f1}{f} \right|.$$

The second lens G21 has negative focal power, and a ratio of a focal length f2 of the second lens G21 to the total focal length f of the camera lens is as follows:

$$1.2 < \left| \frac{f2}{f} \right| < 1.64.$$

The third lens G22 has positive focal power, and a ratio of a focal length f3 of the third lens G22 to the total focal length f of the camera lens is as follows:

$$0.28 < \left| \frac{f3}{f} \right| < 0.38.$$

The fourth lens G23 has negative focal power, and a ratio of a focal length f4 of the fourth lens G23 to the total focal length f of the camera lens is as follows:

$$0.23 < \left| \frac{f4}{f} \right| < 0.31.$$

The fifth lens G24 has negative focal power, and a ratio of a focal length f5 of the fifth lens G24 to the total focal length f of the camera lens is as follows:

$$0.44 < \left| \frac{f5}{f} \right| < 0.59.$$

The sixth lens G25 has positive focal power, and a ratio of a focal length f6 of the sixth lens G25 to the total focal length f of the camera lens is as follows:

$$0.56 < \left| \frac{f6}{f} \right| < 0.76.$$

In addition, a ratio of a total track length (total track length, TTL) of the camera lens to the total focal length f of the camera lens is as follows:

$$1.01 < \frac{TTL}{f} < 1.074.$$

A ratio of an image height of the camera lens to the total focal length f of the camera lens is as follows:

$$0.18 < \frac{IMH}{f} < 0.14.$$

Table 13-1 shows optical parameters of the camera lens.

TABLE 13-1

| | Optical parameter |
|---|---|
| System focal length (F) | 12.14 mm < F < 16.18 mm |
| Aperture number (F/#) | 3.40 |
| Image height (IMH) | 2.25 mm |
| Total track length (TTL) | 13 mm < TTL < 16.4 mm |
| Designed wavelength | 650 nm, 610 nm, 555 nm, 510 nm, and 470 nm |

Table 13-2 shows optical parameters of optical components in the camera lens.

TABLE 13-2

| | | R | Thickness | | nd | | vd |
|---|---|---|---|---|---|---|---|
| G0 | R1 | Infinity/ | 0.3 | n1 | 1.29 | v1 | 108.49 |
| (zoom | | 31.392/−38.439 | | | | | |
| liquid | R2 | Infinity | 0.1 | n1 | 1.51 | v1 | 64.16 |
| lens) | R3 | Infinity | 0.2 | | | | |
| G1 | R1 | 17.931 | d1 | 0.5 | n1 | 1.90 | v1 | 37.05 |
| | R2 | Infinity | d2 | 0 | | | |
| | A-01 | Infinity | d3 | 2.2 | n2 | 1.90 | v2 | 37.05 |
| | B-03 | Infinity | d4 | 2.2 | | | |
| | C-02 | Infinity | d5 | 2.03 | | | |
| G21 | R1 | −2.588 | d6 | 1.3 | n1 | 1.54 | v1 | 55.86 |
| | R2 | 53.188 | d7 | 0.25 | | | |
| G22 | R1 | 4.916 | d8 | 0.297 | n1 | 1.65 | v1 | 21.53 |
| | R2 | −4.969 | d9 | 1.216 | | | |
| G23 | R1 | 49.381 | d10 | 1.198 | n1 | 1.54 | v1 | 55.86 |
| | R2 | −4.27 | d11 | 0.209 | | | |
| G24 | R1 | −11.773 | d12 | 0.885 | n1 | 1.65 | v1 | 21.53 |
| | R2 | 3.837 | d13 | 0.321 | | | |
| G25 | R1 | 4.757 | d14 | 1.421 | n1 | 1.65 | v1 | 21.53 |
| | R2 | 25.142 | d15 | 1.187 | | | |
| G3 | R1 | Infinity | d16 | 0.21 | n1 | 1.51 | v1 | 64.16 |
| | R2 | Infinity | d17 | 1.93 | | | |

Table 11-3 shows aspheric coefficients of the lenses in Table 11-2.

TABLE 13-3

| | | Type | K | Norm Rad | a2 | a3 | a4 | a5 |
|---|---|---|---|---|---|---|---|---|
| G21 | R1 | EA | 0.00 | 1.206 | −7.44E−03 | −2.47E−03 | 2.18E−03 | −5.61E−06 |
| | R2 | EA | 44.46 | 1.206 | −5.60E−02 | 2.52E−02 | −3.19E−03 | 5.49E−05 |
| G22 | R1 | EA | −50.00 | 1.206 | −3.97E−03 | −5.05E−02 | 2.13E−02 | −2.46E−03 |
| | R2 | EA | 6.64 | 1.206 | −3.03E−02 | 5.96E−03 | −5.04E−02 | 1.87E−02 |
| G23 | R1 | EA | 0.00 | 1.206 | 8.11E−02 | −2.64E−02 | −3.40E−03 | −2.11E−04 |
| | R2 | EA | −27.75 | 1.206 | −4.41E−02 | 3.22E−02 | −1.68E−02 | −7.61E−05 |
| G24 | R1 | EA | 0.00 | 1.206 | −6.45E−02 | 2.96E−02 | −4.05E−03 | −9.68E−04 |
| | R2 | EA | −12.05 | 1.206 | −1.98E−01 | 8.04E−02 | −9.67E−03 | 1.03E−04 |
| G25 | R1 | EA | −47.55 | 1.206 | −1.32E−01 | 6.47E−02 | −1.44E−02 | 2.21E−03 |
| | R2 | EA | 45.97 | 1.206 | −8.96E−03 | 7.36E−03 | −4.65E−04 | 9.77E−05 |

The camera lens includes a total of 10 extended aspheric surfaces.

In this embodiment, vector heights z of all extended aspheric surfaces may be defined by using the following formula, but are not limited to the following formula:

$$Z = \frac{Cr^2}{1 + \sqrt{1 - (K+1)C^2 r^2}} + a_1 r^2 + a_2 r^4 + a_3 r^6 + a_4 r^8 + a_5 r^{10} + \dots,$$

where

Z indicates a vector height of an aspheric surface, r indicates a radial coordinate of the aspheric surface, C indicates vertex curvature of the aspheric surface, and $a_1$, $a_2$, $a_3$, and the like are aspheric coefficients.

Figure 32A:
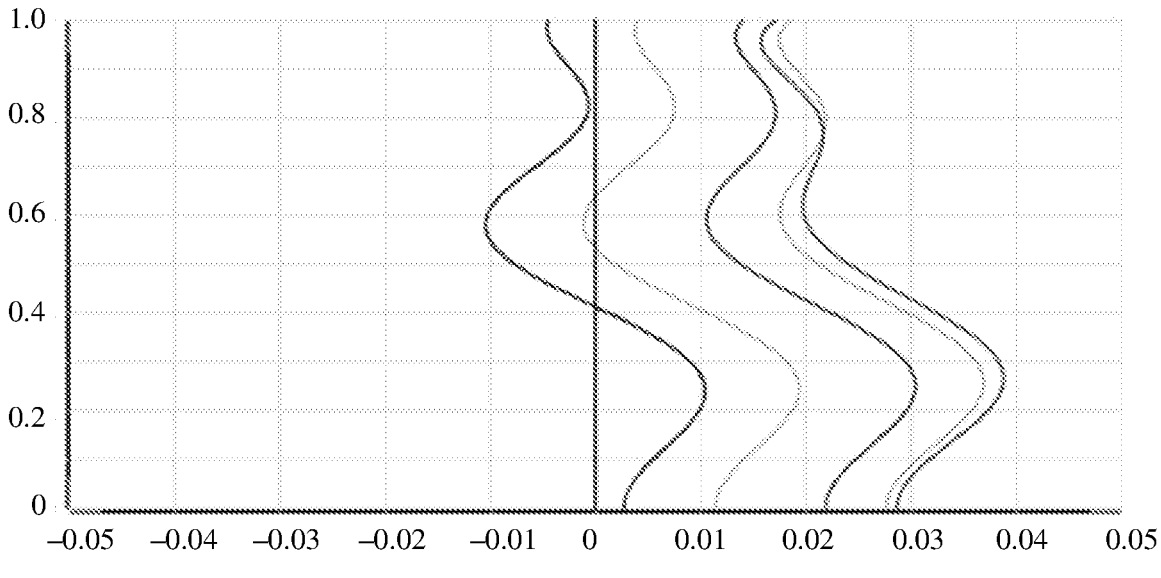
FIG. 32a is a line graph of axial aberration of a camera lens shown in FIG. 31.

FIG. 32a shows curves of axial aberration in the structure of the camera lens shown in FIG. 31 based on the data shown in Table 13-1, Table 13-2, and Table 13-3. Five curves shown in FIG. 32a are curves of axial aberration corresponding to designed wavelengths of 650 nm, 610 nm, 555 nm, 510 nm, and 470 nm respectively. It can be learned from FIG. 32a that axial aberration of light with different wavelengths is controlled within a quite small range.

Figure 32B:
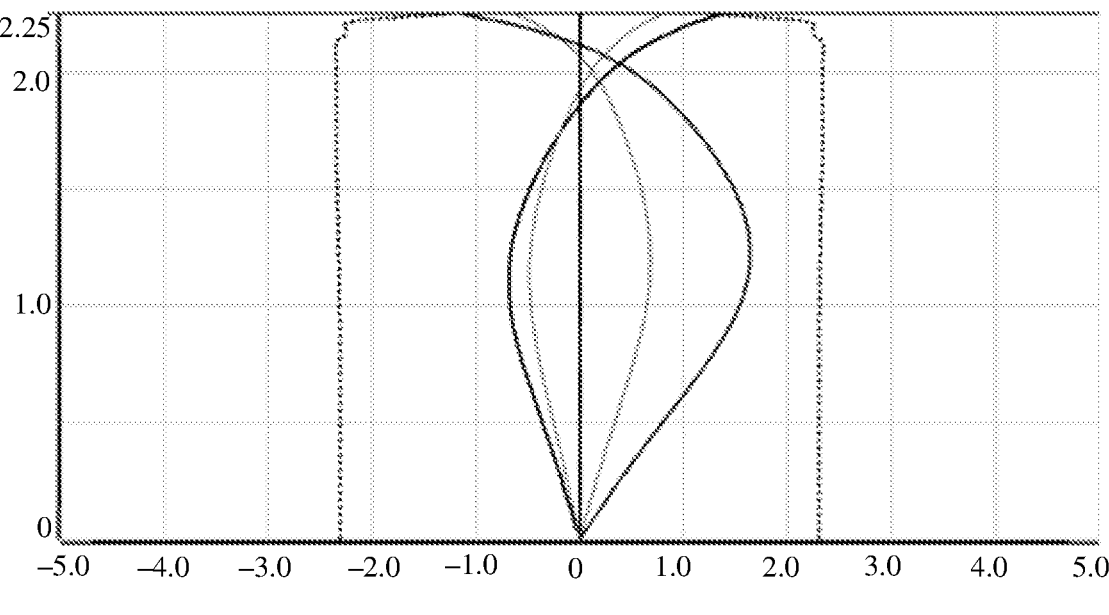
FIG. 32b is a line graph of lateral aberration of a camera lens shown in FIG. 31.

FIG. 32b shows curves of lateral aberration in the structure of the camera lens shown in FIG. 31 based on the data shown in Table 13-1, Table 13-2, and Table 13-3. Five curves shown in FIG. 32b are curves of lateral aberration corresponding to designed wavelengths of 650 nm, 610 nm, 555 nm, 510 nm, and 470 nm respectively, and a dashed line indicates a diffraction limit range. It can be learned from FIG. 32b that lateral aberration of light with different wavelengths is within the diffraction range.

Figure 32C:
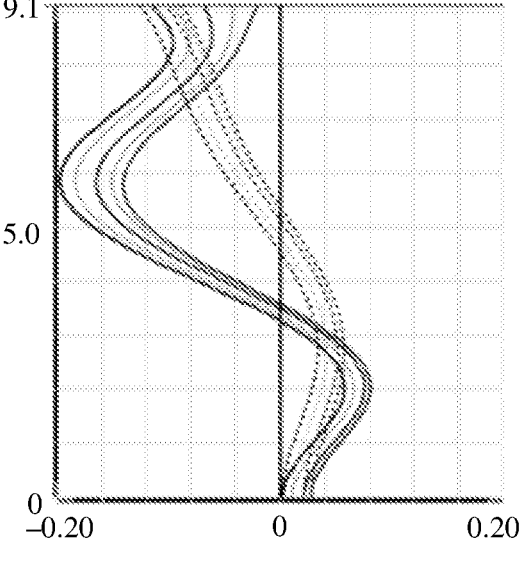
FIG. 32c is a line graph of distortion aberration of a camera lens shown in FIG. 31.
Figures 32D, 33:
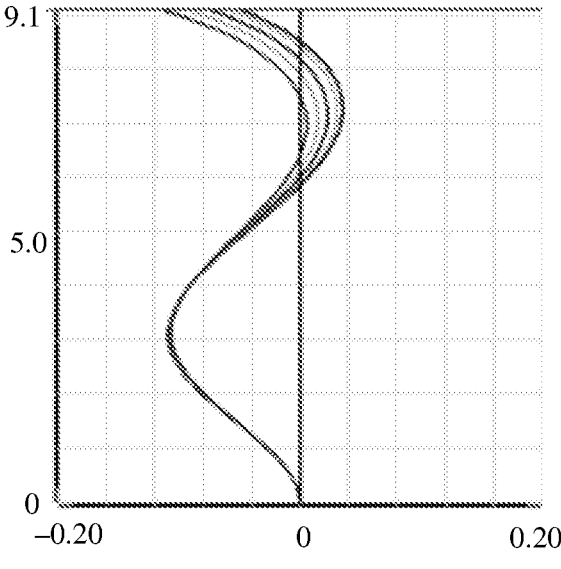
FIG. 32d is a line graph of ideal distortion aberration of a camera lens shown in FIG. 31.
FIG. 33 is a schematic diagram of a structure of a camera lens according to an embodiment of this application.

FIG. 32c shows curves of distortion aberration in the structure of the camera lens shown in FIG. 31 based on the data shown in Table 13-1, Table 13-2, and Table 13-3. FIG. 32d shows a curve of ideal distortion aberration. It can be learned through comparison between FIG. 32c and FIG. 32d that distortion aberration of light with different wavelengths is within a range recognizable to naked eyes.

FIG. 33 is a diagram of a structure of another camera lens. A lens group G2 includes five lenses. The five lenses are a second lens G21, a third lens G22, a fourth lens G23, a fifth lens G24, and a sixth lens G25 that are sequentially disposed along a second optical axis X2. An object-side surface of the second lens G21 is opposite to an image-side surface of a prism G12. In addition, the camera lens further includes an IR filter G3. An image-side surface of the sixth lens G25 is a convex surface.

A ratio of a focal length f1 of a refractive prism group G1 to a total focal length f of the camera lens is as follows:

$$\left|\frac{f1}{f}\right| = 0.533.$$

The second lens G21 has negative focal power, and a ratio of a focal length f2 of the second lens G21 to the total focal length f of the camera lens is as follows:

$$\left|\frac{f2}{f}\right| = 17.926.$$

The third lens G22 and the fourth lens G23 form a glued lens. The glued lens has negative focal power, and a ratio of a focal length f3 of the glued lens to the total focal length f of the camera lens is as follows:

$$\left|\frac{f3}{f}\right| = 0.467.$$

The fifth lens G24 has negative focal power, and a ratio of a focal length f5 of the fifth lens G24 to the total focal length f of the camera lens is as follows:

$$\left|\frac{f5}{f}\right| = 0.433.$$

The sixth lens G25 has positive focal power, and a ratio of a focal length f6 of the sixth lens G25 to the total focal length f of the camera lens is as follows:

$$\left|\frac{f6}{f}\right| = 0.32.$$

In addition, a ratio of a total track length (total track length, TTL) of the camera lens to the total focal length f of the camera lens is as follows:

$$\frac{TTL}{f} = 0.965.$$

A ratio of an image height of the camera lens to the total focal length f of the camera lens is as follows:

$$\frac{IMH}{f} = 0.088.$$

Table 14-1 shows optical parameters of the camera lens.

TABLE 14-1

| | Optical parameter |
|---|---|
| System focal length (F) | 28.39 mm |
| Aperture number (F/#) | 3.81 |
| Image height (IMH) | 2.5 mm |
| Total track length (TTL) | 27.45 mm |
| Designed wavelength | 650 nm, 610 nm, 555 nm, 510 nm, and 470 nm |

Table 14-2 shows optical parameters of optical components in the camera lens.

TABLE 14-2

| | | Radius | | Thickness | | nd | | vd |
|---|---|---|---|---|---|---|---|---|
| G1 | R1 | 9.4 | d1 | 1.2 | n1 | 1.62 | v1 | 63.85 |
| | R2 | Infinity | d2 | 0 | n1 | 1.90 | v1 | 37.05 |
| | A-01 | Infinity | d3 | 4 | n2 | 1.90 | v2 | 37.05 |
| | B-03 | Infinity | d4 | 4 | | | | |
| | C-02 | Infinity | d5 | 0.662 | | | | |
| G21 | R1 | 6.698 | d6 | 1.088 | n1 | 1.76 | v1 | 49.64 |
| | R2 | 7.296 | d7 | 0.075 | | | | |
| G22 | R1 | −158.042 | d8 | 0.525 | n1 | 1.60 | v1 | 65.45 |
| | R2 | Infinity | d9 | 0.3 | | 1.62 | | 24.26 |
| G23 | R1binary2 | −8.38 | d10 | 0.864 | | | | |
| G24 | R1 | −45.938 | d11 | 0.6 | n1 | 1.74 | v1 | 27.76 |
| | R2 | −7.605 | d12 | 0.987 | | | | |
| G25 | R1 | −9.099 | d13 | 1.319 | n1 | 1.90 | v1 | 37.05 |
| | R2 | 80.00 | d14 | 0.976 | | | | |
| G3 | R1 | Infinity | d15 | 0.193 | n1 | 1.51 | v1 | 64.16 |
| | R2 | Infinity | d16 | 15.345 | | | | |

Table 14-3 shows aspheric coefficients of the lenses in Table 14-2. An image-side surface and an object-side surface of the second lens G21 each are an even-order aspheric surface.

TABLE 14-3

| | | Type | K | A2 | A3 | A4 | A5 |
|---|---|---|---|---|---|---|---|
| G21 | R1 | Even-order aspheric surface | 0.0 | −1.43E−03 | 2.06E−06 | 5.01E−06 | −2.25E−06 |
| | R2 | Even-order aspheric surface | 0.0 | −1.66E−03 | 3.71E−05 | −1.10E−06 | −7.62E−07 |

| | | Type | K | A6 | A7 | A8 |
|---|---|---|---|---|---|---|
| | R1 | Even-order aspheric surface | 0.0 | 4.01E−07 | −3.95E−08 | 1.53E−09 |

TABLE 14-3-continued

| | | | | | |
|---|---|---|---|---|---|
| R2 | Even-order aspheric surface | 0.0 | 1.60E−07 | −1.79E−08 | 7.40E−10 |

Table 14-4 shows a diffractive coefficient of the fourth lens G23.

TABLE 14-4

| | Binary 2 | | | | |
|---|---|---|---|---|---|
| Diffraction order (Diffract Order) | Norm radius (Norm Radius) | coeff. on p^2 | coeff. on p^4 | coeff. on p^6 | coeff. on p^8 |
| G4 R1 | 1 | 2.533 | 1.50E+02 | −8.35E+01 | 4.24E+01 | 0.00E+00 |

It can be learned from Table 14-3 that the camera lens provided in this embodiment includes two aspheric surfaces. In this embodiment, vector heights z of all even-order aspheric surfaces may also be defined by using the following formula, but are not limited to the following formula:

$$Z = \frac{CX^2}{1 + \sqrt{1 - KC^2X^2}} + A_2r^4 + A_3r^6 + A_4r^8 + A_5r^{10} + A_6r^{12},$$

where

Z indicates a vector height of an aspheric surface, r indicates a radial coordinate of the aspheric surface, and C indicates vertex curvature of the aspheric surface.

In this embodiment, a vector height Z2 of the binary 2 diffractive surface may be defined by using the following formula:

$$Z2 = \frac{Cr^2}{1 + \sqrt{1 - KC^2r^2}} + \sum_{i=1}^{8} a_i r^{2i} + M \sum_{J=1}^{N} A_j p^{2j},$$

where

M indicates a diffraction order, P indicates a phase distribution power, A indicates a phase distribution coefficient, C indicates vertex curvature of an aspheric surface, and r indicates a radial coordinate of the aspheric surface.

Figure 34A:
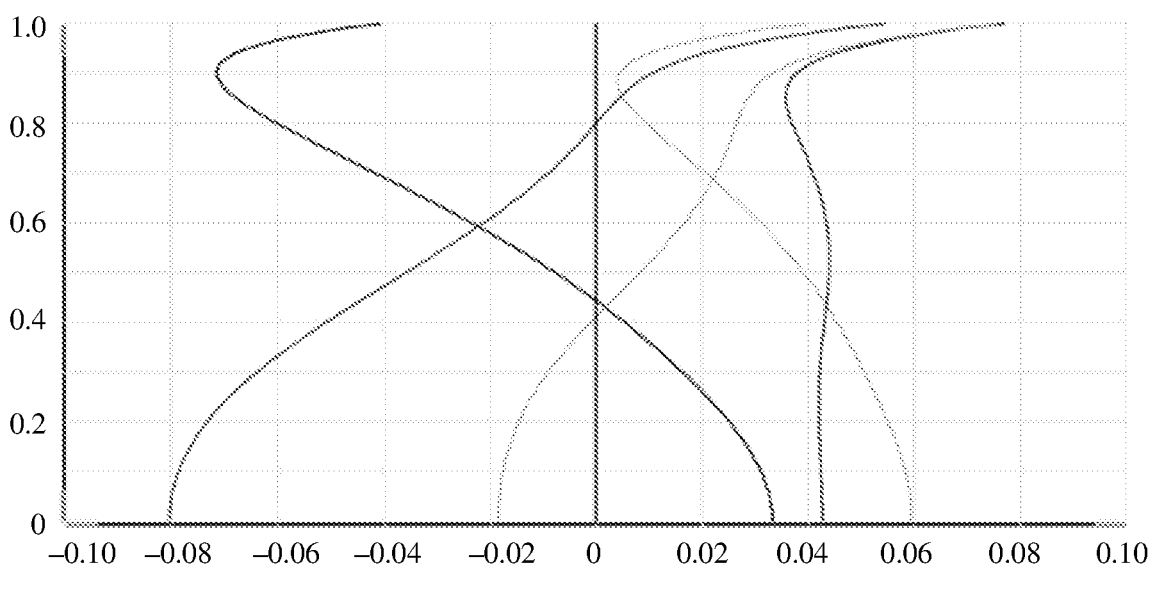
FIG. 34a is a line graph of axial aberration of a camera lens shown in FIG. 33.

FIG. 34a shows curves of axial aberration in the structure of the camera lens shown in FIG. 33 based on the data shown in Table 14-1, Table 14-2, Table 14-3, and Table 14-4. Five curves shown in FIG. 34a are curves of axial aberration corresponding to designed wavelengths of 650 nm, 634 nm, 555 nm, 534 nm, and 470 nm respectively. It can be learned from FIG. 34a that axial aberration of light with different wavelengths is controlled within a quite small range.

Figure 34B:
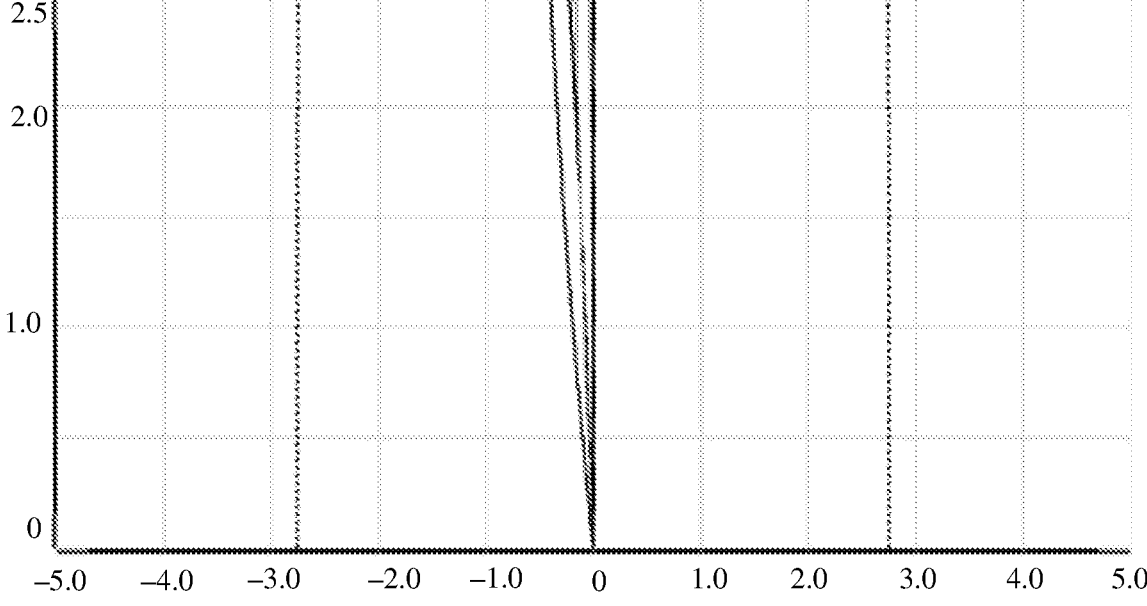
FIG. 34b is a line graph of lateral aberration of a camera lens shown in FIG. 33.

FIG. 34b shows curves of lateral aberration in the structure of the camera lens shown in FIG. 33 based on the data shown in Table 14-1, Table 14-2, Table 14-3, and Table 14-4. Five curves shown in FIG. 34b are curves of lateral aberration corresponding to designed wavelengths of 650 nm, 634 nm, 555 nm, 534 nm, and 470 nm respectively, and a dashed line indicates a diffraction limit range. It can be learned from FIG. 34b that lateral aberration of light with different wavelengths is within the diffraction range.

Figure 34C:
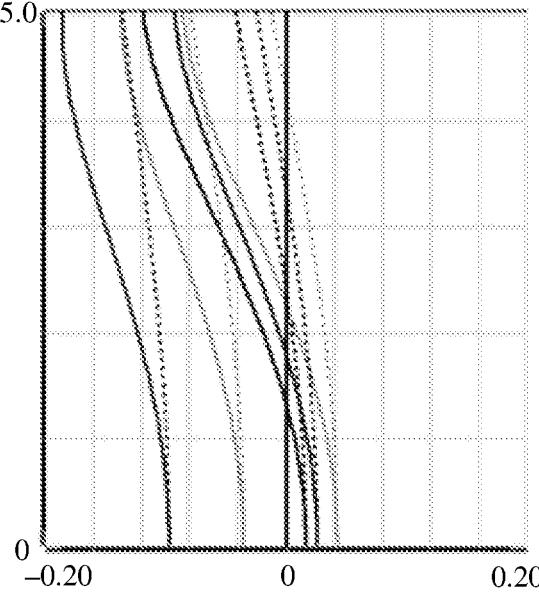
FIG. 34c is a line graph of distortion aberration of a camera lens shown in FIG. 33.
Figure 34D:
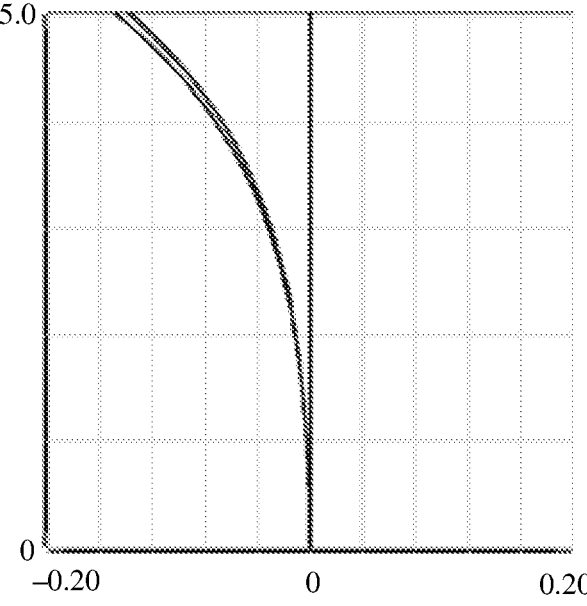
FIG. 34d is a line graph of ideal distortion aberration of a camera lens shown in FIG. 33.

FIG. 34c shows curves of distortion aberration in the structure of the camera lens shown in FIG. 33 based on the data shown in Table 14-1, Table 14-2, Table 14-3, and Table 14-4. FIG. 34d shows a curve of ideal distortion aberration. It can be learned through comparison between FIG. 34c and FIG. 34d that distortion aberration of light with different wavelengths is within a range recognizable to naked eyes.

In the descriptions of this specification, specific features, structures, materials, or characteristics may be combined in a proper manner in any one or more of embodiments or examples.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A camera lens, comprising:

a first lens along a direction from an object field to an image field, the first lens having positive focal power, wherein an object-side surface of the first lens is a convex surface;

a prism along the direction from the object field to the image field, wherein an object-side surface of the prism is in contact with an image-side surface of the first lens, and the prism is configured to refract, from a first optical axis to a second optical axis intersecting the first optical axis, light received from the first lens; and a plurality of lenses along the direction from the object field to the image field, wherein the plurality of lenses comprise at least three lenses, the plurality of lenses are sequentially disposed along the second optical axis, an object-side surface and an image-side surface of a lens of the plurality of lenses that is closest to the prism are aspheric surfaces, and an image-side surface of a lens of the plurality of lenses that is closest to the image field of the camera lens is a convex surface, wherein the plurality of lenses comprises:

a second lens having positive focal power;

a third lens having negative focal power;

a fourth lens having negative focal power;

a fifth lens having positive focal power; and a sixth lens having negative focal power, wherein the second lens, the third lens, the fourth lens, the fifth lens, and the sixth lens are sequentially disposed along the second optical axis.

2. The camera lens according to claim 1, wherein a ratio of a focal length f2 of the second lens to a total focal length f of the camera lens is:

$$0.2 \le \left| \frac{f2}{f} \right| \le 18.$$

3. The camera lens according to claim 1, wherein at least one of the plurality of lenses is a diffractive optical element.

4. The camera lens according to claim 1, wherein at least one of the plurality of lenses is a first zoom liquid lens.

5. The camera lens according to claim 4, wherein the camera lens further comprises:

a second zoom liquid lens, wherein the second zoom liquid lens is disposed on a side of the first lens that faces the object field.

6. The camera lens according to claim 1, wherein a total focal length f of the camera lens is as follows: 14 mm≤f≤33 mm.

7. The camera lens according to claim 1, wherein a ratio of a curvature radius R of the lens of the plurality of lenses that is closest to the image field of the camera lens to a total focal length f of the camera lens is:

$$0.2 \le \left| \frac{R}{f} \right| \le 3.$$

8. The camera lens according to claim 1, wherein a ratio of an Abbe number V1 of the first lens to an Abbe number V2 of the prism is:

$$\left| \frac{V1}{V2} \right| \le 3.$$

9. The camera lens according to claim 1, wherein the prism is made of a glass material, the first lens is made of a plastic material, and the first lens is bonded to the prism through a bonding layer.

10. The camera lens according to claim 1, wherein both the prism and the first lens are made of a plastic material, and the prism and the first lens form an integrated structure.

11. A camera module, comprising:

a camera lens and an image sensor, wherein a photosensitive surface of the image sensor is opposite to an imaging plane of the camera lens, wherein the camera lens comprises:

a first lens, having positive focal power, wherein an object-side surface of the first lens is a convex surface;

a prism, wherein an object-side surface of the prism is in contact with an image-side surface of the first lens, and the prism is configured to refract, from a first optical axis to a second optical axis intersecting the first optical axis, light received from the first lens; and a plurality of lenses, wherein the plurality of lenses comprises at least three lenses, the plurality of lenses are sequentially disposed along the second optical axis, both an object-side surface and an image-side surface of a lens of the plurality of lenses that is closest to the prism are aspheric surfaces, and an image-side surface of a lens of the plurality of lenses that is closest to an image field of the camera lens is a convex surface, wherein the plurality of lenses comprises:

a second lens having positive focal power;

a third lens having negative focal power;

a fourth lens having negative focal power;

a fifth lens having positive focal power; and a sixth lens having negative focal power, wherein the second lens, the third lens, the fourth lens, the fifth lens, and the sixth lens are sequentially disposed along the second optical axis.

12. The camera module according to claim 11, wherein a ratio of a focal length f2 of the second lens to a total focal length f of the camera lens is:

$$0.2 \le \left| \frac{f2}{f} \right| \le 18.$$

13. The camera module according to claim 11, wherein at least one of the plurality of lenses is a first zoom liquid lens.

14. The camera module according to claim 13, wherein the camera lens further comprises:

a second zoom liquid lens, wherein the second zoom liquid lens is disposed on a side of the first lens that faces an object field.

15. The camera module according to claim 11, wherein a total focal length f of the camera lens is as follows: 14 mm≤f≤33 mm.

16. The camera module according to claim 11, wherein a ratio of a curvature radius R of the lens of the plurality of lenses that is closest to the image field of the camera lens to a total focal length f of the camera lens is:

$$0.2 \le \left| \frac{R}{f} \right| \le 3.$$

17. The camera module according to claim 11, wherein a ratio of an Abbe number V1 of the first lens to an Abbe number V2 of the prism is:

$$\left| \frac{V1}{V2} \right| \le 3.$$

18. An electronic device, comprising:

a processor; and a camera module, wherein the processor is connected to an image sensor in the camera module, and wherein the camera module comprises:

a camera lens and the image sensor, wherein a photosensitive surface of the image sensor is opposite to an imaging plane of the camera lens, wherein the camera lens comprises:

a first lens, having positive focal power, wherein an object-side surface of the first lens is a convex surface;

a prism, wherein an object-side surface of the prism is in contact with an image-side surface of the first lens, and the prism is configured to refract, from a first optical axis to a second optical axis intersecting the first optical axis, light received from the first lens; and a plurality of lenses, wherein the plurality of lenses comprises at least three lenses, the plurality of lenses are sequentially disposed along the second optical axis, both an object-side surface and an image-side surface of a lens of the plurality of lenses that is closest to the prism are aspheric surfaces, and an image-side surface of a lens of the plurality of lenses that is closest to an image field of the camera lens is a convex surface, wherein the plurality of lenses comprises:

a second lens having positive focal power;

a third lens having negative focal power;

a fourth lens having negative focal power;

a fifth lens having positive focal power; and a sixth lens having negative focal power, wherein the second lens, the third lens, the fourth lens, the fifth lens, and the sixth lens are sequentially disposed along the second optical axis.

19. The electronic device according to claim 18, wherein a ratio of a focal length f2 of the second lens to a total focal length f of the camera lens is:

$$0.2 \le \left| \frac{f2}{f} \right| \le 18.$$

* * * * *